(12) United States Patent
Youn et al.

(10) Patent No.: US 11,766,026 B2
(45) Date of Patent: Sep. 26, 2023

(54) LIQUID DISPENSER FOR ANIMALS

(71) Applicant: LG ELECTRONICS INC., Seoul (KR)

(72) Inventors: Jekwang Youn, Seoul (KR); Youngdon Kim, Seoul (KR); Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 730 days.

(21) Appl. No.: 16/574,219

(22) Filed: Sep. 18, 2019

(65) Prior Publication Data

US 2020/0085007 A1    Mar. 19, 2020

Related U.S. Application Data

(60) Provisional application No. 62/733,393, filed on Sep. 19, 2018.

(30) Foreign Application Priority Data

Jun. 13, 2019 (KR) .................. 10-2019-0070278
Jun. 13, 2019 (KR) .................. 10-2019-0070281
(Continued)

(51) Int. Cl.
*A01K 7/02* (2006.01)
*B01D 29/15* (2006.01)
(Continued)

(52) U.S. Cl.
CPC .............. *A01K 7/027* (2013.01); *B01D 29/01* (2013.01); *B01D 29/036* (2013.01); *B01D 29/15* (2013.01);
(Continued)

(58) Field of Classification Search
CPC ...... B01D 29/01; B01D 29/036; B01D 29/15; B01D 29/50; B01D 35/02; B01D 35/26;
(Continued)

(56) References Cited

U.S. PATENT DOCUMENTS 1,218,969 A    3/1917   Ziener
1,512,629 A    10/1924  Mueller et al.
(Continued)

FOREIGN PATENT DOCUMENTS

CA    2082083    5/1994
CA    2587229    5/2006
(Continued)

OTHER PUBLICATIONS

United States Office Action dated Apr. 27, 2021 issued in co-pending related U.S. Appl. No. 16/569,841.
(Continued)

*Primary Examiner* — Akash K Varma
(74) *Attorney, Agent, or Firm* — KED & ASSOCIATES, LLP

(57) ABSTRACT

A liquid dispenser may include a container having an upper opening, a pump provided in the container, a pipe through which liquid discharged from the pump is transferred, a top plate having an upper surface over which liquid flows, a filter assembly provided below the top plate, a base provided below the container, and a thermoelectric element provided in the base to cool the liquid in the container.

23 Claims, 38 Drawing Sheets

(30) Foreign Application Priority Data

Jun. 13, 2019 (KR) ........................ 10-2019-0070282
Jun. 13, 2019 (KR) ........................ 10-2019-0070284
Jun. 25, 2019 (KR) ........................ 10-2019-0075692
Jul. 22, 2019 (KR) ........................ 10-2019-0088430
Jul. 22, 2019 (KR) ........................ 10-2019-0088431

(51) Int. Cl.

| | | |
|---|---|---|
| B01D 29/01 | (2006.01) | |
| B01D 35/26 | (2006.01) | |
| B01D 29/50 | (2006.01) | |
| B67D 1/08 | (2006.01) | |
| B67D 1/00 | (2006.01) | |
| B01D 35/02 | (2006.01) | |
| F25B 21/02 | (2006.01) | |
| B01D 35/30 | (2006.01) | |
| B01D 29/03 | (2006.01) | |
| C02F 1/00 | (2023.01) | |
| C02F 1/32 | (2023.01) | |
| B67D 1/12 | (2006.01) | |
| G01S 13/08 | (2006.01) | |
| C02F 103/20 | (2006.01) | |

(52) U.S. Cl.
CPC ............ *B01D 29/50* (2013.01); *B01D 35/02* (2013.01); *B01D 35/26* (2013.01); *B01D 35/30* (2013.01); *B67D 1/0004* (2013.01); *B67D 1/0801* (2013.01); *B67D 1/0869* (2013.01); *B67D 1/0871* (2013.01); *B67D 1/0878* (2013.01); *B67D 1/0888* (2013.01); *B67D 1/1202* (2013.01); *C02F 1/001* (2013.01); *C02F 1/325* (2013.01); *F25B 21/02* (2013.01); *G01S 13/08* (2013.01); *B67D 2210/0001* (2013.01); *B67D 2210/00015* (2013.01); *C02F 2103/20* (2013.01); *C02F 2303/04* (2013.01)

(58) Field of Classification Search
CPC .... B01D 35/30; B67D 1/0004; B67D 1/0801; B67D 1/0869; B67D 1/0871; B67D 1/0878; B67D 1/0888; B67D 1/1202; B67D 1/00; B67D 1/08; B67D 2210/00005; B67D 2210/0001; B67D 2210/00015; B65H 51/10; E03B 9/20; C02F 1/001; C02F 1/325; C02F 1/32; C02F 1/00; C02F 2103/20; C02F 2303/04; C02F 9/08; A01K 7/02; A01K 7/025; A01K 7/027; A01K 7/00; A01K 7/022; A01K 7/06; A01K 7/04; A01K 5/01; A01K 5/02; A01K 39/02; A01K 39/022; A01K 63/00; A01K 63/04; A01K 15/04; A47K 5/12; F21V 33/00; F21Y 115/10; F25B 21/04; F25B 21/02; H02J 7/00; H02J 50/00; H02J 50/12; H01F 27/28
USPC ........................................................ 119/73
See application file for complete search history.

(56) References Cited

U.S. PATENT DOCUMENTS

| | | |
|---|---|---|
| 2,103,653 A | 12/1937 | Weil |
| 2,510,446 A | 6/1950 | Weil |
| 3,076,435 A | 2/1963 | Seymour |
| 3,303,824 A | 2/1967 | Anderson |
| 3,417,814 A | 12/1968 | Oktay |
| 3,441,003 A | 4/1969 | Du Mond et al. |
| D221,755 S | 9/1971 | Johnson |
| 3,691,787 A | 9/1972 | Kaufmann |
| 3,765,614 A | 10/1973 | Bartl et al. |
| 4,100,885 A | 7/1978 | Kapplinger |
| 4,133,456 A | 1/1979 | Corini |
| 4,286,546 A | 9/1981 | Moore |
| 4,561,384 A | 12/1985 | Liff |
| 4,640,226 A | 2/1987 | Liff |
| 4,932,561 A | 6/1990 | Boxall |
| 5,031,689 A | 7/1991 | Jones et al. |
| 5,105,771 A | 4/1992 | Schafer |
| 5,140,134 A | 8/1992 | Reusche et al. |
| 5,174,245 A | 12/1992 | Bishop |
| 5,205,242 A | 4/1993 | Kasselman |
| 5,209,069 A | 5/1993 | Newnan |
| 5,345,063 A | 9/1994 | Reusche et al. |
| 5,560,211 A | 10/1996 | Parker |
| 5,601,199 A | 2/1997 | Marty |
| 5,699,669 A | 12/1997 | Gebhard |
| 5,782,094 A | 7/1998 | Freeman |
| 5,791,287 A | 8/1998 | Gruber |
| 5,799,609 A * | 9/1998 | Burns et al. ............ A01K 7/02 119/74 |
| 5,845,605 A | 12/1998 | Malamphy |
| 5,862,669 A | 1/1999 | Davis |
| 5,884,582 A | 3/1999 | Duckworth |
| 5,941,077 A | 8/1999 | Safyan |
| 6,003,318 A | 12/1999 | Busick |
| 6,230,653 B1 | 5/2001 | Tobin |
| 6,460,483 B1 | 10/2002 | Northrop et al. |
| 6,622,657 B2 | 9/2003 | Northrop et al. |
| 6,644,037 B2 | 11/2003 | Busick |
| 6,705,540 B2 | 3/2004 | Koshiyama et al. |
| 6,848,392 B1 | 2/2005 | Kreutzer, Jr. |
| 7,089,881 B2 | 8/2006 | Plante |
| 7,270,082 B2 | 9/2007 | Plante |
| 7,549,395 B2 | 6/2009 | Stenberg |
| 7,600,486 B2 | 10/2009 | Ellis |
| 7,743,698 B2 | 6/2010 | Muir et al. |
| 7,823,538 B1 * | 11/2010 | Merager ................ A01K 7/02 119/72 |
| 7,958,844 B1 | 6/2011 | Northrop |
| 8,117,991 B1 | 2/2012 | Civitillo |
| 8,210,447 B2 | 7/2012 | Cohen |
| 8,387,566 B2 | 3/2013 | Graves et al. |
| 8,770,147 B2 | 7/2014 | Rowe |
| 8,770,148 B2 | 7/2014 | Lipscomb et al. |
| 9,035,222 B2 | 5/2015 | Alexander |
| D738,579 S | 9/2015 | Owens et al. |
| D755,449 S | 5/2016 | Cornwell, Jr. et al. |
| 9,497,930 B2 | 11/2016 | Lipscomb et al. |
| 1,243,126 A1 | 10/2017 | Ziener |
| D819,898 S | 6/2018 | Poisson et al. |
| 10,165,753 B1 | 1/2019 | Huang |
| 11,154,034 B2 | 10/2021 | Youn et al. |
| 11,160,250 B2 | 11/2021 | Yoo et al. |
| 11,590,438 B2 | 2/2023 | Yoo |
| 2002/0020673 A1 | 2/2002 | Nohren et al. |
| 2003/0115902 A1 | 6/2003 | Busick et al. |
| 2003/0140864 A1 | 7/2003 | Wenstrand |
| 2003/0213437 A1 | 11/2003 | Norris |
| 2005/0166853 A1 | 8/2005 | Plante |
| 2006/0174838 A1 | 8/2006 | Plante |
| 2006/0231040 A1 | 10/2006 | Bast et al. |
| 2006/0283972 A1 | 12/2006 | Muir et al. |
| 2006/0288947 A1 | 12/2006 | Perlsweig et al. |
| 2007/0045159 A1 | 3/2007 | Lee |
| 2007/0095297 A1 | 5/2007 | Boyd |
| 2007/0199512 A1 | 8/2007 | Ellis |
| 2007/0227456 A1 | 10/2007 | Borey |
| 2008/0078330 A1 | 4/2008 | McCallum et al. |
| 2008/0169249 A1 | 7/2008 | Ter Stege |
| 2008/0190374 A1 | 8/2008 | Farris |
| 2008/0257272 A1 | 10/2008 | Bolda |
| 2009/0078209 A1 | 3/2009 | Kroeker |
| 2009/0126641 A1 | 5/2009 | Anderson et al. |
| 2009/0218985 A1 | 9/2009 | Hallett |
| 2010/0095897 A1 | 4/2010 | Rowe |
| 2010/0276508 A1 | 11/2010 | Davies |

(56) References Cited

U.S. PATENT DOCUMENTS

| | | | |
|---|---|---|---|
| 2010/0300366 A1 | 12/2010 | Lipscomb et al. |
| 2011/0067638 A1 | 3/2011 | Lipscomb et al. |
| 2011/0102945 A1 | 5/2011 | Isono et al. |
| 2011/0214613 A1 | 9/2011 | Diamond |
| 2011/0226470 A1 | 9/2011 | Latrille et al. |
| 2011/0259273 A1 | 10/2011 | Lipscomb et al. |
| 2012/0017839 A1 | 1/2012 | Veness et al. |
| 2012/0111280 A1 | 5/2012 | Shin et al. |
| 2012/0152866 A1 | 6/2012 | Stiles, Jr. et al. |
| 2012/0216751 A1 | 8/2012 | Rowe |
| 2013/0087102 A1 | 4/2013 | Lipscomb et al. |
| 2013/0092090 A1 | 4/2013 | McCallum |
| 2013/0175802 A1 | 7/2013 | Breau et al. |
| 2013/0192529 A1 | 8/2013 | Kruger et al. |
| 2013/0200064 A1 | 8/2013 | Alexander |
| 2013/0228132 A1 | 9/2013 | Lipscomb et al. |
| 2013/0255280 A1 | 10/2013 | Murphy et al. |
| 2014/0033984 A1 | 2/2014 | Li et al. |
| 2014/0053781 A1 | 2/2014 | Lewis |
| 2014/0076242 A1 | 3/2014 | Ho |
| 2014/0165607 A1 | 6/2014 | Alexander |
| 2014/0251223 A1 | 9/2014 | Rowe et al. |
| 2014/0353335 A1 | 12/2014 | Van Diepen |
| 2015/0135728 A1 | 5/2015 | Swanson et al. |
| 2015/0189862 A1 | 7/2015 | Lipscomb |
| 2015/0196157 A1 | 7/2015 | Swisth |
| 2015/0276204 A1 | 10/2015 | Ray |
| 2015/0313180 A1 | 11/2015 | Lipscomb et al. |
| 2015/0353335 A1 | 12/2015 | Breault |
| 2016/0000037 A1 | 1/2016 | Lipscomb et al. |
| 2016/0099599 A1 | 4/2016 | Ho et al. |
| 2016/0113249 A1 | 4/2016 | Kuo |
| 2016/0118179 A1 | 4/2016 | Park et al. |
| 2016/0159633 A1 | 6/2016 | Diffenderfer |
| 2016/0286757 A1 | 10/2016 | Armstrong |
| 2016/0287363 A1 | 10/2016 | Miller |
| 2017/0245465 A1* | 8/2017 | Oates ............... B65D 21/0234 |
| 2017/0255186 A1 | 9/2017 | Ryznar et al. |
| 2018/0054073 A1 | 2/2018 | Olson et al. |
| 2018/0160648 A1 | 6/2018 | Goh |
| 2018/0177325 A1 | 6/2018 | Lyons et al. |
| 2019/0075755 A1 | 3/2019 | Imaizumi et al. |
| 2019/0140471 A1 | 5/2019 | Johanski et al. |
| 2019/0162460 A1 | 5/2019 | Oh |
| 2019/0227580 A1 | 7/2019 | von der Assen et al. |
| 2019/0239476 A1 | 8/2019 | Mai et al. |
| 2019/0239491 A1 | 8/2019 | Yu et al. |
| 2019/0357747 A1 | 11/2019 | Keiler, III |
| 2020/0303971 A1 | 9/2020 | Hall et al. |
| 2020/0337266 A1 | 10/2020 | Yu et al. |
| 2020/0355751 A1 | 11/2020 | Swaans et al. |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1824622 | 8/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102925877 | 2/2013 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 103917147 | 7/2014 |
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108348966 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109513315 | 3/2019 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2018 |
| EP | 3520607 | 8/2019 |
| FR | 2 726 452 | 5/1996 |
| GB | 2 458 173 | 9/2009 |
| GB | 2572228 | 9/2019 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |

(56) References Cited

FOREIGN PATENT DOCUMENTS

| KR | 10-1825334 | 2/2018 |
|---|---|---|
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

United States Office Action dated Apr. 27, 2021 issued in co-pending related U.S. Appl. No. 16/574,418.
Chinese Office Action dated Mar. 30, 2021 issued in CN Application No. 201910886714.X.
European Search Report dated Feb. 3, 2020 issued in EP Application No. 19198170.3.
United States Office Action dated Dec. 6, 2021 issued in co-pending related U.S. Appl. No. 16/569,827.
United States Office Action dated Dec. 10, 2021 issued in co-pending related U.S. Appl. No. 16/571,075.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
United States Office Action dated Jul. 29, 2022 issued in co-pending related U.S. Appl. No. 16/574,322.
United States Office Action dated Mar. 24, 2022 issued in co-pending related U.S. Appl. No. 16/571,089.
U.S. Appl. No. 16/574,240, filed Sep. 18, 2019.
U.S. Appl. No. 16/574,259, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,418, filed Sep. 18, 2019.
U.S. Appl. No. 16/571,090, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/569,908, filed Sep. 13, 2019.
United States Office Action dated Feb. 11, 2022 issued in co-pending related U.S. Appl. No. 16/574,322.
European Search Report dated Feb. 19, 2020 issued in Application No. 19198200.8.
European Search Report dated Feb. 19, 2020 issued in Application No. 19198191.9.
European Search Report dated Feb. 14, 2020 issued in Application No. 19198187.7.
European Search Report dated Feb. 14, 2020 issued in Application No. 19198196.8.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
United States Office Action dated Sep. 19, 2022 issued in co-pending related U.S. Appl. No. 16/569,827.
Chinese Notice of Allowance dated Apr. 8, 2022 issued in CN Application No. 201910888611.7.
United States Office Action dated May 19, 2022 issued in co-pending related U.S. Appl. No. 16/569,827.
United States Office Action dated Jun. 1, 2022 issued in co-pending related U.S. Appl. No. 16/571,075.
United States Office Action dated Jun. 2, 2022 issued in co-pending related U.S. Appl. No. 16/570,279.
United States Office Action dated Jun. 15, 2022 issued in co-pending related U.S. Appl. No. 16/569,908.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
U.S. Appl. No. 16/569,841, filed Sep. 13, 2019.
European Search Report issued in Application No, 19198303.0-1011 dated Apr. 23, 2020.
Chinese Office Action dated May 10, 2021 issued in CN Application No. 201910888718.1.
Chinese Office Action dated Apr. 1, 2021 issued in CN Application No. 201910886305.X.
Chinese Office Action dated Apr. 9, 2021 issued in CN Application No. 201910886526.7.
Dong, CN108464253A Machine Translation Description, Aug. 31, 2018, obtained Jan. 13, 2022 (Year: 2018).
United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
Chinese Office Action dated May 21, 2021 issued in CN Application No. 201910888661.5.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
European Search Report dated Feb. 27, 2020 issued in Application No. 19198292.5.
European Search Report dated Feb. 27, 2020 issued in Application No. 19198298.2.
United States Office Action dated Oct. 5, 2021 issued in co-pending related U.S. Appl. No. 16/571,074.
European Search Report dated Feb. 24, 2020 issued in EP Application No. 19198289.1.
Chinese Office Action dated Mar. 31, 2021 issued in CN Application No. 201910886533.7.
United States Office Action dated May 11, 2021 issued in co-pending related U.S. Appl. No. 16/571,093.
European Search Report dated Apr. 9, 2020 issued in EP Application No. 19198174.5.
United States Office Action dated Jun. 2, 2020 issued in co-pending related U.S. Appl. No. 16/574,259.
United States Office Action dated Mar. 30, 2021 issued in co-pending related U.S. Appl. No. 16/571,090.
Chinese Office Action dated Nov. 10, 2021 issued in CN Application No. 201910886533.7.
Chinese Office Action dated Nov. 10, 2021 issued in CN Application No. 201910886714.X.
Chinese Office Action dated May 17, 2021 issued in CN Application No. 201910889361.9.
Chinese Notice of Allowance dated Jul. 11, 2022 issued in CN Application No. 201910886305.X.
United States Office Action dated Aug. 29, 2022 issued in co-pending related U.S. Appl. No. 16/571,245.
Chinese Notice of Allowance dated Aug. 31, 2022 issued in CN Application No. 201910889318.2.
Chinese Office Action dated Sep. 21, 2022 issued in CN Application No. 201910888224.3.

(56) References Cited

OTHER PUBLICATIONS

United States Office Action dated Oct. 11, 2022 issued in co-pending related U.S. Appl. No. 16/570,279.
United States Office Action dated Oct. 13, 2022 issued in co-pending related U.S. Appl. No. 16/571,089.
United States Office Action dated Feb. 1, 2022 issued in co-pending related U.S. Appl. No. 16/574,237.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
U.S. Appl. No. 16/574,219, filed Sep. 18, 2019.
U.S. Appl. No. 16/574,237, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/570,279, filed Sep. 13, 2019.
U.S. Appl. No. 16/569,827, filed Sep. 13, 2019.
U.S. Office Action dated Apr. 27, 2023 issued in U.S. Appl. No. 16/574,581.
U.S. Office Action dated Mar. 30, 2023 issued in U.S. Appl. No. 16/574,368.
Rao et al. (2015). Effect of Corrugation Angle on Heat Transfer Studies of Viscous Fluids in Corrugated Plate Heat Exchangers. International Journal of Engineering and Technology Innovation, 5(2), pp. 99-107. (Year: 2015).
United States Office Action dated Feb. 23, 2023 issued in co-pending related U.S. Appl. No. 16/574,322.
United States Office Action dated Mar. 3, 2023 issued in co-pending related U.S. Appl. No. 16/574,474.
Chinese Office Action dated Feb. 13, 2023 issued in Application No. 202210573950.8.
U.S. Office Action dated Jun. 29, 2023 issued in U.S. Appl. No. 16/574,322.
Chinese Office Action dated Apr. 25, 2023 issued in Application No. 202210916091.8.
U.S. Office Action dated May 24, 2023 issued in U.S. Appl. No. 16/571,074.
U.S. Office Action dated Jul. 19, 2023 issued in U.S. Appl. No. 16/574,474.

\* cited by examiner

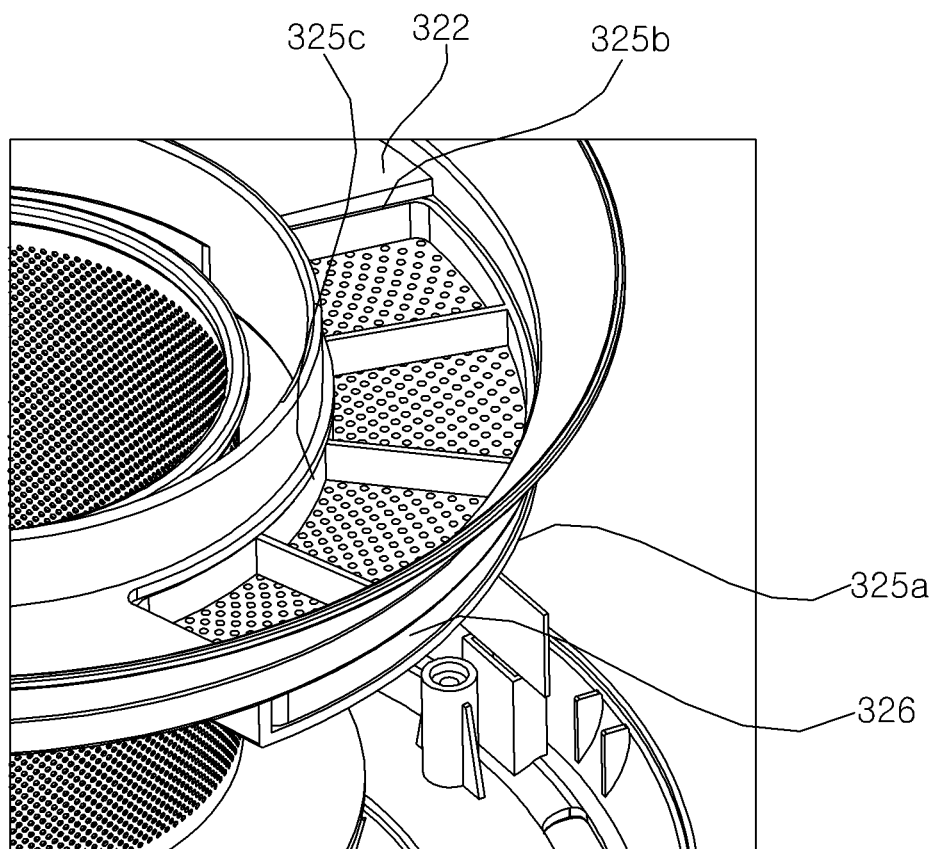

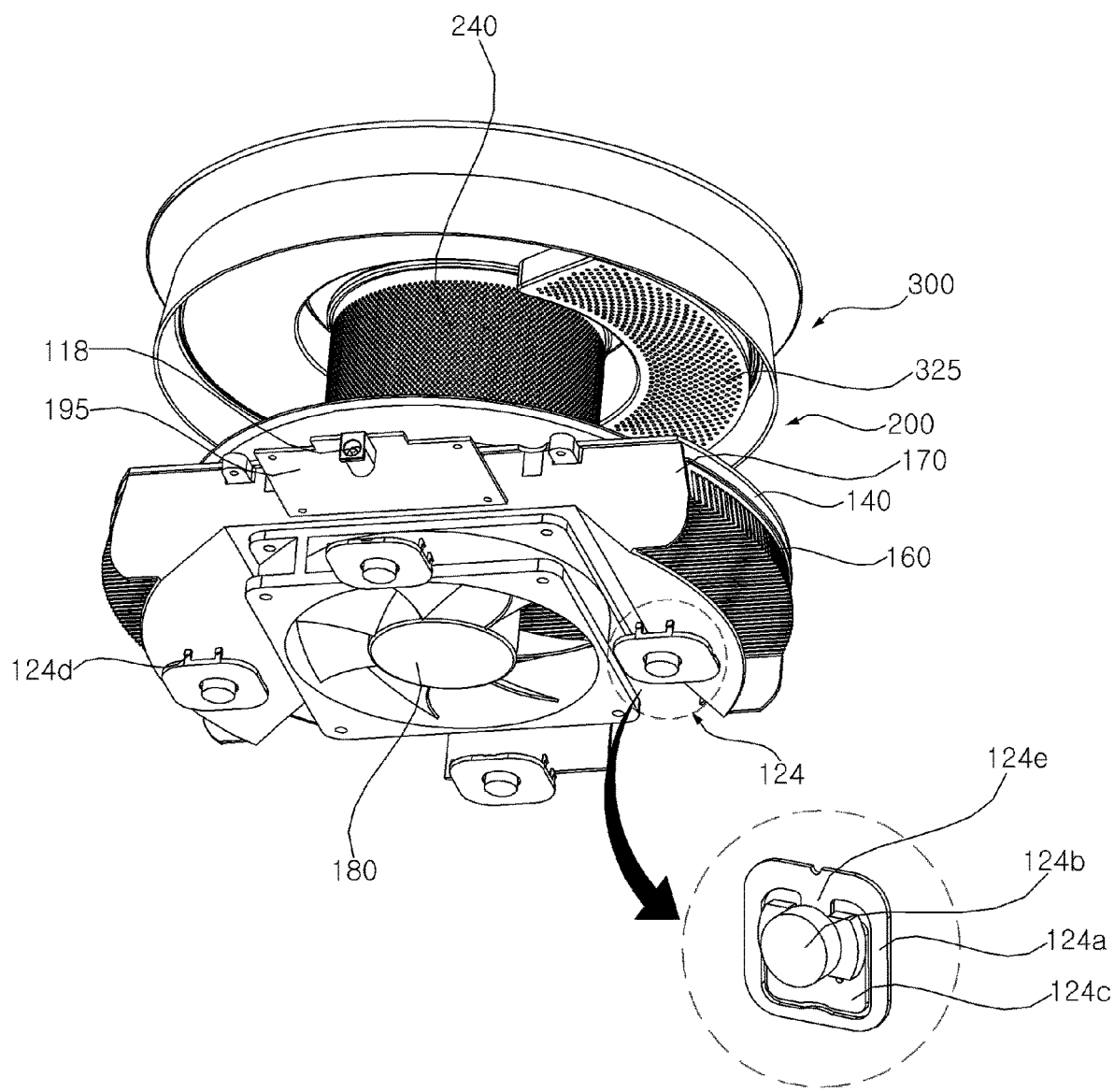

LIQUID DISPENSER FOR ANIMALS

CROSS-REFERENCE TO RELATED APPLICATIONS

This application claims priority under 35 U.S.C. § 119 to U.S. Provisional Application No. 62/733,393 filed on Sep. 19, 2018, Korean Application Nos. 10-2019-0070278, 10-2019-0070284, 10-2019-0070282, and 10-2019-0070281 filed on Jun. 13, 2019, 10-2019-0075692 filed on Jun. 25, 2019, and 10-2019-0088430 and 10-2019-0088431 filed on Jul. 22, 2019, whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising a pet has increased, in addition attachment and interest in pets. Like most mammals, pets must drink water to survive and maintain a biorhythm. Since pets are often left alone and communication with their owners is difficult, the demand for pet water dispensers or water supply devices has increased.

European Patent No. 3315022 A1, Korean Patent No. 10-1825334 B1, and U.S. Publication Nos. 2014/0053781, 2015/0313180, 2010/0095897, and 2012/0216751 (hereinafter "related art") disclose drinking bowls for pets. However, such drinking bowls have various disadvantages, which the present disclosure solves.

The above references are incorporated by reference herein where appropriate for appropriate teachings of additional or alternative details, features and/or technical background.

BRIEF DESCRIPTION OF THE DRAWINGS

FIG. 4E is a perspective view of a filter slot and filter tray;

FIGS. 10A and 10B illustrate two side views and FIG. 10C illustrates a bottom view;

FIG. 11A is a view showing a bottom of the base without the upper and lower frames of the base and showing an enlarged view of a weight sensor;

DETAILED DESCRIPTION OF THE INVENTION

Figure 1A:
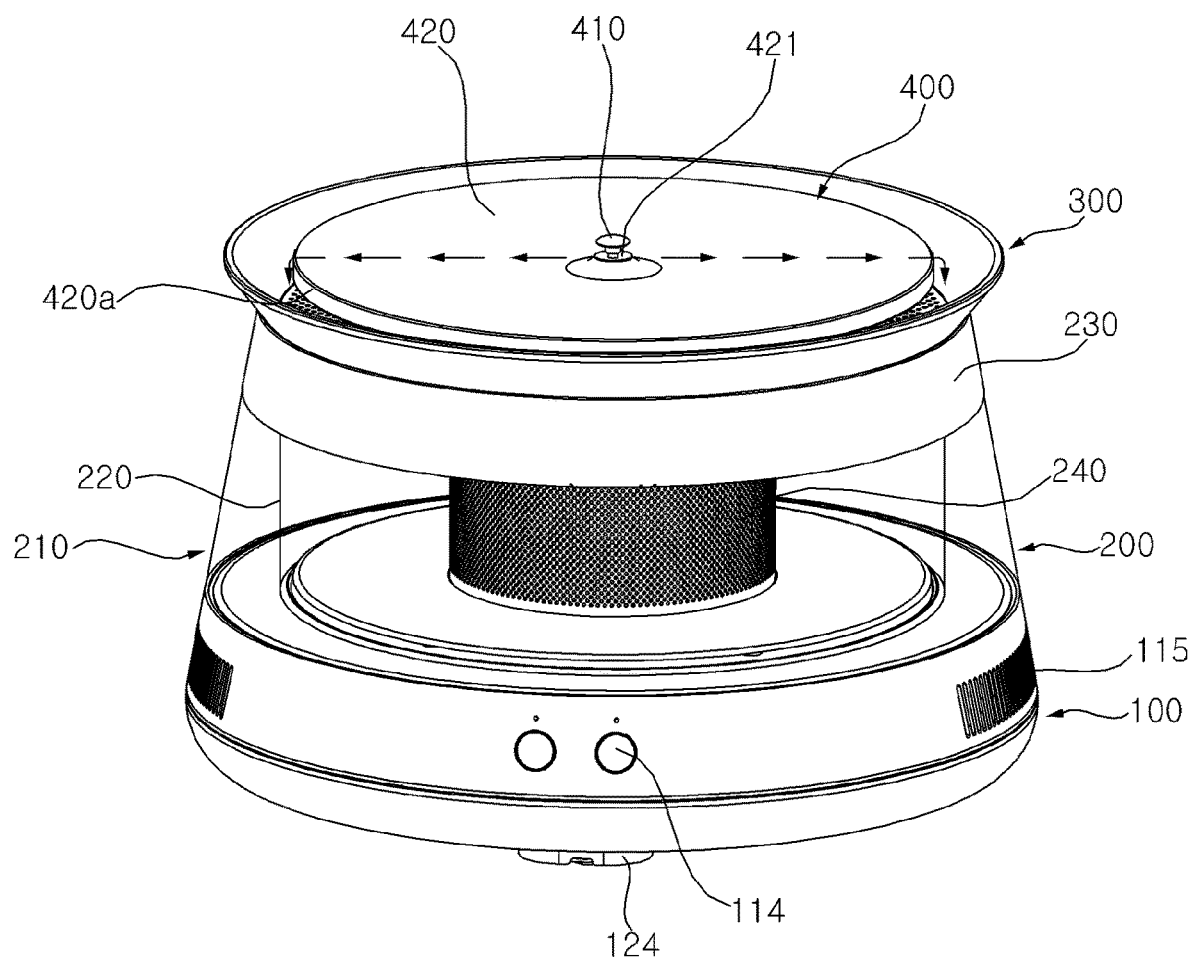
FIG. 1A is a perspective view showing a pet water dispenser according to an embodiment with a float in an open state.
Figure 1B:
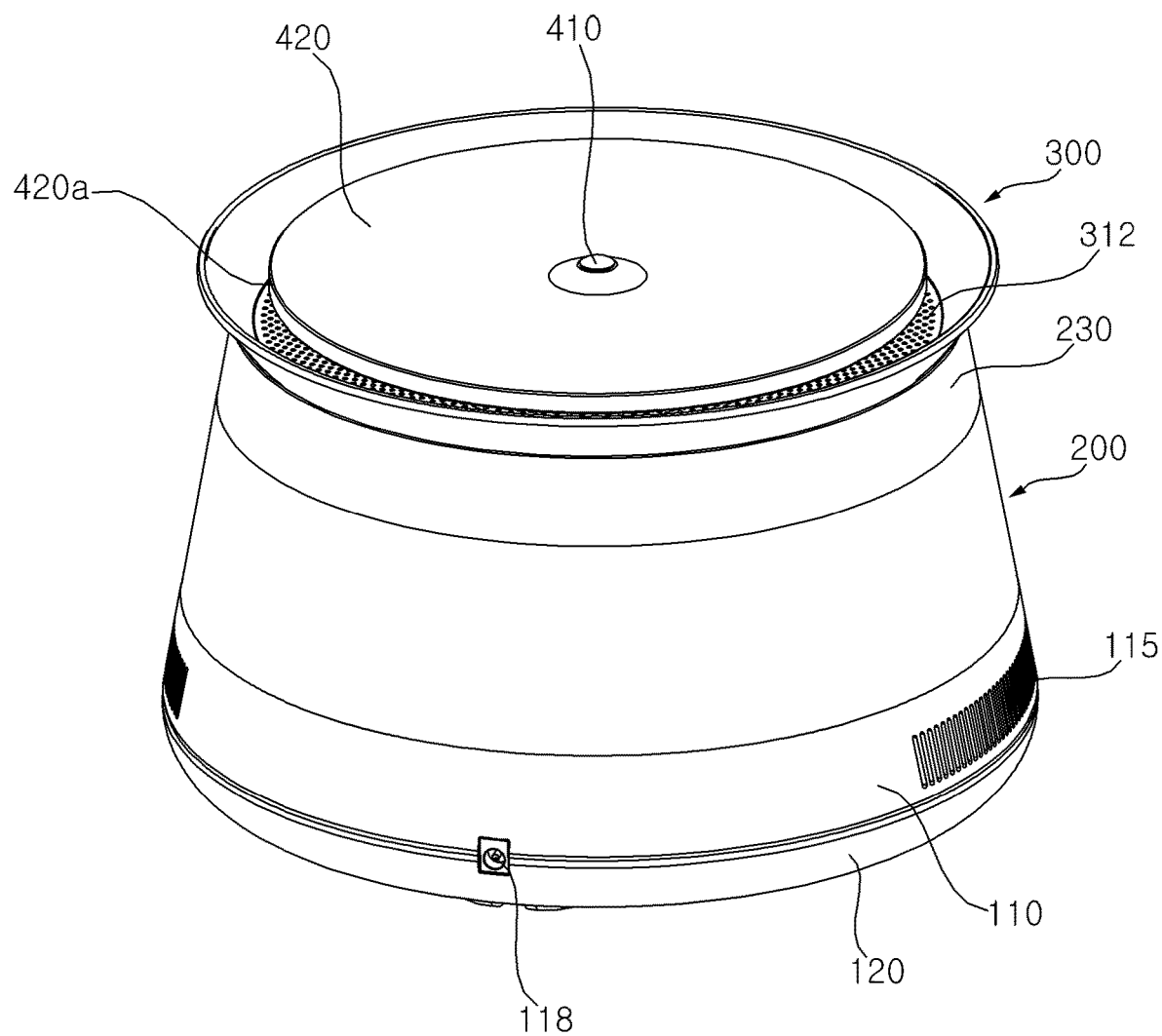
FIG. 1B is a perspective view of the pet water dispenser of FIG. 1 showing a float in a closed state.
Figure 1C:
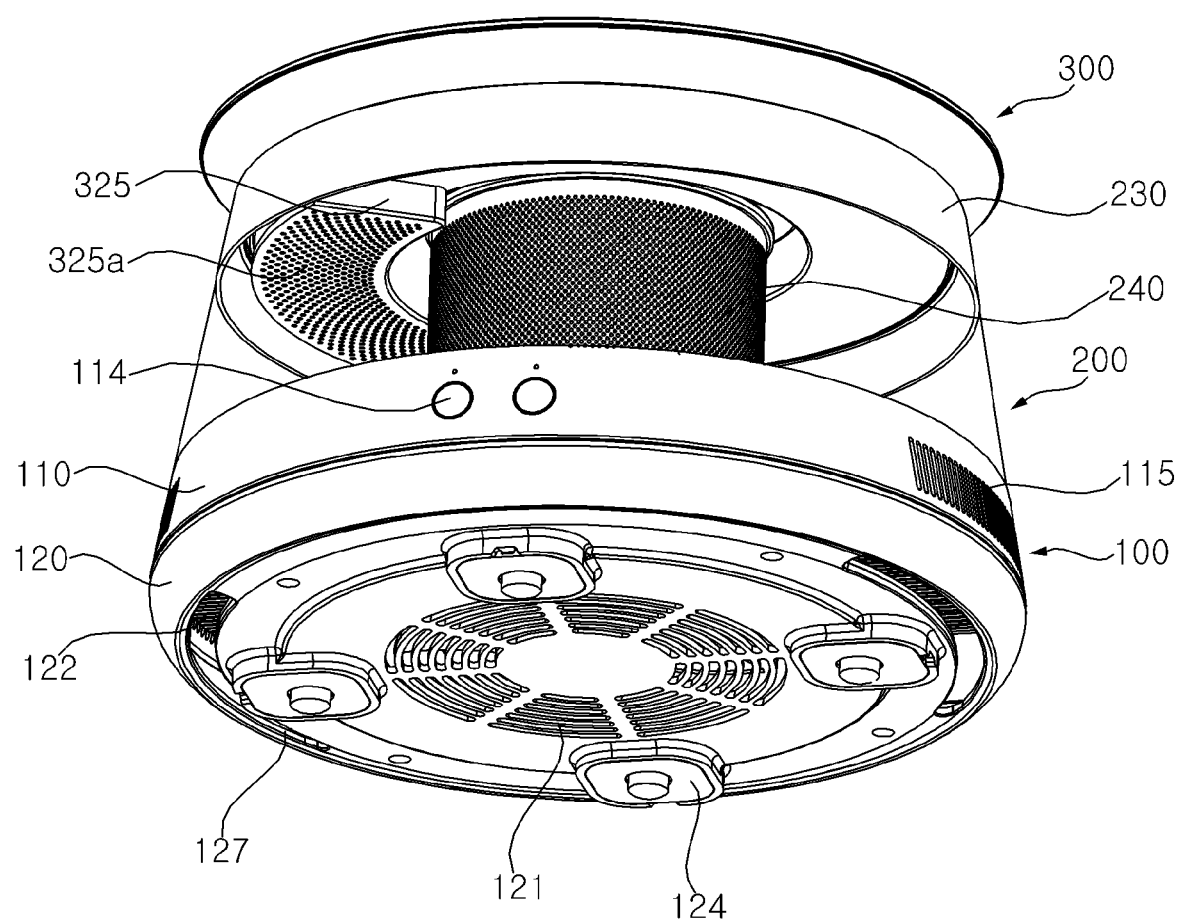
FIG. 1C is a perspective view showing a bottom of the pet water dispenser of FIG. 1.

Animals generally find running or moving water to be more desirable for consumption, and there is also a need to provide fresh or clear water, rather than stagnated water, in a pet bowl. Referring to FIGS. 1A-1G, a pet water dispenser 1 according to an embodiment may include a base 100 on which a container or storage chamber 200 configured to store liquid (e.g., drinking water) is placed. A lid or lid assembly, which may include a filter assembly 300 and a dispensing assembly 400, may close an upper opening of the container 200. Liquid may be dispensed from the container 200 to the dispensing assembly 400, and may reenter the container 200 after passing through the filter assembly 300.

The base 100 may be formed of an upper frame or shell 110 coupled to a lower frame or shell 120, and electronic devices may be stored inside of the base 100 to power an operation of the pet water dispenser and cool the liquid in the container 200. The upper and lower frames 110 and 120 may also be referred to as upper and lower covers, respectively. A side of the base 100 may include exhaust vents 115 to exhaust air, and a bottom of the base 100 may include a suction grill 121 through which air enters the base 100 and discharge slots 122 through which air or liquid may exit the base 100.

The base 100 may also include a user interface 114 through which a user may input commands to select modes, temperature, etc. and which may output information on status, temperature, etc. to the user. The base 100 may also include a socket or terminal 118 through which electric power from an external power source may be applied. The base 100 may rest on weight sensors 124, which may detect a weight of liquid in the container 200 and/or an amount of liquid in the container 200. Details of the weight sensor 124 will be described with reference to FIG. 11A.

The container 200 may also be referred to as a tank, and may be placed on top of the base 100. The container 200 may include outer and inner walls 210 and 220. The inner wall 220 may define a space in which liquid is substantially stored, while the outer wall 210 may be spaced apart from the inner wall 220 to insulate the liquid within the inner wall 220. A pump 192 may be provided in the container 200 to pump liquid to the dispensing assembly 300, and a secondary filter 240 may surround the pump 192 to filter foreign matter from liquid entering the pump 192. An upper rim 230 of the container 200 may define the upper opening.

A filter assembly 300 and a dispensing assembly 400 together may cover or close the upper opening of the container 200. The filter assembly 300 may be provided on the upper rim 230 of the container 200. The filter assembly 300 may include first and second filter surfaces 312 and 325a to filter foreign matter from liquid dropped from the dispensing assembly 400, and may further include a filter slot 325 in which a filter tray 326 (FIG. 2A) may be inserted to serve as an additional filter.

The dispensing assembly 400 may be provided above the filter assembly 300 to be projected above a top of the container 200. Generally, liquid is circulated from the container 200 to a hole 421 of the dispensing assembly 400 via the pump 192, and liquid flows across a top plate 420, falls off an edge 420a of the dispensing assembly 400 onto the filter assembly 300, and is filtered back into the container 200. As shown by the arrows in FIG. 1A, liquid may be sprayed outward across an upper surface of the top plate 420, and may cascade down from the edge 420a to the filter assembly 300. A pet may drink liquid falling off the edge 420a of the dispensing assembly 400, or alternatively, may drink shallower liquid flowing across the top plate 420.

A float 410 may be inserted in the hole 421. Liquid may be pumped by the pump 192 and flow through a pipe 192b (FIG. 3A) communicating with the hole 421. Depending on a pumping capacity or rate of the pump 192, the liquid may push the float 410 upward so that the float 410 opens the hole 421 for dispensing, as exemplified in FIG. 1A. When the pump 192 is turned off, the float 410 may completely close the hole 421, as exemplified in FIG. 1B.

Figure 1D:
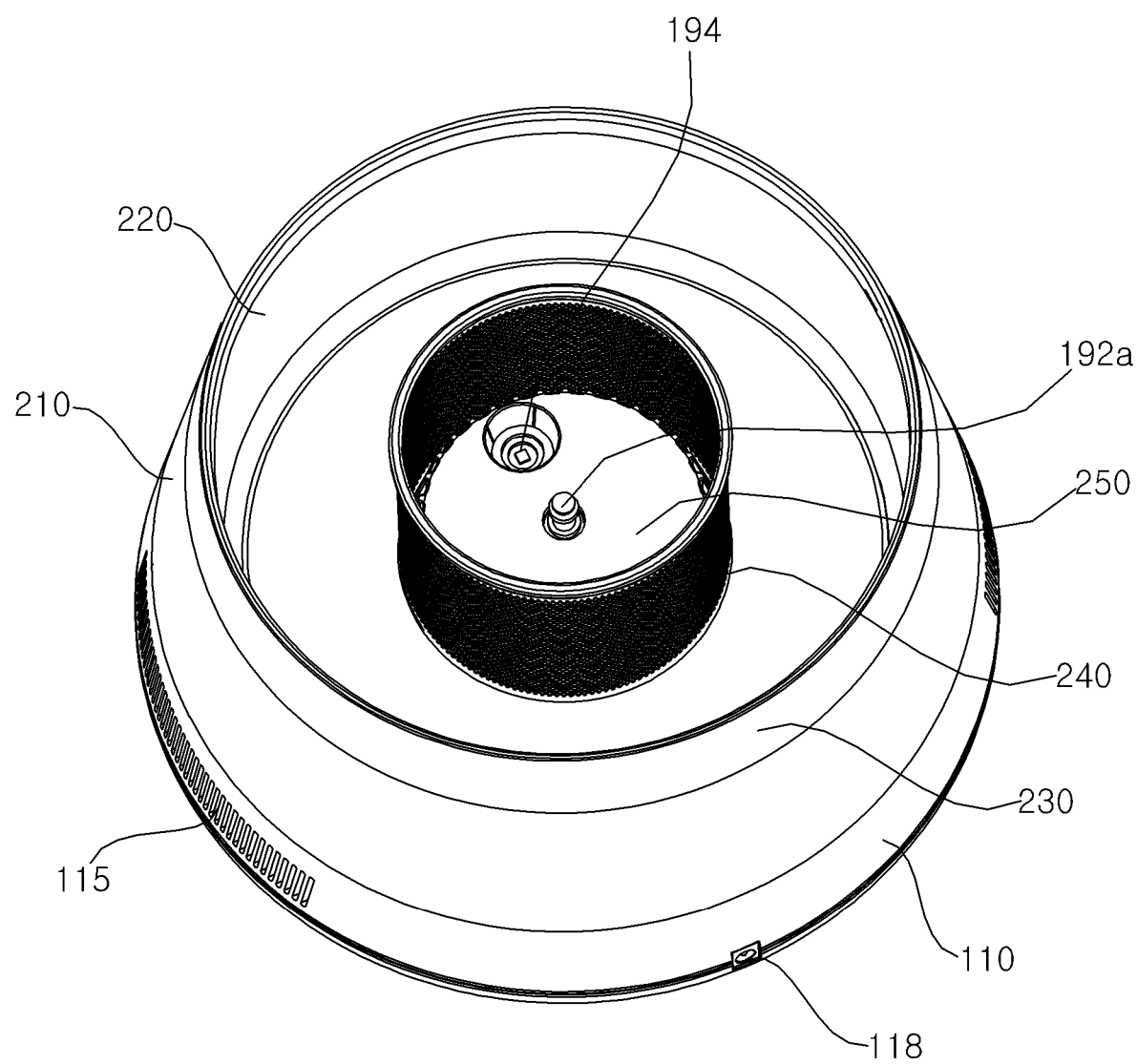
FIG. 1D is a top view of a pet water dispenser showing a secondary filter provided over a bottom cover.

The lid, which includes the filter assembly 300 and the dispensing assembly 400, may be easily lifted from the container 200. FIG. 1D shows an inside of the container 200 when the lid is lifted off the container 200, and a bottom cover 250 may be seated on a bottom of the container 200. The bottom cover 250 may include a pump cover 251 to cover the pump 192, and an outer ring 256 covering an outer portion of the bottom of the container 200. The secondary filter 240 may be seated on the outer ring 256 of the bottom cover 250 to surround the pump cover 251.

Figure 1E:
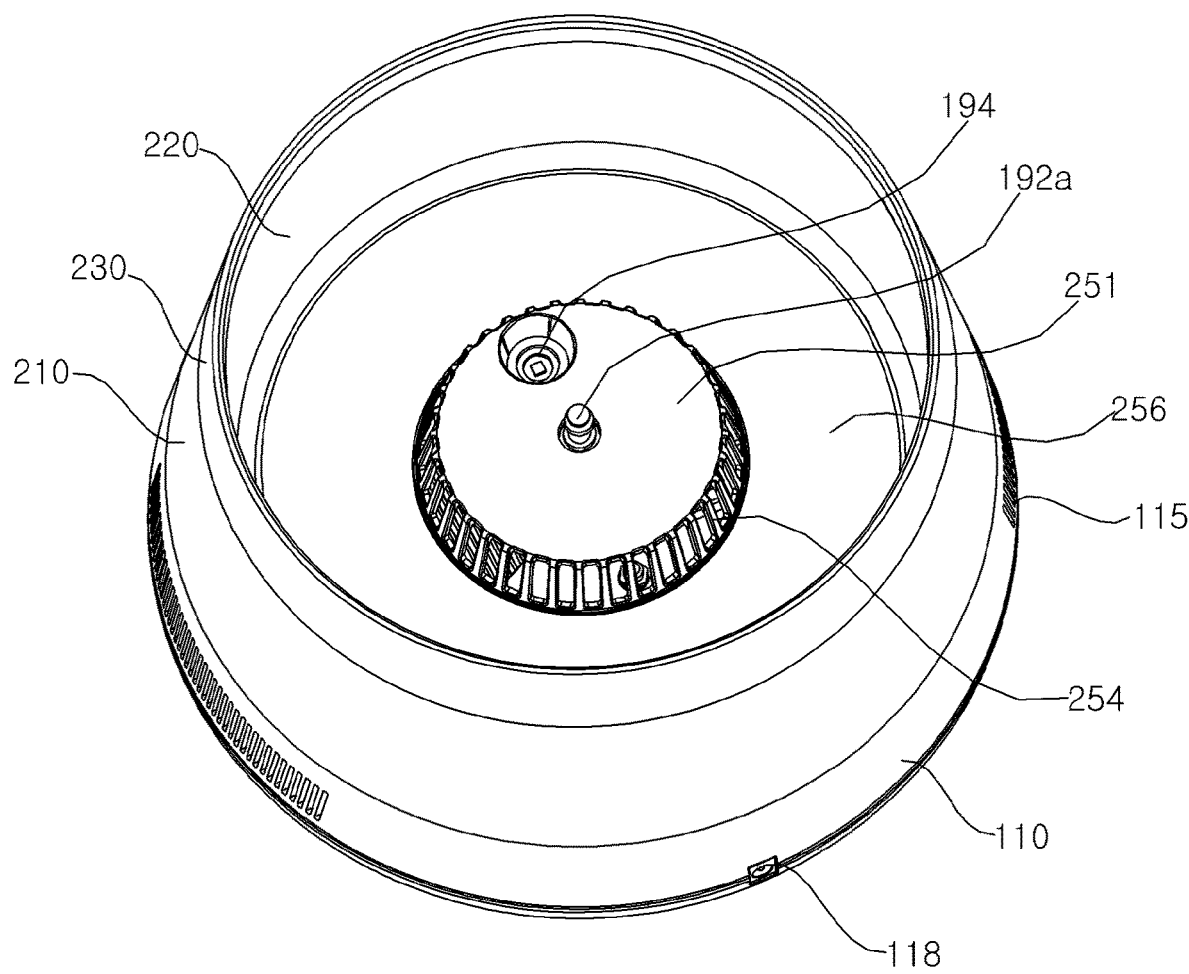
FIG. 1E is a top view of the pet water dispenser of FIG. 1D with the secondary filter removed.

The secondary filter 240 may be easily lifted out of the container. FIG. 1E shows an inside of the container 200 when the secondary filter 240 is lifted out and removed from the container 200. A pump outlet 192a may protrude from an upper surface of the pump cover 251. A sterilizing light or UV module 194 may emit ultraviolet (UV) light through a corresponding opening of the pump cover 251 to sterilize liquid in the container 200. A side of the pump cover 251 may include ribs or extensions 254 defining openings through which liquid may flow to enter the pump 192.

Figure 1F:
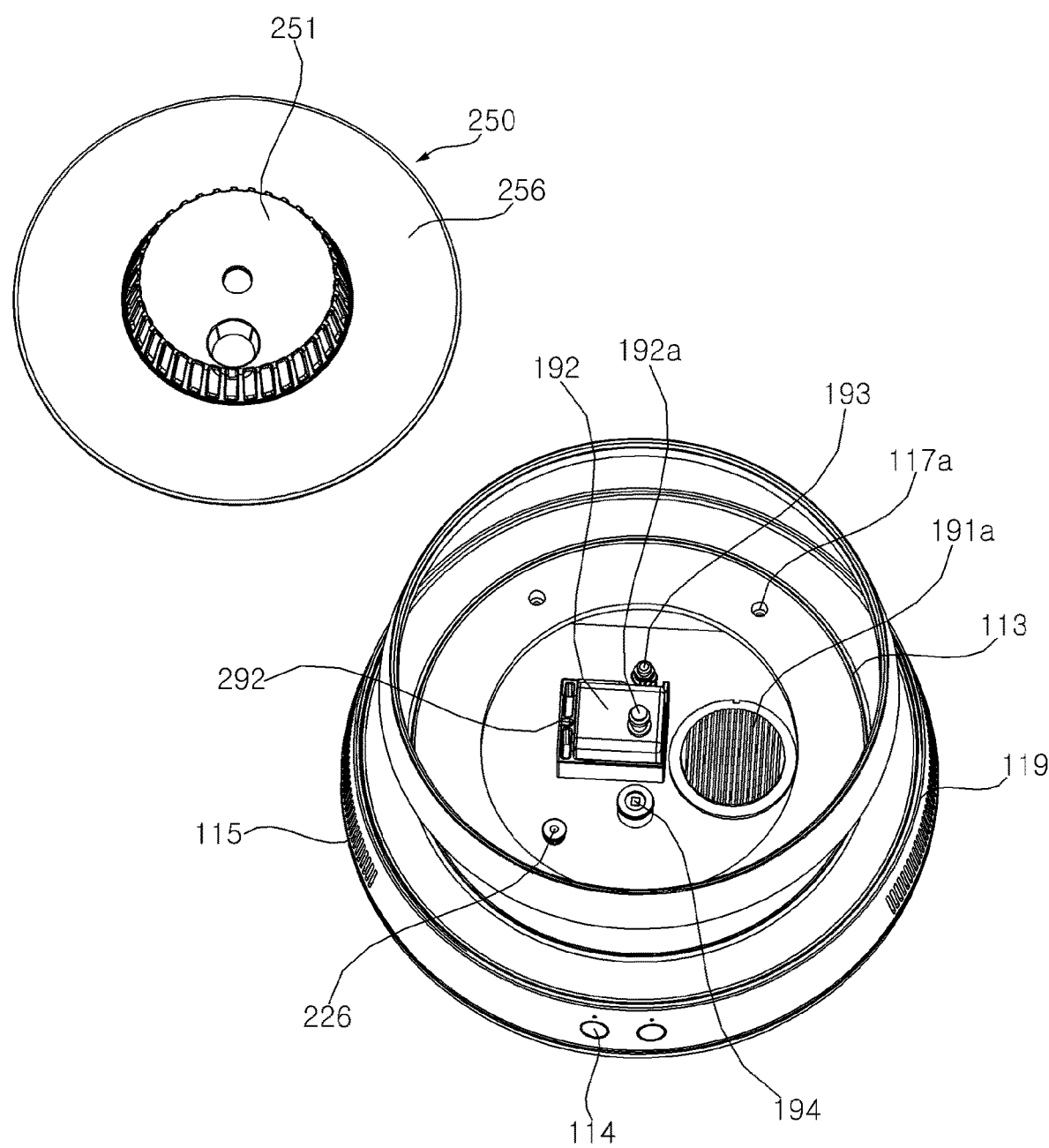
FIG. 1F is a top view of the pet water dispenser of FIG. 1E with the bottom cover removed.
Figure 1G:
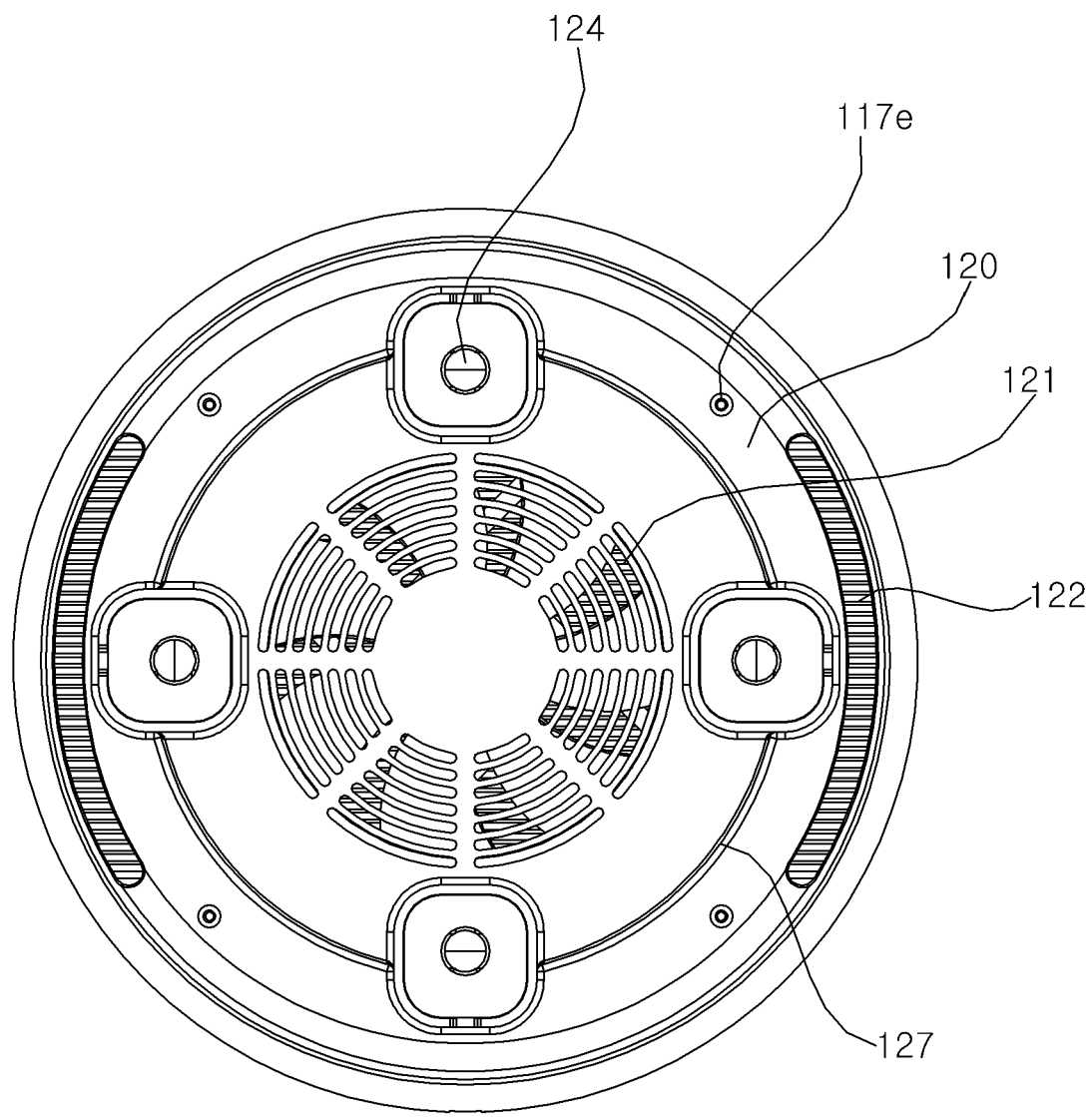
FIG. 1G is a bottom view of a pet water dispenser according to an embodiment.

The bottom cover 250 may be removed from the container 200 by lifting the pump cover 251. FIG. 1F shows an inside of the container 200 when the pump cover 250 is removed. The pump 192 may be provided in a pump housing 292 formed on a bottom surface of the container 200. A wiring hole 226 may be provided to accommodate wires that electrically connect the pump 192 to the base 100.

A metal 191a may further be provided on a bottom surface of the container 200. The metal 191a may be in contact with a Peltier device or thermoelectric cooler (TEC) 191b (FIG. 2B) mounted in the base 100, and the Peltier device 191b and the metal 191a may heat or cool liquid in the container 200. A liquid temperature sensor 193 may protrude through a bottom of the container 200 to measure a temperature of liquid in the container 200.

The container 200 may be transparent. An upper surface of the upper frame 110 of the base 100 may include a guide rib 113 to support the inner wall 210 of the container 200 and a guide groove 119 in which the outer wall 220 may be inserted. The upper frame 110 may also include screw holes or bosses 117a corresponding to recesses or holes in a fan housing 170 described later so that bolts or screws inserted into the bosses 117a maintain a position of devices (e.g., fan housing 170, heat sink 160) in the base 100. A leg 127 protruding from the bottom surface of the base 100 may space the base 100 apart from a ground or floor so that air may be suctioned into the suction grill 121 and so that air or liquid may be discharged from the discharge slots 122.

Figure 2A:
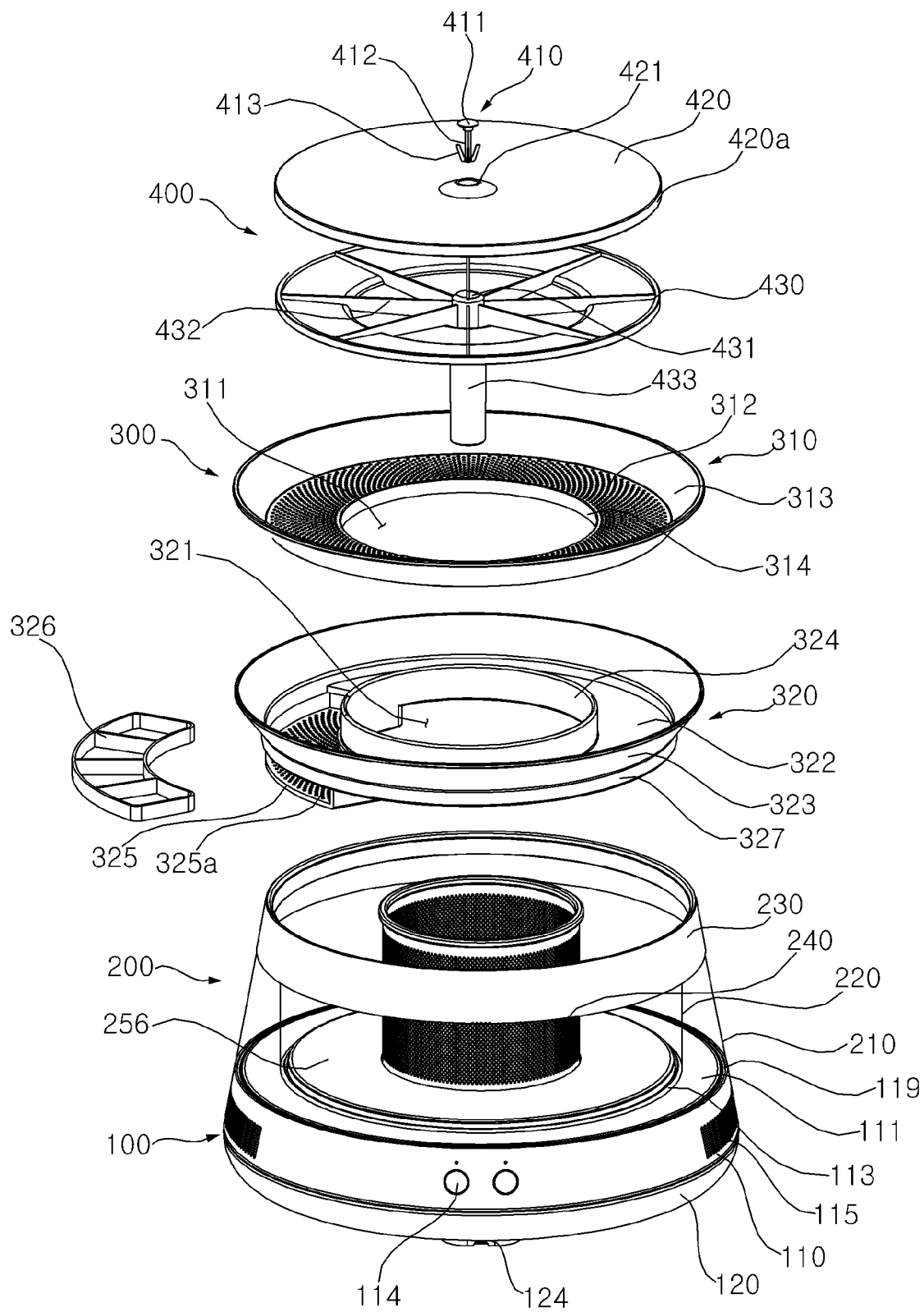
FIG. 2A is an exploded perspective view of a lid of the pet water dispenser of FIG. 1.

Referring to FIG. 2A, the dispensing assembly 400 may include the top plate 420 and a plate support 430. The top plate 420 may be provided on top of a plate support 430. The plate support 430 may have a pipe support 433 through which the pipe 192b (FIG. 3A) of the pump 192 is inserted. Details of the dispensing assembly 400 will be described later with reference to FIGS. 2A and 3A.

The filter assembly 300 may include a filter top 310 provided on a filter guide 320. The filter top 310 may include the first filter surface 312, while the filter guide 320 may include the filter slot 325 and the second filter surface 325a. The filter tray 326 may include a filter material (e.g., carbon filter). The filter tray 326 may be inserted into and out of the filter slot 325. The filter guide 320 may further include a guide surface 322 provided below the first filter surface 312. The guide surface 322 may guide liquid dropped through the first filter surface 312 to the filter slot 325. The filter top 310 and filter guide 320 may have inclined walls 313 and 323 that are placed on and protrude outward beyond the upper rim 230 of the container 200 to catch liquid falling from the dispensing assembly 400.

The filter top 310 and filter guide 320 may have inner holes or openings 311 and 321. The top plate 420 and plate support 430 may cover the openings 311 and 321 of the filter top 310 and filter guide 320. Details of the filter assembly 300 will be described with reference to FIGS. 4A-4D.

Figure 2B:
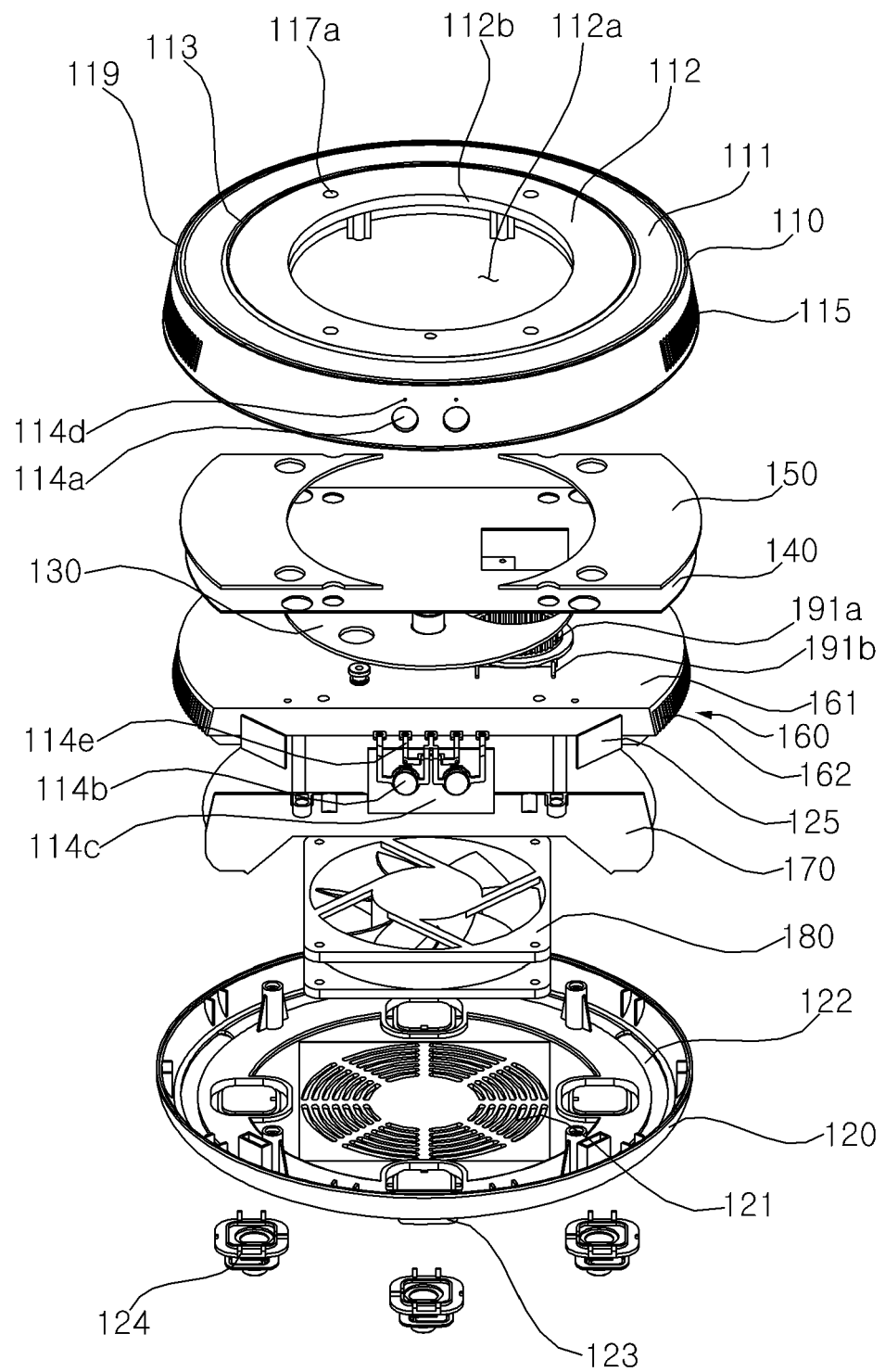
FIG. 2B is an exploded perspective view of a base of the pet water dispenser of FIG. 1.

Referring to FIGS. 2A and 2B, an exterior of the base 100 may be formed by the upper and lower frames 110 and 120, and an inner space of the base 100 may include a Peltier device 191b, a heat sink 160, and a fan 180 used to heat or cool liquid in the container 200. The fan 180 may be provided on the lower frame 120 above the suction grill 121. A fan housing 170 may be provided to surround the fan 180. The heat sink 160 may include heat dissipation fins provided on the fan housing 170 and a heat dissipation plate 161. The Peltier device 191b, sterilizing light 194, and liquid temperature sensor 193 (FIG. 1F) may be mounted on the heat dissipation plate 161.

The metal 191a may be provided on the Peltier device 191b, and may serve as a heat transferring plate or heat sink. The Peltier device 191b may be powered to heat up or cool down the liquid, and the fan 180 may exhaust cool or hot air accordingly out of the vents 115. In addition, the fan 180 may suction ambient air into the base 100 through the suction grill 121 to cool down the heat sink 160 and/or a bottom side of the Peltier device 191b during a liquid cooling process.

Figure 9A:
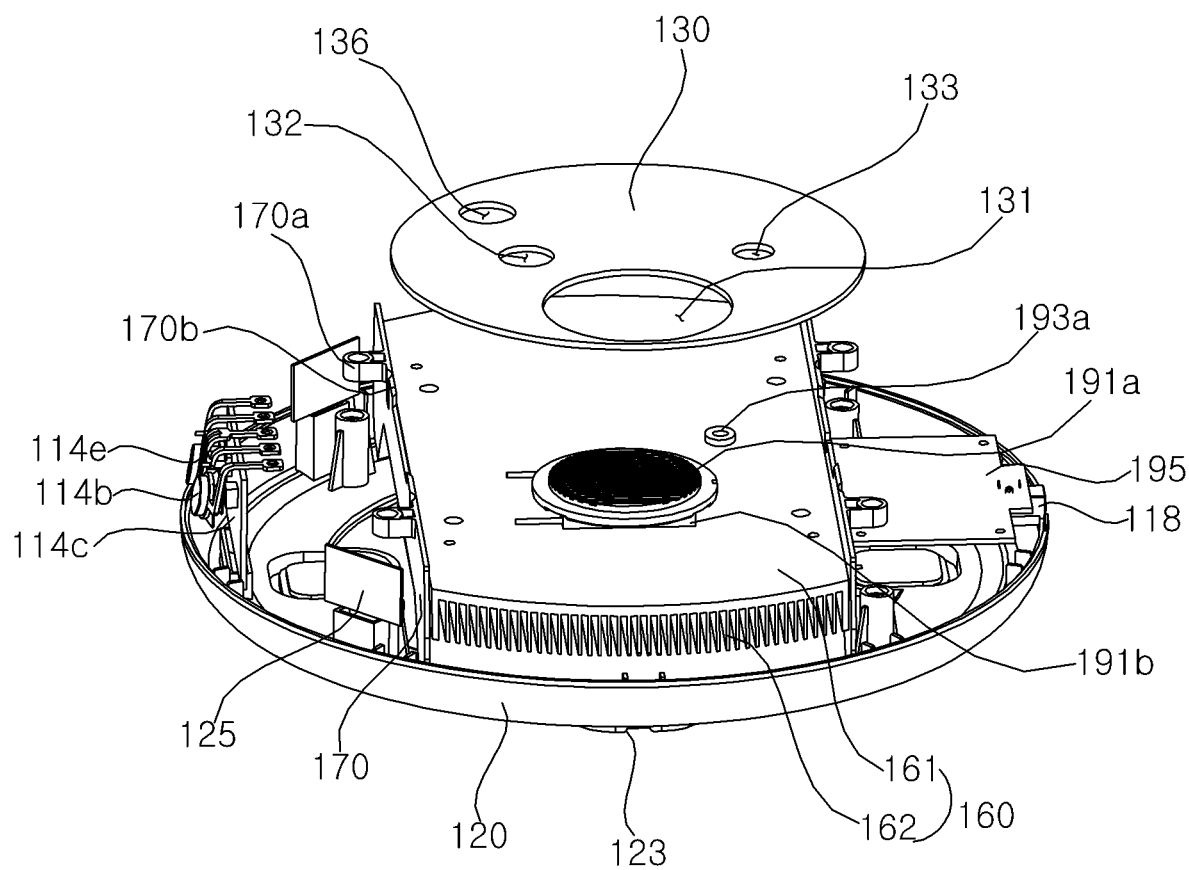
FIG. 9A is a perspective view of a lower frame of the base and a center plate removed from a heat sink.
Figure 9B:
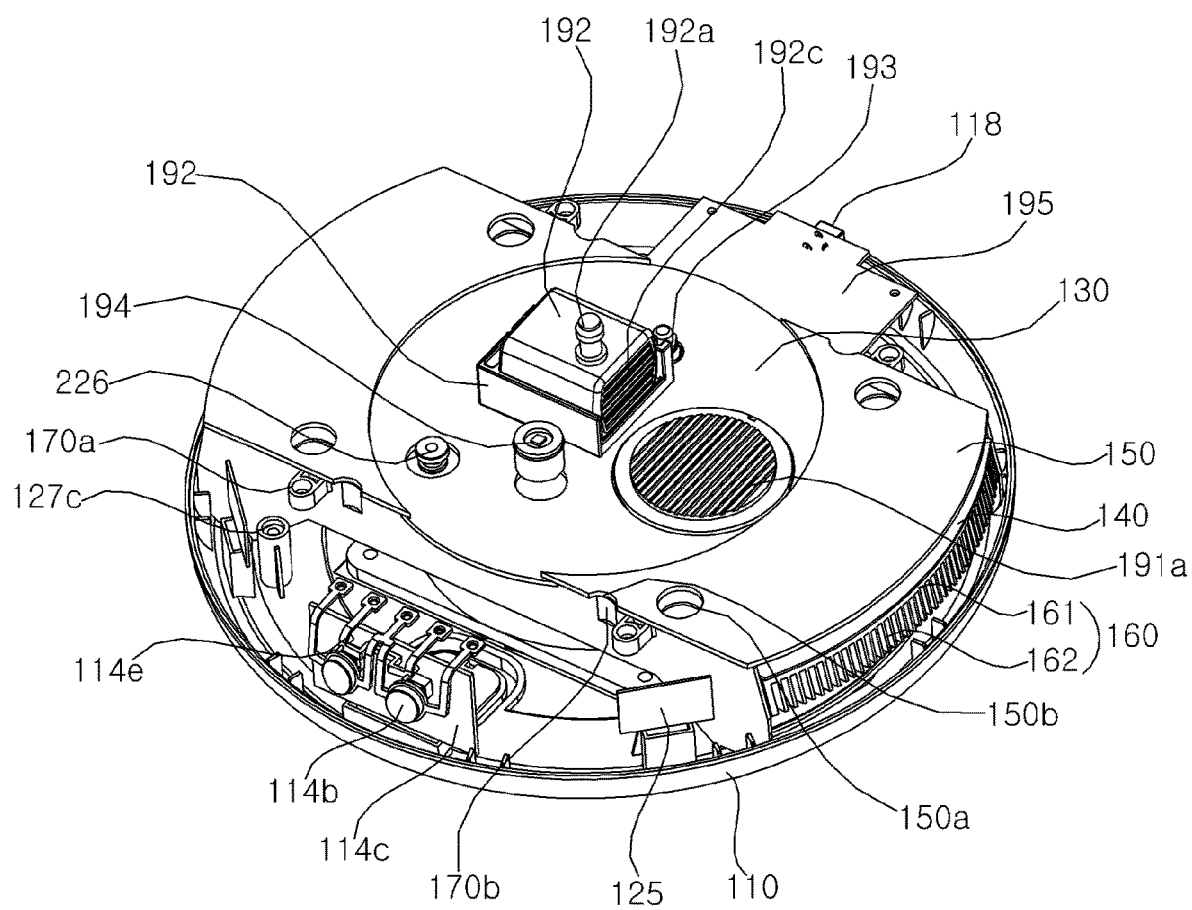
FIG. 9B is a perspective top view of the base of FIG. 9A with the center plate provided on the heat sink.
Figure 9C:
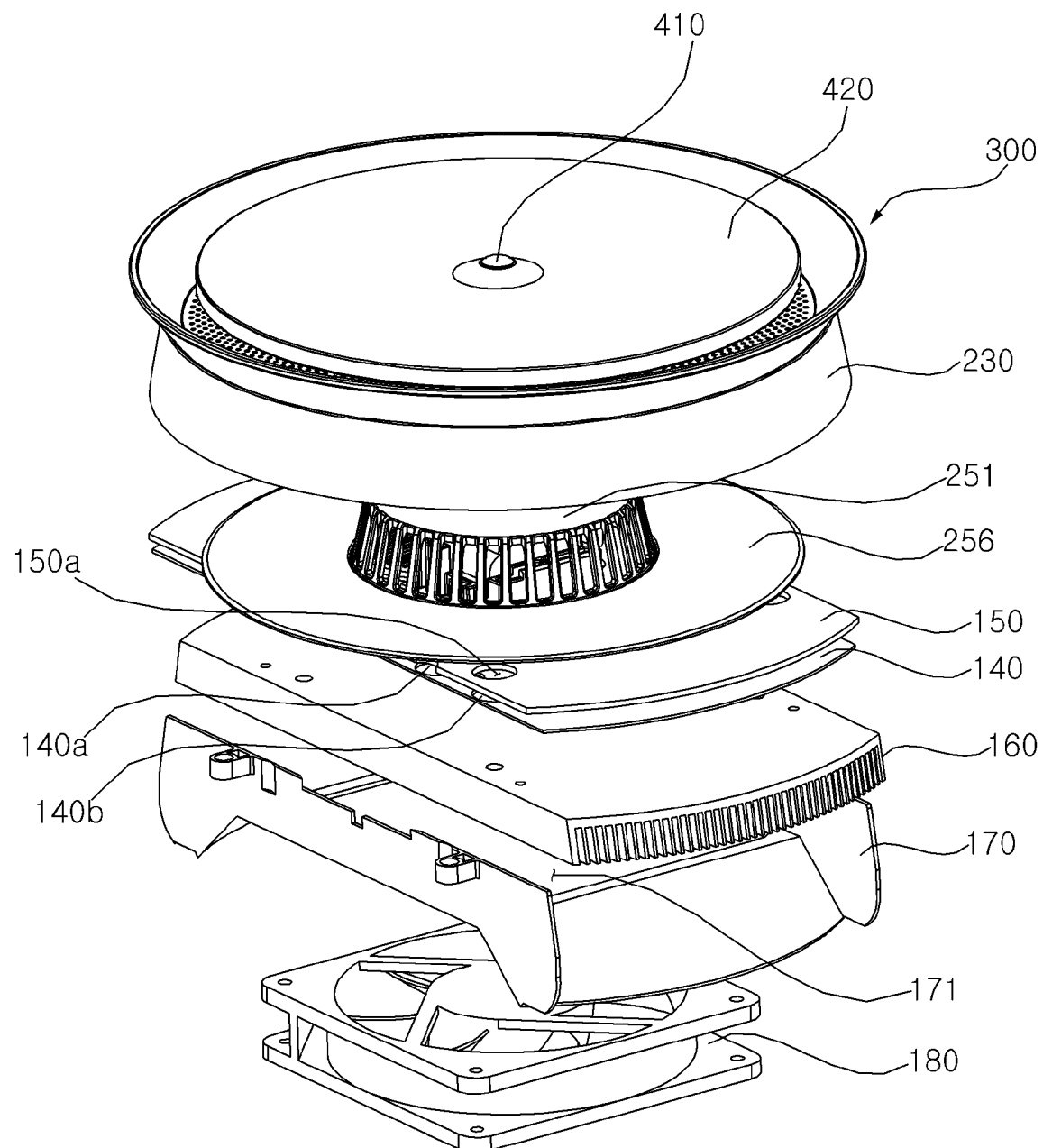
FIG. 9C is an exploded perspective view of the base of FIG. 9A under a filter assembly and top plate.

A plurality of plates 130, 140, and/or 150 may be provided between the heat sink 160 and upper frame 110. The plates 130, 140, and 150 may be referred to as heat sink isolation plates or insulating plates, and will be described in more detail with reference to FIGS. 9A-9C. The plates 130, 140, and 150, the upper frame 110, and the bottom of the container 200 may all include openings through which the sterilizing light 194, liquid temperature sensor 193, and metal 191a mounted on the heat sink 160 may be exposed to the liquid in the container 200. The outer wall 210 of the container 200 may be inserted into the guide groove 119, the inner wall 220 may be provided within the guide rib 113, and the bottom of the container 200 may be configured to fit within an opening 112a of the upper frame 110. Details of a bottom of the container 200 will be described with reference to FIG. 5C.

The pet water dispenser 1 may have a sleek and efficient design to cool and dispense flowing water to a pet. The top plate 420, plate support 430, filter guide 320, container 200, secondary filter 240, bottom cover 250, and upper and lower frames 110 and 120 of the base 100 may be made of Acrylonitrile Butadiene Styrene (ABS) plastic, thermoplastic, or polycarbonate (PC). The filter top 320 and the secondary filter 240 may be made of metal (e.g., stainless steel) or alternatively thermoplastic. The top plate 420 may have a metal or ceramic coating, or alternatively may be made completely out of metal (e.g., stainless steel).

The outer and inner walls 210 and 220 of the container 200 may be transparent, while the upper rim 230 of the container, the top plate 420, plate support 430, filter top 310, filter guide 320, secondary filter 240, bottom cover 250, and upper and lower frames 110 and 120 of the base 100 may be opaque. In an alternatively embodiment, the outer and inner walls 210 and 220 of the container 200 may be made of glass, and the upper rim 230, the top plate 420, plate support 430, filter top 310, filter guide 320, secondary filter 240, bottom cover 250, and upper and lower frames 110 and 120 may be made of stainless steel or may be coated with ceramic to give a sleek appearance.

Figure 3A:
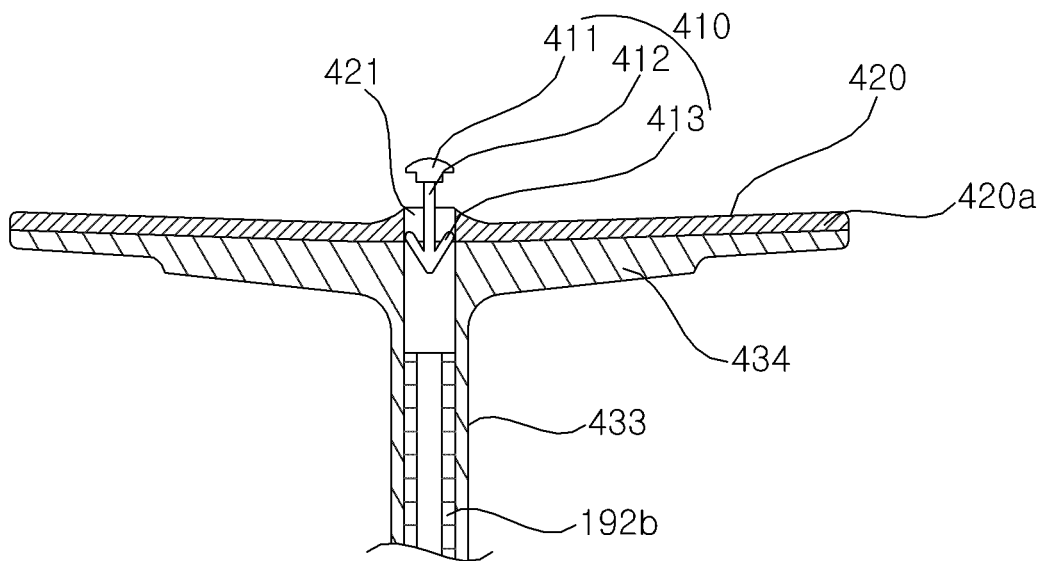
FIG. 3A is a side sectional view of a dispensing assembly according to an embodiment.

In more detail, referring to FIGS. 1F, 2A, and 3A, the dispensing assembly 400 may include an uppermost surface of a lid. The top plate 420 may be provided above a central portion of the container 200, and the plate support 430 may be partially inserted into the container 200. The plate support 430 may be bonded or welded to the top plate 420, or the top plate 420 may be pressed-fitted onto the plate support 430. The plate support 430 may have a hole 431 provided below the hole 421 of the top plate 420.

An upper surface of the top plate 420 may be inclined or sloped upward toward the hole 421, and may also be inclined or sloped upward toward the edge 420a of the top plate 420. There may be a predetermined angle or inclination of the upper surface toward the edge 420a with respect to a horizontal axis parallel to the floor. The predetermined angle of the upper surface may be between 0° and 45° (e.g., 2°). The inclination of the upper surface of the top plate 420 may be constant. Alternatively, the upper surface of the top plate 420 may have a concave curvature to facilitate a collection of liquid. As another alternative, the upper surface of the top plate 420 may be inclined downward toward the outer edge 420a to facilitate a falling of liquid off the outer edge 420a of the top plate 420. The dispensing assembly 400 exemplified in the figures may be easily swapped with an alternative dispensing assembly to suit different species of pets.

The outer edge 420a of the top plate 420 may be curved to allow liquid to easily roll off the outer edge of the top plate 420. The upper surface of the top plate 420 may be a smooth surface. The upper surface of the top plate 420 may be manufactured to be a hydrophobic surface to facilitate movement of liquid flowing over the upper surface, but is not limited thereto. The top plate 420 may be made of metal or plastic. Although the top plate 420 is illustrated as a disc, it may be formed in a different shape. For example, the top plate 420 may be formed in a rectangular plate shape, a hexagonal shape, or a triangular plate shape. Alternatively or in addition thereto, the top plate 420 may include optional ribs or guide grooves to guide a flow of liquid across the upper surface of the top plate 420.

When the pump 192 is turned off, liquid may pool near a rim of the hole 421 and may not be recovered back through the hole 421 due to an inclined surface around the rim of the hole 421. The inclined surface around the rim of the hole 421 may prevent a backflow of liquid back into the pipe 192b. Alternatively, the top plate 420 may be configured such that a surface or rim near the hole 421 is inclined downward, and the hole 421 may have a larger width or diameter than width of the pipe 192b. In such a configuration, liquid remaining on the top plate 420 after the pump 192 is turned off may be recovered back through the hole 421 into the container 200. As another alternative, the top plate 420 may be curved or inclined downward from the hole 421 to the outer edge 420a, and when the pump 192 is turned off, liquid remaining on the top plate 420 may continue to fall off the outer edge of the top plate 420.

Although the hole 421 is shown to be at a center of the top plate 420, a position of the hole 421 is not limited thereto and may be provided at other locations. A position of the hole 431 of the support plate 430 may correspond to a position of the hole 421 of the top plate 420. A position of the pump outlet 192a may correspond to a position of a lower end of the pipe support 433. The holes 421 and 431 may have widths or diameters equal to an inner width or diameter of the pipe support 433. Alternatively, upper portions or heads of the holes 421 and 431 may have diameters that increase from lower portions of the holes 421 to the upper surface of the top plate 420.

An upper surface of the support plate 430 may include spokes or ribs 432 to support the top plate 420 and/or add rigidity to the dispensing assembly 400. Alternatively, spokes or ribs may be provided on a lower surface of the top plate 420. The spokes may be supporting ribs that have an angle of inclination equal to the predetermined angle of inclination of the top plate 420. The support plate 430 may be easily detached or removed from a filter top 310 of the filter assembly, and the dispensing assembly 400 may be easily swapped with another dispensing assembly 400 having a differently shaped top plate 420.

A lower surface of the support plate 430 may include a protruding portion 434 configured to fit into a rim or flange 324 of the filter assembly 300 and to lower a center of gravity of the support plate 430. A circumference of the protruding portion 434 may be substantially the same or slightly smaller than a circumference of the opening 311 of the filter top 310 such that the dispensing assembly 400 sits on the filter assembly 300 and an inside of the container 200 is substantively sealed from ambient temperature. The protruding portion 434 may couple to or to seal openings 311 and 321 of the filter top 310 and filter guide 320 described later.

The pipe support 433 may extend from a bottom surface of the protruding portion 434 below the hole 431 into the container 200. The pipe support 433 may be a hollow cylinder or cylindrical shell. The pipe 192b may have an inlet connected to the pump outlet 192a, extend through a passage of the pipe support 433, and have an outlet connected to or in communication with the holes 421 and 431 of the top plate 420 and the plate support 430.

The pipe 192b may be flexible, and the pipe support 433 may support the pipe 192b to extend in a vertical direction. Alternatively or in addition thereto, the flexible pipe 192b may be curved to have a plurality of U-shaped bends over the metal 191b of the Peltier device 191a before extending through the pipe support 433 so that liquid flowing through the pipe 192b may be additionally heated or cooled by the metal 191b.

Alternatively, the pipe 192b may be formed of a rigid material, in which case, the pipe support 433 may primarily serve to protect the pipe 192b instead of supporting the pipe 192b. In such an alternative embodiment, the pipe support 433 may be optional. In another embodiment, the pipe 192b may be omitted, and the pipe support 433 may be configured to couple to the pipe outlet 192a and serve as a pipe to the hole 421.

An inner surface of the pipe support 433 and optionally the holes 421 and 431, respectively, of the top plate 420 and the plate support 430 may have grooves. The float 410 may include a head 411, a stem 412, and engagement hooks or ribs 413 that fit within the grooves of the pipe support 433 so that the float 410 may move up and down within the holes 421 and 431. Alternatively, the ribs 413 may be configured to keep the float 410 at a fixed position within the holes 421 and 431, and the float 410 may serve as a diverter that remains partially inserted into the holes 421 and 431 and does not move up and down.

The ribs 413 may be vertical extensions that are inclined outward from a bottom end of the stem 412, and may form a V shape. Inner ends of the ribs 413 may join at the bottom end of the stem 412 so that the stem 412 may be easily inserted into the pipe support 430. Outer ends of the ribs 413 may have optional hooks or vertical walls that fit within the grooves of the pipe support 430. The ribs 413 may be pliable and bend slightly inward from the bottom end of the stem 412 so that the outer ends may move toward the stem 412 and fit within the pipe support 430.

Figure 3B:
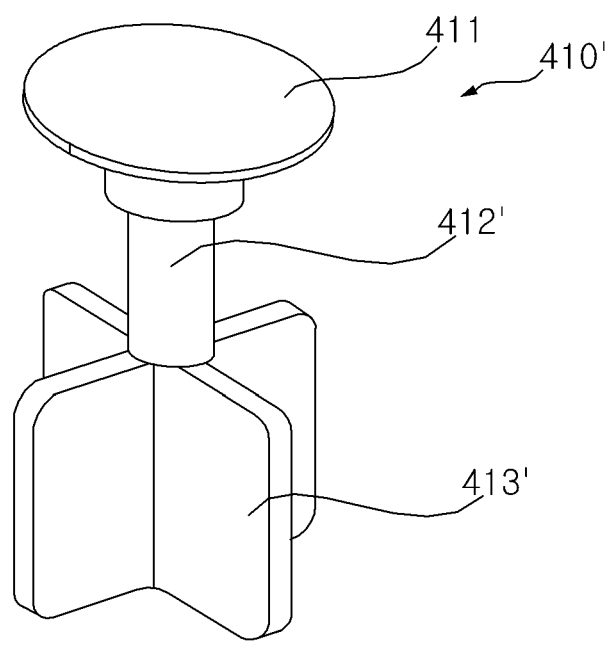
FIG. 3B is a perspective view of an alternative float.

Referring to FIG. 3B, an alternative float 410' may differ from the float 410 only in that the ribs 413' may be vertical walls or plates extending from an outer circumferential surface of the stem 412. Outer edges or sides of the ribs 413' may fit within the grooves of the pipe support 430. As exemplified in FIG. 3B, there may be four ribs 413' provided at 90° from each other around the stem 412. The inner surface of the pipe support 430 may have four corresponding vertical grooves along which the vertical sides of the ribs 413' may move.

Referring back to FIGS. 2A and 3A, the stem 412 may have a width or diameter that is smaller than a width or diameter of the holes 421 and 431, while the head 411 may have a width or diameter that is larger than a width or diameter of the holes 421 and 431. The head 411 may resemble a dome or cap and have a semicircular cross-section. Alternatively, the head 411 may have a truncated cone or trumpet head shape having a wide upper end and a narrow lower end. The stem 412 may have a T shape, and the head 411 may be bonded or welded to the top end of the stem 412. Alternatively, the head 411 and the stem 412 may be manufactured together as a single element.

When water is discharged from the hole 421 of the top plate 420, the water may be sprayed between an upper edge of the hole 421 and a bottom edge of the head 411. A water film may be sprayed to cover the upper surface of the top plate 420, and water may cascade off the edge 420a of the top plate 420 into the filter assembly 300. Shapes of the head 411 and the hole 421, along with a pumping capacity of the pump 192, may be configured such that a horizontal (or radial) speed or velocity component of liquid discharged through the hole 421 may be large enough to overcome the predetermined angle or inclination of the top plate 420 so that the liquid may flow over or drop off of the edge 420a. The float 410 may therefore serve as a diverter that changes a direction of a flow of liquid from upward to horizontally or outward.

Referring to FIGS. 2A and 4A-4D, the filter assembly 300 may define an outer portion of the lid. The filter top 310 and filter guide 320 of the filter assembly 300 may be provided below the top plate 420 and plate support 430 of the dispensing assembly 400 so that the filter guide 320 may catch liquid falling off the outer edge 420a of the top plate 420. The filter top 310 may be optionally installed. The filter top 310 and the filter guide 320 may be welded, bonded, or adhered together, or alternatively the filter top 310 may be pressed-fit onto the filter guide 320.

The filter top 310 may be made of metal, and may include the first filter surface 312 and an inclined wall or filter guard 313. The filter top 310 may also be referred to as a drip tray. The inclined wall 313 may be a wall that is inclined outward from the first filter surface 312. Liquid may fall onto the filter top 310, and may be prevented from splashing outside of the pet water dispenser 1 by the inclined wall 313. The first filter surface 312 may have a flat plate or ring shape, and may include a plurality of through holes through which contaminants may be filtered. The through holes of the first filter surface 312 may have at least one of a circular shape, arc shape, slot shape, or other appropriate hole shapes to filter contaminants, and a size of the holes may be uniform or may be different based on the size of the contaminants to be filtered.

Figure 4A:
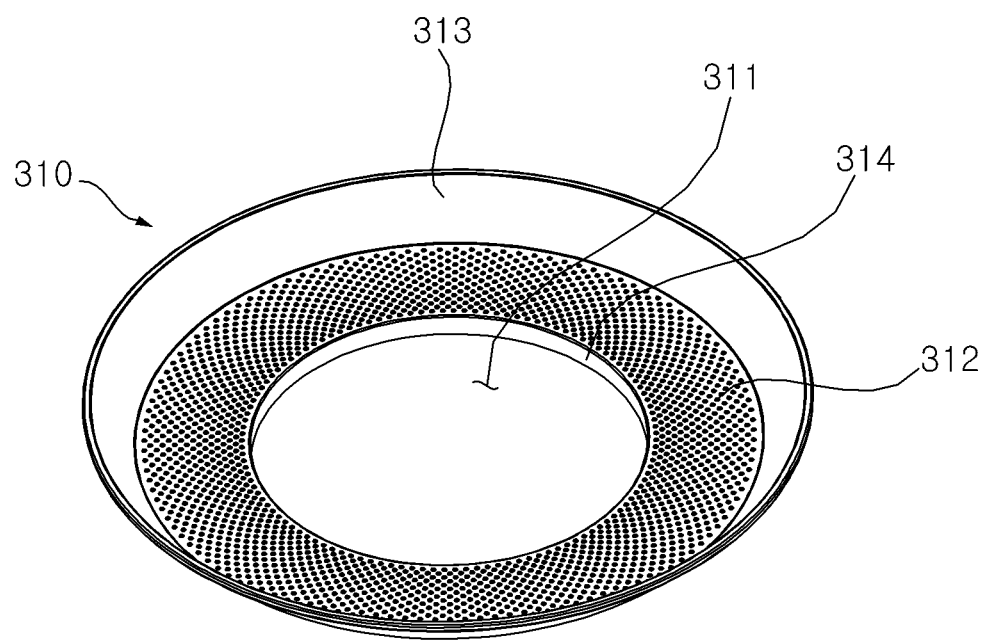
FIG. 4A is a perspective view of a filter top.
Figure 4B:
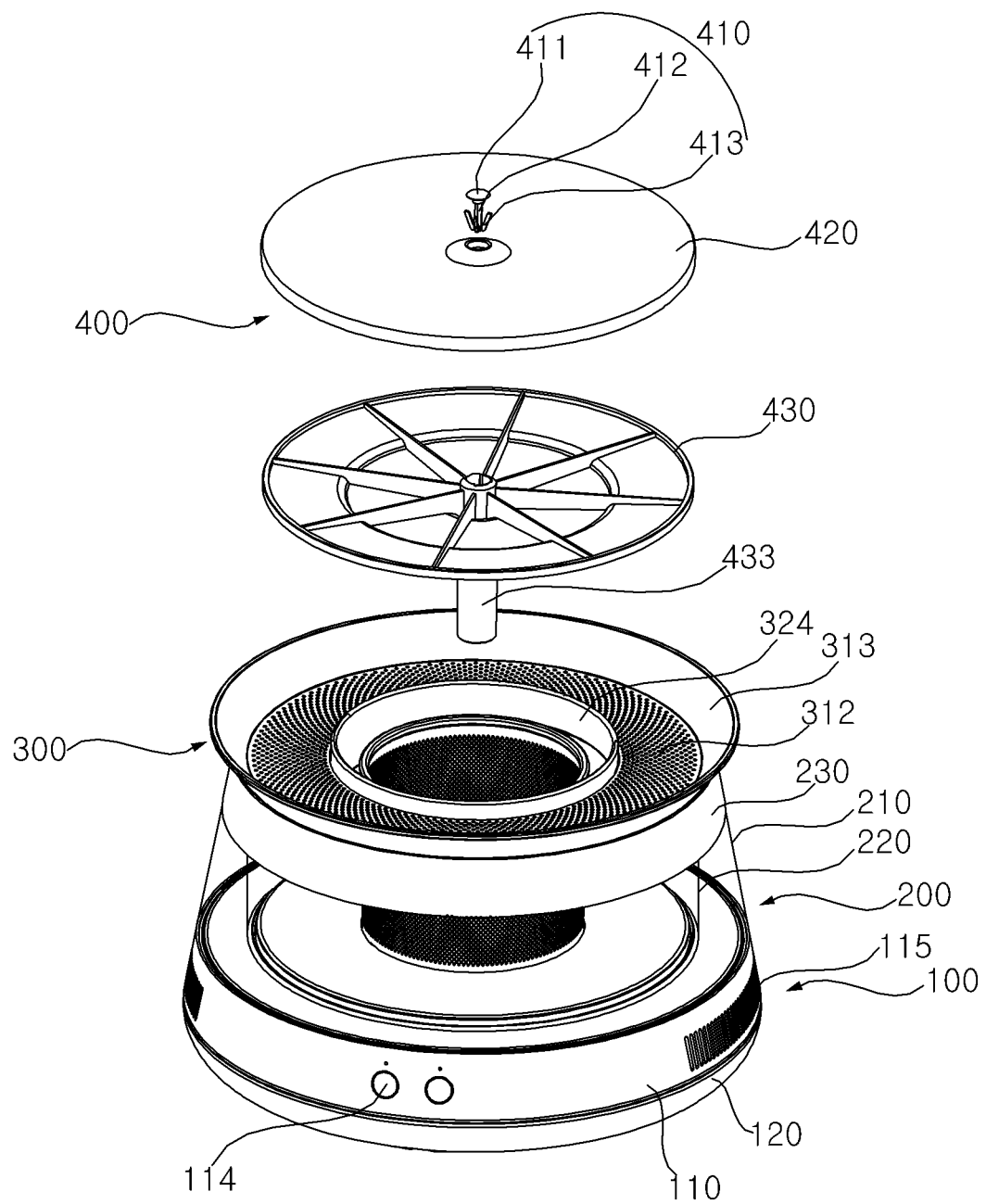
FIG. 4B is an exploded perspective view of a dispensing assembly removed from the filter assembly.

As shown in FIGS. 4A and 4B, the filter top 310 may include an inner rim 314 defining the inner opening 311. The inner rim 314 may extend downward from an inner edge of the first filter surface 312, and may be provided around the flange 324 of the filter guide 320. The inner rim 314 may have a diameter that is equal to or greater than a diameter of the flange 324. The inner rim 314 may maintain a space between the filter top 310 and the filter guide 320 when the filter top 310 is coupled to the filter guide 320. The flange 324 may protrude upward from the inner opening 311 of the filter top 310 so that the protruding portion 434 of the plate support 430 may be inserted onto the flange 324.

The filter guide 320 may be made of plastic, and may optionally have an inclined wall or guide guard 323 corresponding to the inclined wall 313 of the filter top 310. The inclined wall 323 may be a wall inclined outward from a guide surface 322 of the filter guide 320. The inclined wall 313 of the filter top 310 may have a similar or same inclination as the inclined wall 323 of the filter guide 320 and may be provided on the inclined wall 323 of the filter guide 320.

Figure 4C:
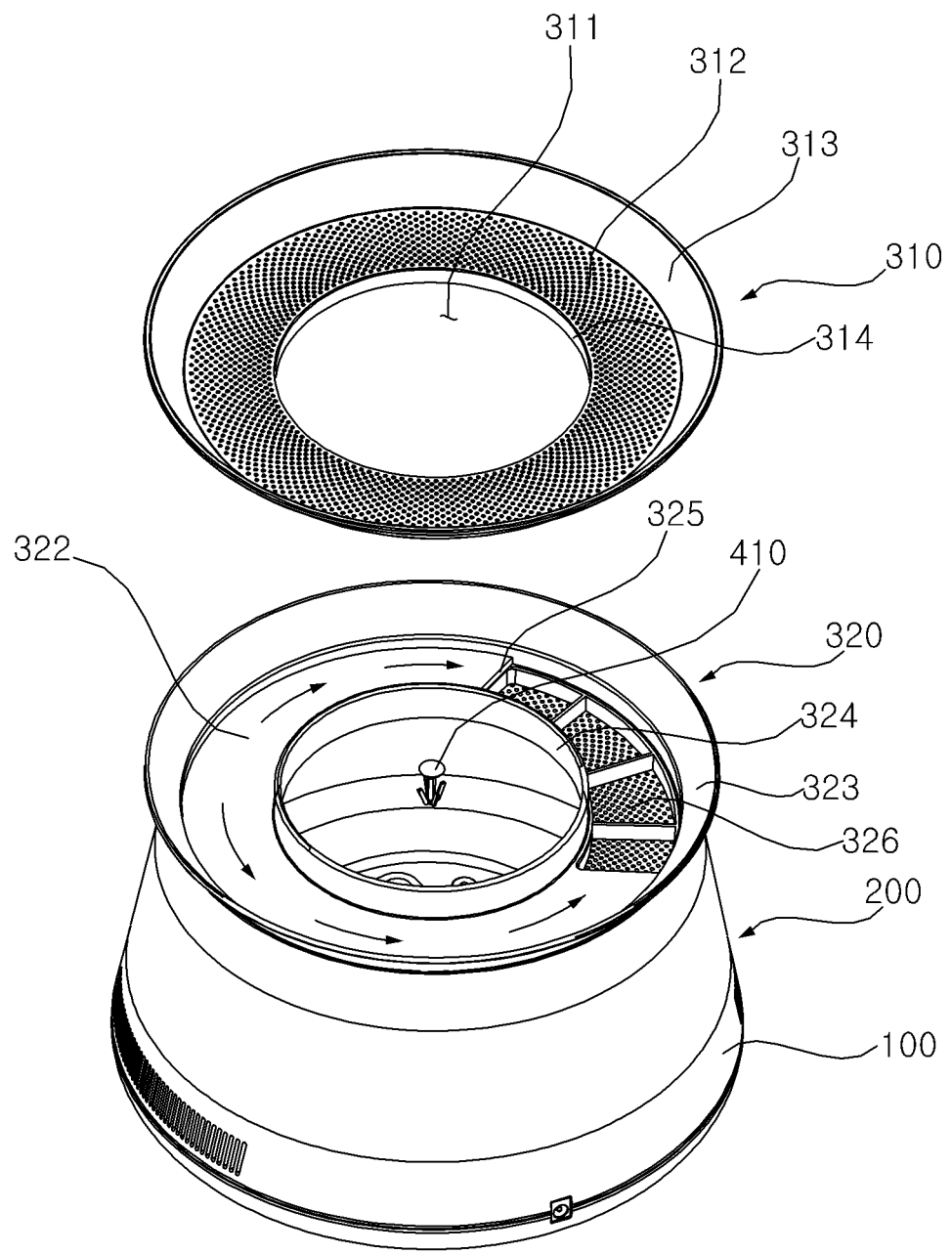
FIG. 4C shows a filter top removed from a filter guide.
Figure 4D:
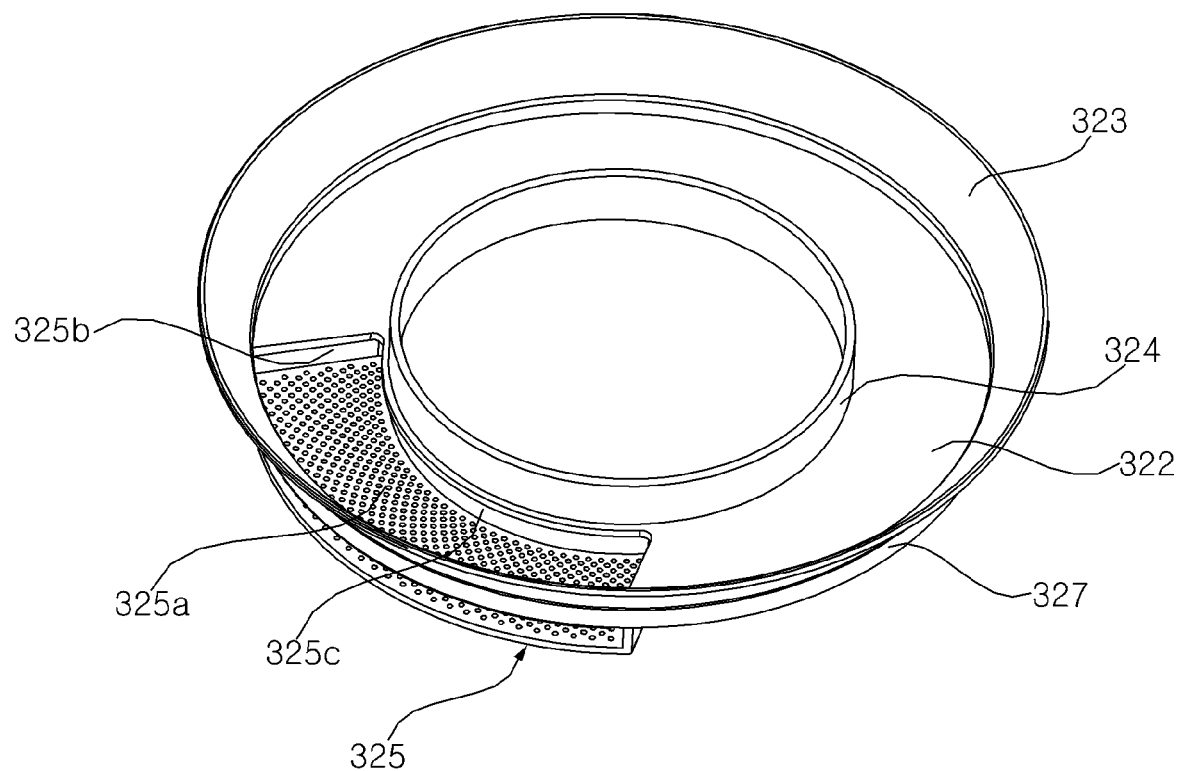
FIG. 4D is a perspective view of a filter guide.

FIG. 4B shows the dispensing assembly 400 removed from the filter assembly 300, while the filter assembly 300 is seated on the upper rim 230 of the container 200. When the filter assembly 300 is placed on top of the container 200, the inclined walls 313 and 323 of the filter top 310 and filter guide 320 may protrude outward from the upper rim 230, and a predetermined angle (e.g., 120°) may be set between the upper rim 230 and the inclined walls 313 and 313. FIG. 4C shows the filter top 310 removed from the filter guide 320, while the filter guide 320 is still seated on the container 200.

Heights of the inclined walls 313 and 323 may be coplanar with the top plate 420 or may be less than a height of the top plate 420 to facilitate consumption. Alternatively, heights of the inclined walls 313 and 323 may be greater than a height of the top plate 420 to further prevent liquid from splashing outside of the pet water dispenser 1. A space or gap may be formed between top ends of the inclined walls 313 and 323 and the edge 420a of the top plate 420, and a size of the space may be configured to allow pets easy access to liquid falling from the edge 420a of the top plate 420.

A bottom rim 327 may extend downward from a bottom of the guide surface 322 and/or the inclined wall 323. The bottom rim 327 may be a vertical wall. The inclined wall 323 may be seated onto the upper rim 230 of the container 200, and an upper end of the inclined wall 323 may protrude out of the container 200. The predetermined angle may be formed between the upper rim 230 and the inclined wall 323 of the filter guide 320. The lid of the container 200 may be easily lifted out of the container 200 by the filter assembly 300 to facilitate easy cleaning and refilling of liquid.

When the filter assembly 300 is seated on the upper rim 230 of the container 200, the filter assembly 300 and the dispensing assembly 400 may together substantially seal an upper opening of the container 200 to thermally insulate the container 200 and prevent foreign matter from dropping into the container 200. The filter assembly 300 may close an outer edge of the upper opening by being seated on the upper rim 230 of the container 200, and the dispensing assembly 400 may close an inner portion of the upper opening, as the protruding portion 434 of the support plate 430 may cover openings of the 311 and 321 of the filter top 310 and the filter guide 320. The protruding portion 434 may be seated on the flange 324 of the filter guide 420.

The guide surface 322 may be a bottom surface of the filter guide 320, and may extend from an inner, upper portion of the bottom rim 327 or alternatively from a lower, inner end or portion of the inclined wall 323. The guide surface 322 may be inclined to allow water to flow downward toward an opening or a filter slot 325, similar to a ramp surface, as exemplified in FIG. 4C. The guide surface 322 may also be inclined or sloped inward from the lower end of the inclined wall 323 toward the flange 324 and/or the opening 321 so that liquid is guided toward an inner edge of the guide surface 322 (see also FIG. 5A).

Liquid that is filtered through the first filter surface 312 may drop down to the guide surface 322 and may be guided downward toward the filter slot 325. The filter top 310 may be coupled to the filter guide 320 such that the first filter surface 312 is spaced apart from the guide surface 322 and to allow free flow of the liquid. The guide surface 322 may resemble a ramp that curves in a ring shape, with ends of the ramp being provided at a height lower than a middle portion of the ramp so that liquid falling through the first filter surface 312 onto the guide surface 322 may be guided toward the filter slot 325 to be further filtered and returned to the container 200. Since liquid may travel along the guide surface 322 under the first filter surface 312, noise from water dropping directly into the container 200 through the first filter surface 312 may be reduced.

The filter slot 325 may include walls 325b and 325c protruding downward from the bottom of the guide surface 322 and the second filter surface 325a. There may be two side walls 325b and a rear wall 325c that extend downward from the guide surface 322, and the second filter surface 325a may extend between the walls 325b. An upper surface of the filter slot 325 may be an opening in the guide surface 322, while the bottom surface of the filter slot 325 may be defined by the second filter surface 325a. The second filter surface 325a may be a plate and include a plurality of through holes through which liquid is filtered. Similar to the holes of the first filter surface 312, a size and shape of the holes for the second filter surface 325a may be adjusted based on types of contaminants to be filtered.

A filter tray 326 may be placed inside of the filter slot 325, and may have an outer perimeter having the same dimensions as the inner perimeter of the filter slot 325. A front surface of the filter slot 325 may include an opening through which the filter tray 326 may be inserted, while the side and rear walls 325b and 325c may house the filter tray 326.

A filter material (e.g., carbon filter, mesh filter, porous filter, cardboard or accordion filter, strainer etc.) may be provided in the filter tray 326 to additionally filter the liquid and to insulate the container 200 when the dispensing assembly 400 and filter assembly 300 are placed over the container 200. Liquid may fall onto the filter top 310, filter through the first filter surface 312, flow along the guide surface 322 of the filter guide 320, flow through the filter material of the filter tray 326, and flow into the container 200 via the second filter surface 325a.

The filter tray 326 may include two side walls corresponding to the side walls 325b of the filter slot 325, a rear wall corresponding to the rear wall 325c of the filter slot 325, and a front wall to seal the filter slot 325. The filter tray 326 may optionally include walls extending between the front and rear walls to hold the filter material. The filter tray 326 and/or the filter material may be easily replaceable. An optional handle may be provided on the front wall to facilitate easy removal.

The top plate 420, plate support 430, filter top 310, and filter guide 320 may cover the upper opening of the container 200 to prevent contamination of liquid stored in the container 200 and to thermally insulate the liquid in the container 200. The first filter surface 312 may prevent foreign matter such as food on a mouth or snout of a pet from falling into the container, and the filter material of the filter tray 326 and the second filter surface 325a may further filter foreign matter from the liquid before the liquid returns to the container 200.

The openings 311 and 321 of the filter top 310 and filter guide 320 may be provided at centers of the filter top 310 and the filter guide 320. The flange 324 may surround the opening 321 of the filter guide 320 and insert into the opening 311 of the filter top 310. The protruding portion 434 of the plate support 430 may at least partially insert into the openings 311 and 321 of the filter top 310 and the filter guide 320, and an outer bottom surface of the plate support 430 may rest on the flange 324 of the filter guide 320. The secondary filter 240 provided in the container 200 may fit within the openings 311 and 321 of the filter top 310 and the filter guide 320. More details on the secondary filter 240 will be provided with reference to FIG. 6.

Referring to FIGS. 2A and 5A-5C, the container 200 may be formed of the outer wall 210, the inner wall 220, and the upper rim 230. The inner and outer walls 220 and 210 may be molded as one piece (e.g., injection molded plastic), or may be manufactured separately and later combined by connected top ends of the outer and inner walls 210 and 220. Alternatively, the inner and outer walls 220 and 210 may be injection molded together in halves (e.g., left and right halves each having a half of the inner wall 220 and the outer wall 210), and the halves may be bonded or fused together.

The upper rim 230 may fit onto and over the top ends of the outer and inner walls 210 and 220. The outer wall 210 may include a stepped portion 211 leading into a recessed upper rim of the outer wall 210. The inner wall 220 may also include a stepped portion 224 leading into a recessed upper rim of the inner wall 220. The upper rim 230 may be formed in an upside-down V-shape to be provided onto the recessed upper rims of the inner and outer walls 220 and 210. The upper rim 230 may be configured such that when the upper rim 230 is pressed-fit and/or adhered onto the recessed upper rims of the inner and outer walls 220 and 210, there may be a seamless outer surface from the outer wall 210 to the upper rim 230. The upper rim 230 may cover the connected top ends of the inner and outer walls 220 and 210, and may be detachable.

Alternatively, the upper rim 230 may be omitted. In such a case, the outer and inner walls 210 and 220 may not include stepped portions 211 and 224, respectively, and shapes or inclinations of the outer and inner walls 210 and 220 may be configured to support the filter assembly 300. When the upper rim 230 is omitted, the outer and inner walls 210 and 220 join at upper ends to cover a space S1 formed between the inner and outer walls 210 and 220.

As another alternative, when the upper rim 230 is included, ends of the outer and inner walls 210 and 220 may not join, and the upper rim 230 may serve to cover the space S1. In such a case, the upper rim 230 may be further adhered or sealed to the stepped portions 211 and 223 of the outer and inner walls 210 and 220 to secure the outer wall 210 to the inner wall 220 and to seal the space S1.

The inner wall 220 may be cylindrical, while the outer wall 210 may be inclined outward from the top end of the inner wall 220. The upper rim 230 may be inclined to match an inclination of the outer wall 210. The container 200 as a whole may have a trapezoidal cross section or truncated cone shape having an upper end that is narrower than a lower end, but shapes of the container 200 are not limited to a truncated cone shape. For example, the outer wall 210 may also be cylindrical, and the upper rim 230 may not have an inclination. Such a configuration would render the container 200 cylindrical. When the container 200 has a truncated cone shape having a diameter that diminishes from the bottom end to the top end, a center of mass of the container 200 may be lower, and the container 200 may be stably positioned on the floor.

Lower ends of the inner and outer walls 220 and 210 may be spaced apart from each other. A space S1 may be provided between the inner and outer walls 220 and 210, and air may fill the space to insulate the container 200 and keep the liquid in the container 200 cool (or alternatively, warm). The inner and outer walls 220 and 210 may be a transparent material (e.g., glass or plastic) so that a user may visually check a liquid level or a possible contamination of liquid in the container 200, while the upper rim 230 may be made of an opaque material (e.g., stainless steel or pigmented plastic) to enhance aesthetics of the container 200.

The inner wall 220 may also include a bottom surface including an outer bottom surface 221 and an inner bottom surface 223. The inner bottom surface 223 may be provided to be lower than the outer bottom surface 221, and a vertical wall or extension 222 may connect the inner bottom surface 223 and the outer bottom surface 221. The inner bottom surface 223 may be a circular recess within the bottom of the container 200 and recessed downward from the outer bottom surface 221. The extension 222 may correspond to a vertical wall or flange 112b extending downward to define the opening 112a of the upper frame 110 of the base 100.

The inner bottom surface 223 may be closer to devices (e.g., Peltier device 191b, heat sink 160) provided in the base 100, whereas the outer bottom surface 221 may be raised to be higher and further away from devices (e.g., center plate 130, heat sink 160) in the base 100 that may generate heat. There may be a gap or space S2 between an upper surface of the upper frame 110 of the base 100 and the heat sink 160 so as to further insulate the outer bottom surface 221 of the container 200. The outer bottom surface 221 may be curved from the inner wall 220 to form a curved corner. Alternatively, the inner and outer bottom surfaces 223 and 221 may be formed as a separate piece, and the inner bottom surface 223 may be later bonded or welded to a lower end of the inner wall 200.

Figure 10A:
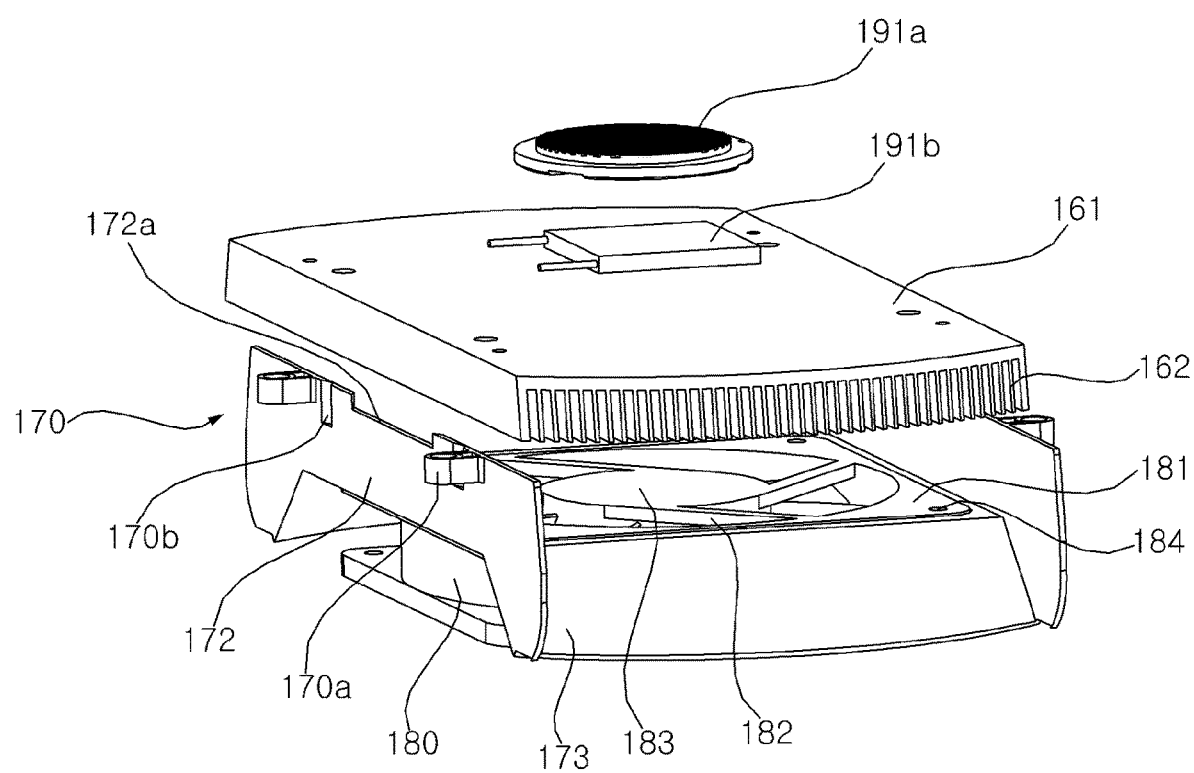
FIGS. 10A-10C show exploded perspective views of a fan, fan housing, heat sink, Peltier device, and Peltier metal, where
Figure 10B:
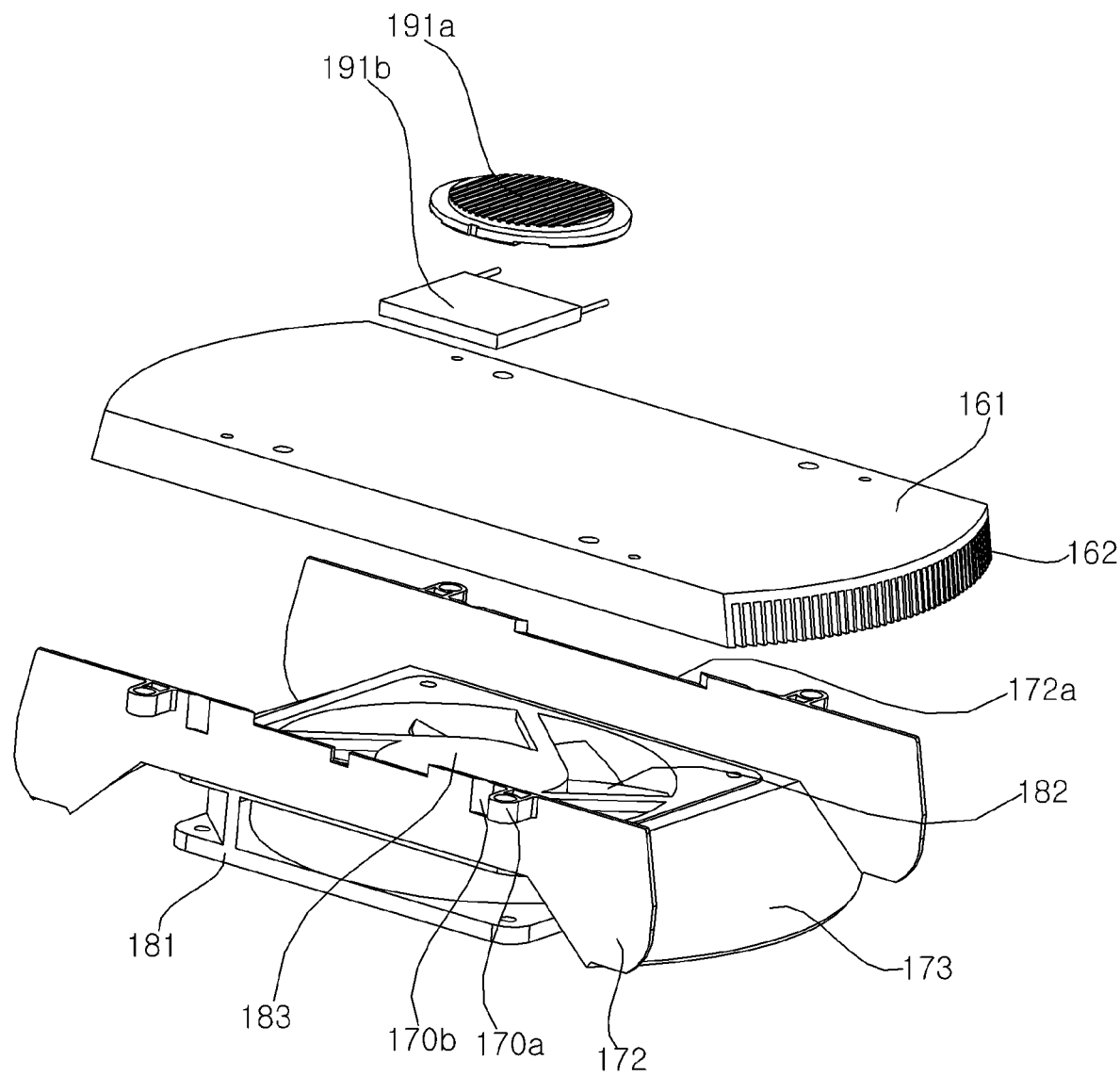
Figure 10C:
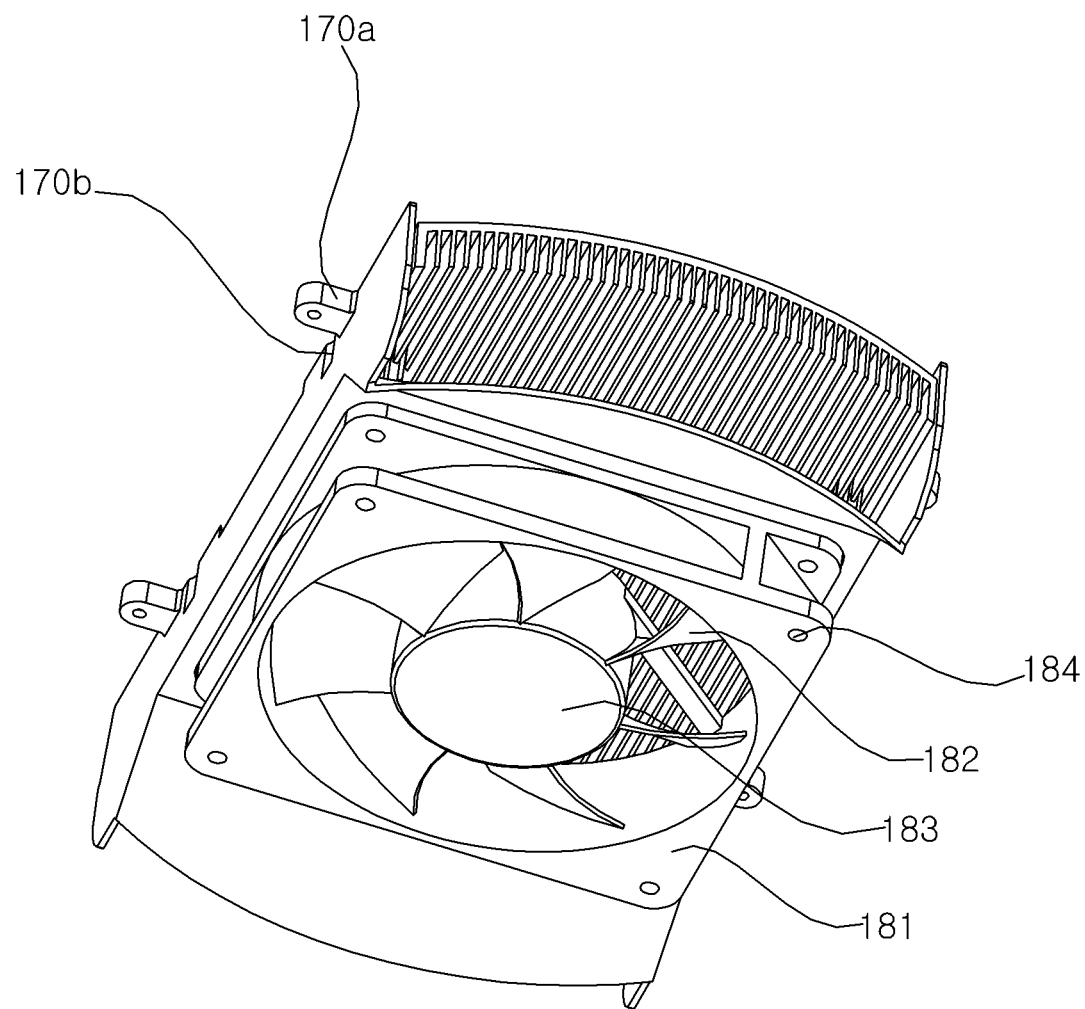
Figure 10D:
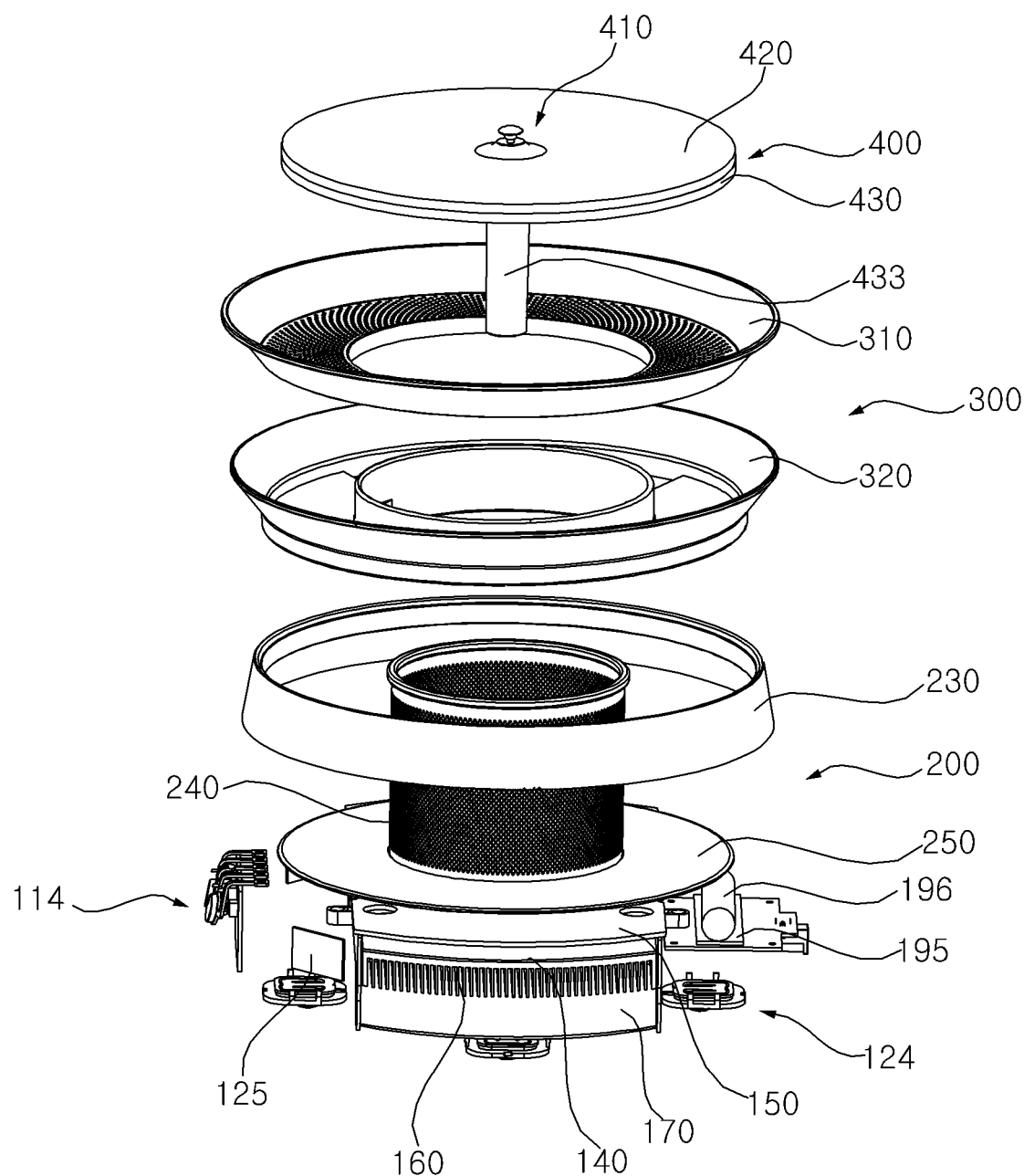
FIG. 10D is an exploded perspective view of the filter assembly, and the top plate, and an assembled view of the base without the upper and lower frames, showing a battery.
Figure 10E:
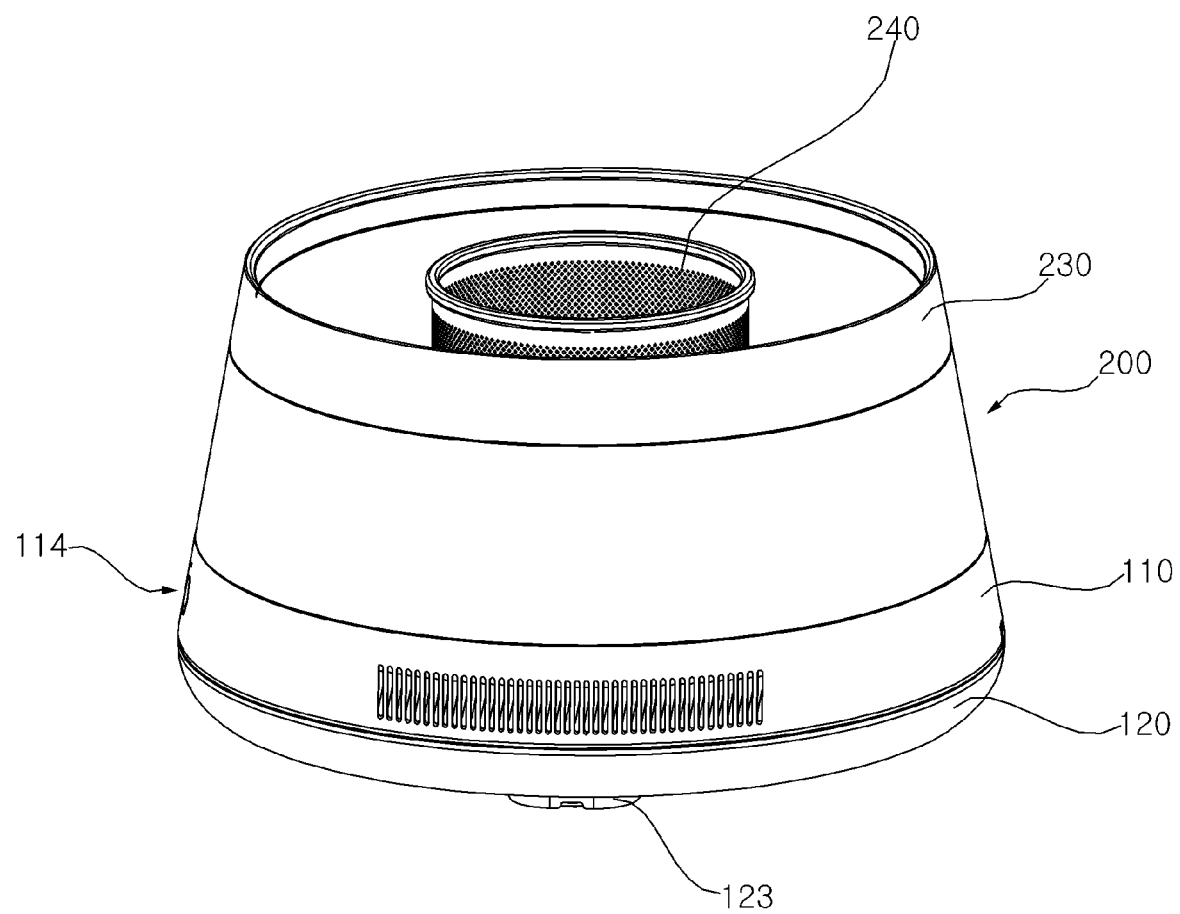
FIG. 10E is a side view of a pet water dispenser with the upper frame included.
Figure 10F:
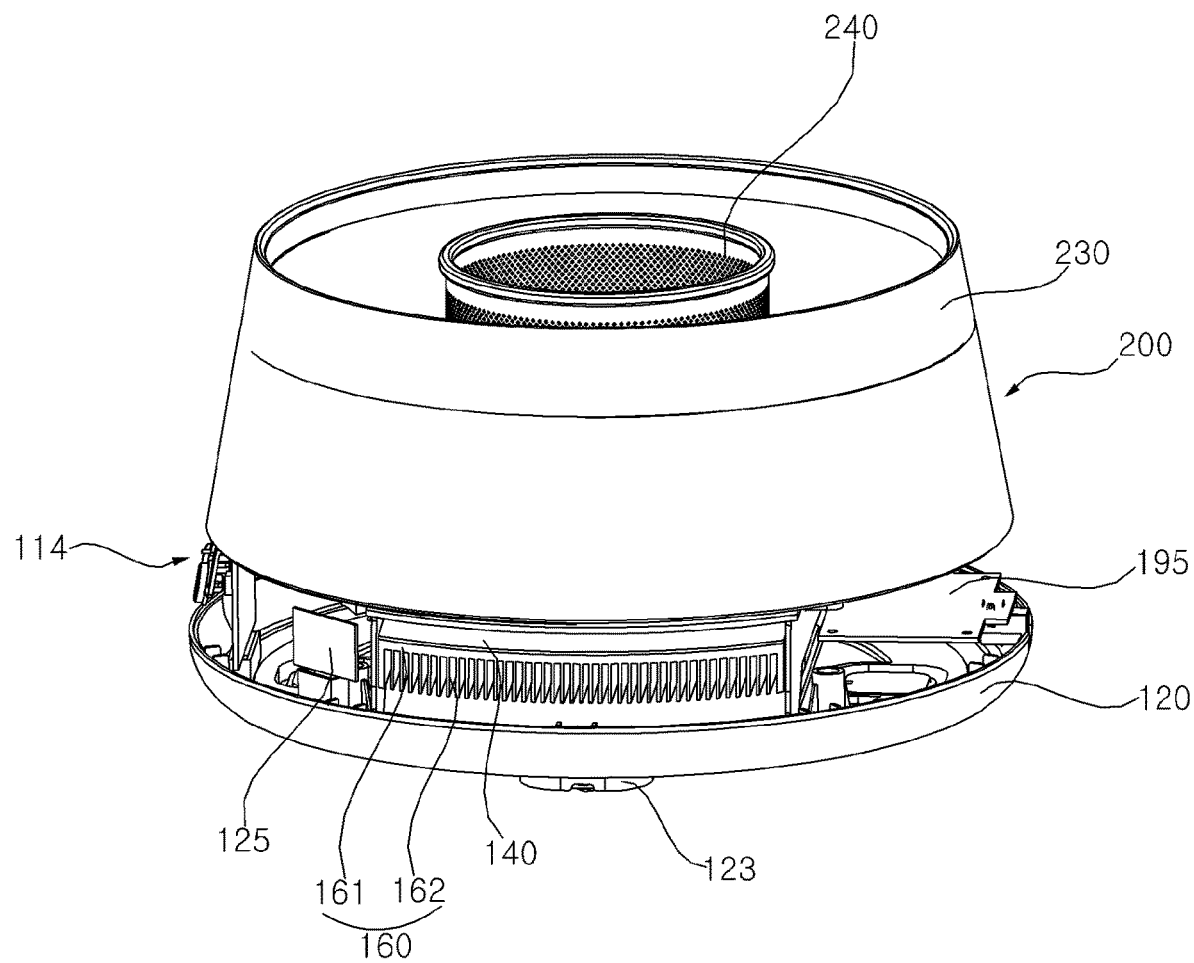
FIG. 10F is a side view of the pet water dispenser of FIG. 10E without an upper frame of the base showing a heat sink.

A diameter of the inner bottom surface 223 may be equal to or less than a diameter of the secondary filter 240. The inner bottom surface 223 may include the pump housing 292 in which the pump 192 may be provided, and may also include a wiring hole 226 through which wires of the pump 192 may be inserted to connect to a printed circuit board 195 and/or a battery 196 provided in the base 100 (FIG. 10D) and to be described later. A sealant or gasket may be provided in the wiring hole 226 to prevent liquid in the container 200 from leaking into the base 100. The inner bottom surface 223 may further include a Peltier hole or opening 225 through which the metal 191a on top of the Peltier device 191b may be exposed. The Peltier hole 225 of the container 200 may have a size and shape corresponding to a size and shape of an upper portion of the metal 191a. A sealant or gasket may be provided in the Peltier hole 225 to prevent liquid in the container 200 from leaking into the base 100. Although a circular metal 191a and Peltier hole 225 is shown, the shapes of the metal 191a and Peltier hole 225 are not limited thereto. For example, the metal 191a and Peltier hole 225 may have a rectangular shape. The inner bottom surface 223 may further include openings or holes through which the sterilizing light 194 and the liquid temperature sensor 193 may protrude, and a sealant or gasket may be provided in the openings for the sterilizing light 194 and the liquid temperature sensor 193 to prevent liquid from leaking into the base 100.

Referring also to FIG. 1F, the pump housing 292 may be provided near a center of the inner bottom surface 223 so that the pump 192 may be provided in a center of the container 200 below the pipe support 433, but positions of the pump housing 292 and the pump 192 are not limited thereto. The Peltier hole 225 may be provided at a side of the pump 192 having a pump inlet 192c so that liquid enters the pump 192 after having been heated or cooled by the Peltier device 192b and metal 191a. The pump inlet 192c may be configured to be adjacent to the metal 191a, and the Peltier hole 225 may be provided near or adjacent to the pump housing 292.

The metal 191a may serve as a heat sink that directly contacts liquid in the container 200 and an upper surface of the Peltier device 191b. The Peltier device 191b may be mounted on a heat sink 160, and details of the Peltier device 191b, metal 191a, and heat sink 160 are described later with reference to FIGS. 10A-10F. There may be a gasket having high thermal conductivity between the Peltier hole 225 and Peltier device 191b to seal the Peltier hole 225 so that liquid does not seep into the base 100. The metal 191a may also be glued or bonded in the Peltier hole 225 so that the Peltier hole 225 may be sealed. The Peltier device 191b may be provided directly under the inner bottom surface 223 of the container 200 so that the liquid in the container 200 may be efficiently heated or cooled before being suctioned into the pump inlet 192c. The Peltier hole 225 may be provided close to the pump housing 292 so that water entering the pump inlet 192c may be cooled (or heated) after passing over the metal 191a.

The pump housing 292 may be formed of at least two walls extending upward from the inner bottom surface 223. As exemplified in FIG. 1F, the pump housing 292 may have three walls to create a housing having an inner perimeter with dimensions (e.g., length and width) equal to dimensions of an outer perimeter of the pump 192. A bumper or gasket having an elastic material (e.g., rubber) may be provided along an inner perimeter of the pump housing 292. The bumper may further secure and cushion the pump 192 within the pump housing 292.

A bottom surface of the pump 192 may also have at least one suction cup to secure the pump 192 to the center of the inner bottom surface 223. The pump housing 292 may be optional, and the pump 192 may attach to the inner bottom surface 223 via the suction cup. The suction cup may also be optional, and the pump 192 may alternatively be secured only within the pump housing 292 of the inner bottom surface 223. The pump 192 may be a submersive or submersion pump.

The inner bottom surface 223 may also include a light housing 294 through which light from a sterilizing light 194 may be guided. The light housing 294 may be a cylindrical shell surrounding an opening in the bottom of the inner bottom surface 223. Alternatively, there may not be an opening, and light from the sterilizing light 194 may radiate through the transparent material of the inner bottom surface 223 and be guided by the light housing 294 upward to sterilize liquid in the container 200.

The sterilizing light 194 may be mounted on the heat sink 160 and/or a center plate or disc 130 provided under the inner bottom surface 223. The sterilizing light 194 may include at least one light emitting diode (LED) or organic light emitting diode (OLED) that emits ultraviolet radiation to sterilize liquid in the container 200. The sterilizing light 194 may also include an LED or LED that emits visible light. The light housing 294 may have a cylindrical shell shaped to shield UV radiation from being emitted directly toward a user's eye's, and may guide or reflect the UV radiation upward to sterilize liquid suctioned into the pump inlet 192c and/or liquid flowing over the pump cover 251. An inner surface of the light housing 294 may be formed of or coated with a reflective material. Alternatively or in addition thereto, the sterilizing light 194 may include a light emitting diode that emits visible light (blue light or yellow light), which may be diffused into the liquid stored in the container 200 to enhance aesthetics.

Figure 8A:
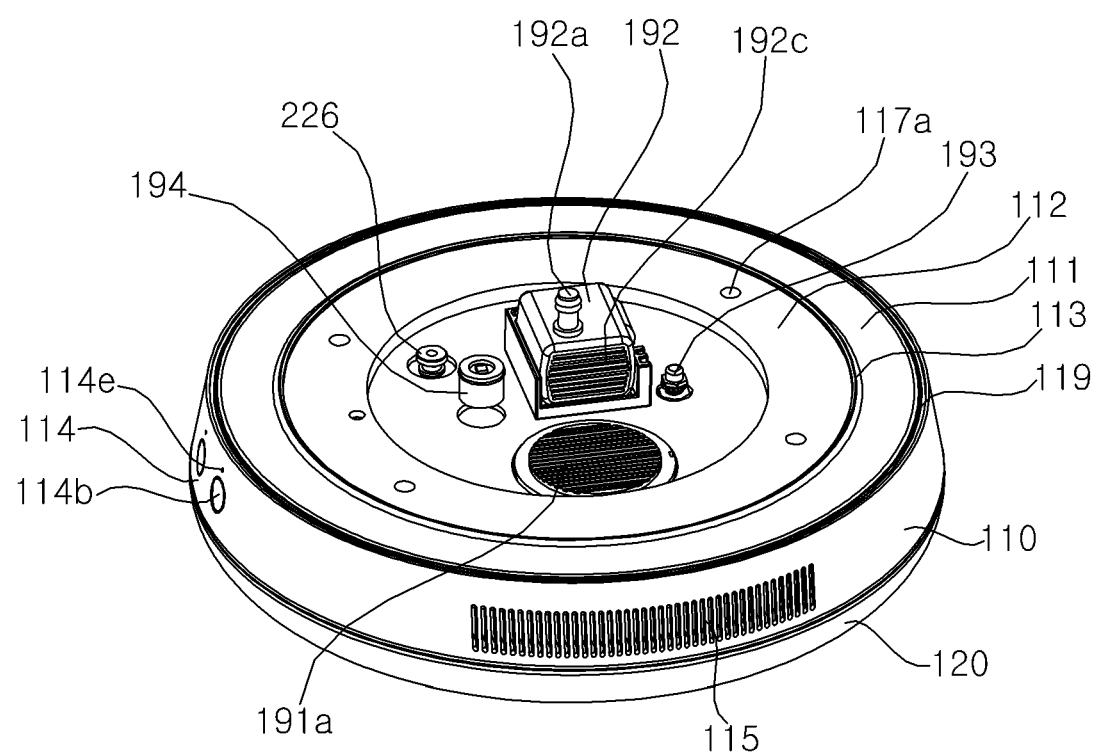
FIG. 8A is a perspective view of a base for a pet water dispenser.
Figure 8B:
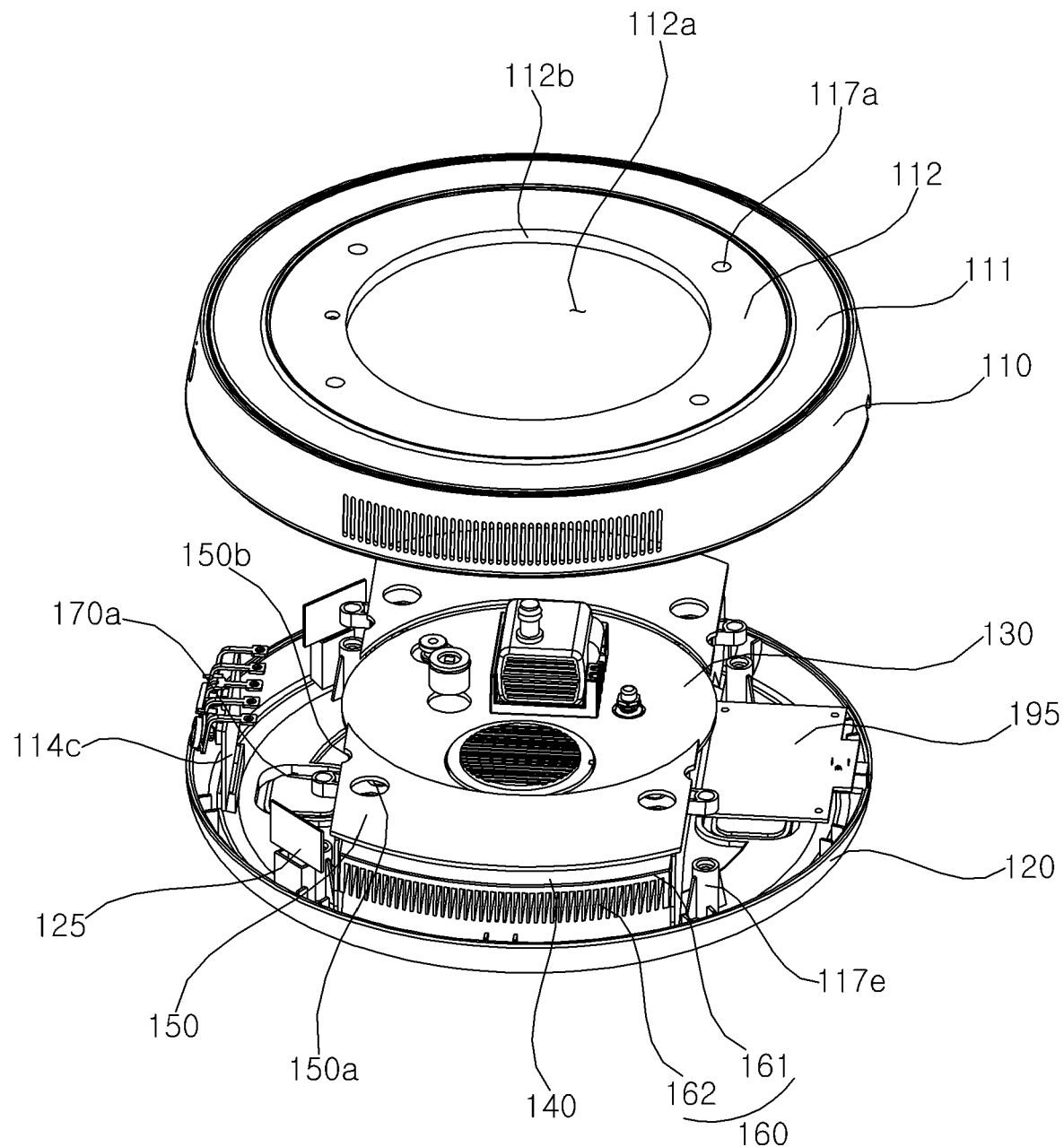
FIG. 8B is a perspective view showing an upper frame of the base of FIG. 8A separated from a lower frame of the base.

A controller C in the base 100, which may be provided on a printed circuit board (PCB) 195 (FIG. 8B), may control the sterilizing light 194 to operate at regular periodic intervals. The user may also select when to operate the sterilizing light 194 via the user interface 114 and/or a mobile application.

The liquid temperature sensor 193 (e.g., thermometer) may protrude through center plate 130 and inner bottom surface 223 to directly contact liquid stored in the container 200 and measure a temperature of the liquid. The liquid temperature sensor 193 may be or include a probe protruding into the container 200. Alternatively or in addition thereto, there may be a contamination level sensor protruding into the container 200 or provided within the container 200 to sense a contamination level of liquid in the container 200. The controller C may operate the sterilizing light 194 based on a contamination level sensed by the contamination level sensor.

The inner bottom surface 223 may be optional, and the extension 222 extending below the outer bottom surface 221 may be welded or bonded to the center plate 130. In such a configuration, the center plate 130 may include the pump housing 292 and the light housing 294. The center plate 130 may include a light hole 132, wiring hole 136, and a Peltier hole 131 (FIG. 9A). Details of the center plate 130 will be described with reference to FIGS. 8A-9C.

Figure 6:
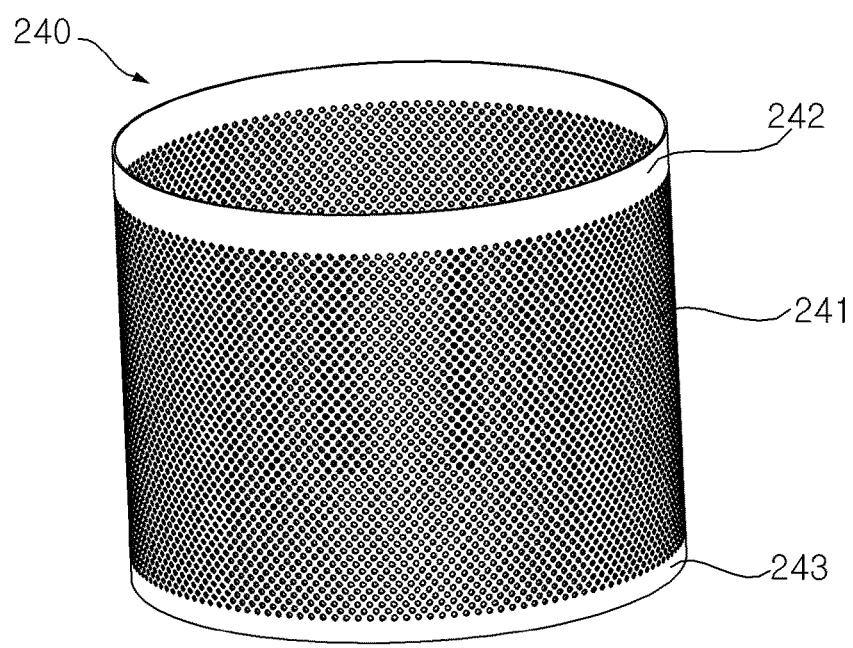
FIG. 6 is a view of a secondary filter.

Referring to FIGS. 2A and 6, the secondary filter 240 may be a cylindrical filter or strainer made of a rigid material (e.g., metal or stainless steel) and may be easily removed from the container 200. The secondary filter 240 may be a strainer having a plurality of through holes 241 to filter foreign matter from liquid. Alternatively, the filter 240 may have a mesh structure. The secondary filter 240 may further include upper and lower rims 242 and 243, respectively. Although FIG. 6 shows that the upper and lower rims 242 and 243 do not have through holes, the upper and lower rims 242 and 243 could optionally include through holes. The secondary filter 240 may be placed on the bottom cover 250 to surround the pump cover 251.

The secondary filter 240 may be cylindrical, as shown in the figures, or alternatively may have a truncated cone shape having a wider upper rim 242 and a narrower lower rim 243 to increase the surface area forming the holes. As an example, such a truncated cone shape may have a greater number of holes. The secondary filter 240 may be hollow on an inside with upper and lower openings so that the pipe support 433 may be easily inserted into the upper opening, and the pump 192 and/or the pump cover 251 of the bottom cover 250 may be easily inserted into the lower opening.

A diameter of the secondary filter 240 may be smaller than diameters or widths of the openings 311 and 321, and a height of the secondary filter 240 may be smaller than a distance from a bottom of the container 200 to a top of the flange 324. The secondary filter 240 may not contact the flange 342 or the plate support 430 when the pet water dispenser 1 is assembled. Alternatively, the secondary filter 240 may be configured to have a height that is equal to a height from the bottom of the container 200 to a top of the flange 324 to provide additional support to the plate support

430. The secondary filter 240 may or may not be required. As another alternative, a height and diameter of the secondary filter 240 may be configured such that the upper rim 242 replaces the flange 324.

The pipe 192b and pipe support 433 may be provided inside of the filter 240, and the secondary filter 240 may serve to hide the inner bottom surface 223 of the container 200, the pipe 192b, and the pipe support 433 to create a more uniform appearance of the pet water dispenser 1. When the secondary filter 240 is placed on the bottom cover 250, the upper rim 242 may at least partially overlap with the flange 324 of the filter guide 320.

The plurality of through holes 241 may filter particles having a size larger than a size of the plurality of the holes 241. Similar to the first and second filter surfaces 312 and 325a, a size and shape of the holes 241 of the secondary filter 240 may be adjusted based on types of contaminants to be filtered.

A size of the plurality of the through holes in the first filter surface 312 may be larger than a size of the plurality of through holes in the second filter surface 325a, which may in turn be larger than a size of the plurality of through holes of the secondary filter 240. The secondary filter 240 may filter smaller particles than the first and second filter surfaces 312 and 325a. Alternatively, the size of the plurality of through holes of the secondary filter 240 may be larger than a size of the plurality of through holes in the first and second filter surfaces 312 and 325a to facilitate a flow of water toward the pump 192. The secondary filter 240 may be optional, and may be configured to have various heights and shapes.

Referring to FIGS. 1E, 5A, 5B, 7A, and 7B, the bottom cover 250 may be made of an opaque material (e.g., pigmented plastic or metal) and may be placed on the bottom of the container 200 to cover the inner and outer bottom surfaces 223 and 221. Since the container 200 may be transparent, the bottom cover 250 may cover the bottom of the container 200 to hide wiring inserted into the wiring hole 226, which may be visible under the transparent bottom of the container 200, and may also hide the pump 192, light housing 294, pump housing 292, sterilizing light 194, and liquid temperature sensor 193.

The outer ring 256 and the pump cover 251 may be manufactured separately and bonded or welded together, or the outer ring 256 may remain separate from the pump cover 251. In such a separate configuration, at least one of the outer ring 256 and the pump cover 251 may be optional. The outer ring 256 may have a ring shape corresponding to the outer bottom surface 221 of the container 200, while the pump cover 251 may have a cap shape having a side surface formed of extensions 254 and/or a side surface having a plurality of holes or openings to allow liquid to flow to the pump 192 provided under the pump cover 251.

A shape of the bottom cover 250 may be configured to correspond to a shape of the bottom of the container 200 within the inner wall 220. Although the figures exemplify a cylindrical inner wall 220, a ring-shaped outer bottom surface 221, and a circular inner bottom surface 223 to correspond to a bottom cover 250 having a ring-shaped outer ring 256 and a circular pump cover 251, embodiments disclosed are not limited to circular shapes.

The pump cover 251 may protrude above the outer ring 256, which may be an outer or flat portion of the bottom cover 250. The pump cover 251 may protrude upward to form an inner space in which the pump 192, pump housing 292, sterilizing light 194, and light housing 294 may be provided. The pump cover 251 may have a cap or dome shape with a height that is equal to or higher than a height of the pump 192 and a lower diameter or width that is similar to a diameter or width of the inner bottom surface 223 of the container 200. A plurality of extensions or ribs 254 may protrude upward from an inner edge of the outer ring 256 to form a side of the pump cover 251. The extensions 254 may be inclined inward from the outer ring 256 toward the pump cover 251.

There may be a plurality of holes or openings formed between the plurality of extensions 254 so that liquid may enter the openings and be suctioned into the pump inlet 192c. A size of the openings may be larger than a size of the through holes 241 of the secondary filter 240 to facilitate a free flow of filtered liquid to the pump 192. A spacing between the extensions 254 may be varied. Alternatively, instead of a plurality of extensions 254, a side surface of the pump cover 251 may be a filter having through holes to additionally filter foreign matter from the liquid. In such an alternative embodiment, the size and shape of the through holes of the pump cover 251 may be smaller than a size and shape of the through holes 241 of the secondary filter 240, first filter surface 312, and second filter surface 325a to filter finer particles than the secondary filter 240, first filter surface 312, and second filter surface 325a. Alternatively the size and shape of the through holes of the pump cover 251 may be larger than a size and shape of the through holes 241 of the secondary filter 240, first filter surface 312, and second filter surface 325a to facilitate a flow of liquid to the pump inlet 192C.

A top surface of the pump cover 251 may include an outlet hole 252 through which the pump outlet 192a may be inserted. Alternatively, the pump outlet 192a may be covered by the pump cover 251, and the pipe 192b may be inserted through the outlet hole 252. The top surface of the cover 251 may also include a light hole or housing 253 to guide light from the sterilizing light 194.

Figure 7A:
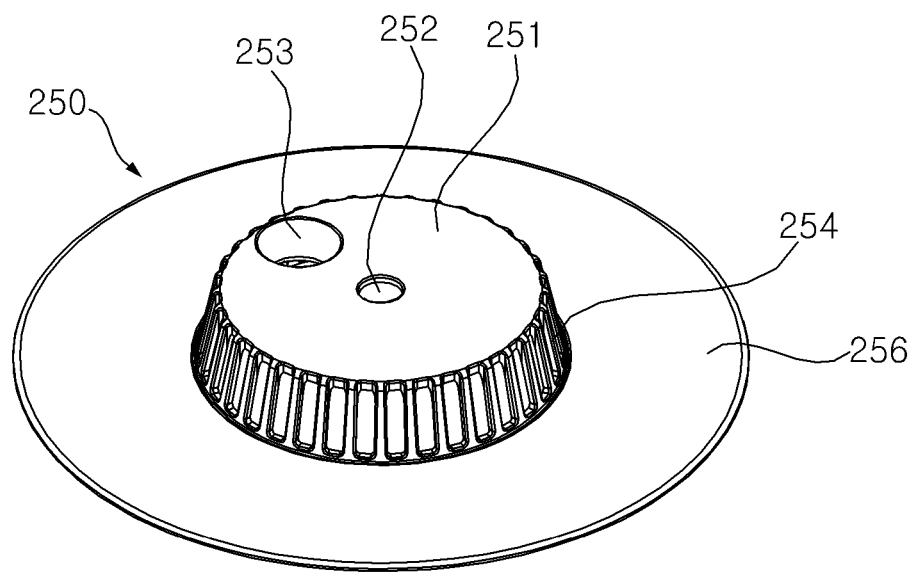
FIG. 7A is a view of a top of a bottom cover.
Figure 7B:
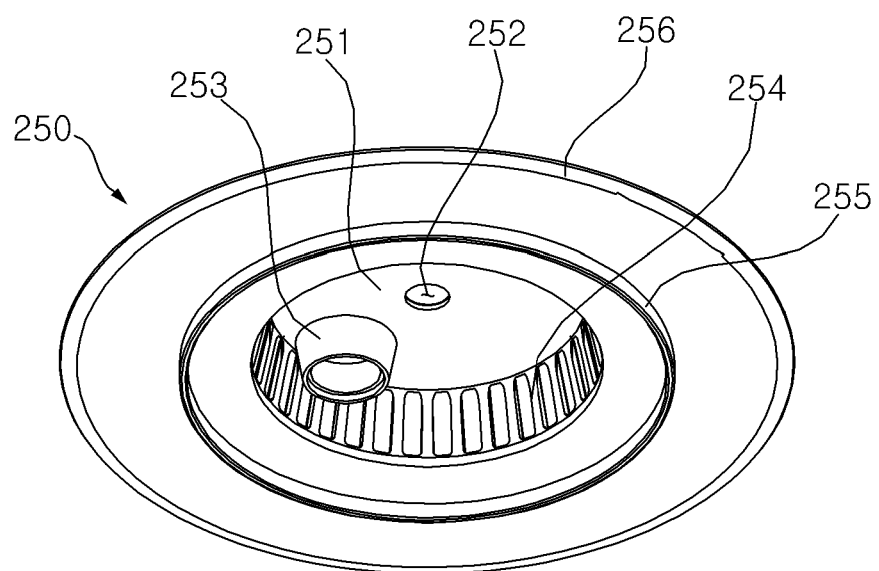
FIG. 7B is a view of a bottom of the bottom cover of FIG. 7A.

As shown in view FIG. 7B, the light housing 253 may extend below the top surface of the pump cover 251 to fit around the light housing 294 of the container 200. As an alternative, the light housing 253 may be inserted into the light housing 294 of the container 200. In such an alternative, an inner surface of the light housing 253 may be coated with an optional reflective layer so that light may be dispersed throughout the liquid in the container.

A bottom surface of the bottom cover 250 may include at least one rib or flange 255 that is inserted into the recession of the inner bottom surface 223 to space the pump cover 251 apart from the pump 192 and prevent lateral movement of the bottom cover 250. The flange 255 and/or the bottom cover 250 should have a weight sufficient to keep the bottom cover 250 on the bottom of the container 200. Alternatively, the rib 255 may be provided at a position on the bottom cover 250 to space the bottom cover 250 apart from the outer bottom surface 221 of the container 250. The bottom cover 250 may be made of an opaque material, such as metal or pigmented plastic. As another alternative, there may be a rib or flange extending upward from the inner bottom surface 223 or the outer bottom surface 221 to space the bottom cover 250 and/or the pump cover 251 from the inner and outer bottom surfaces 223 and 221 of the container 200.

The secondary filter 240 may fit around the pump cover 251 and may be placed on an inner portion of the outer ring 256. A widest width or diameter of the pump cover 251 may be equal to or less than a width or diameter of the lower rim 243 of the secondary filter 240. The outer ring 256 may include an optional groove surrounding the pump cover 251 in which the secondary filter 240 may be inserted and aligned to further prevent lateral movement of the secondary filter 240.

The outer ring 256 may cover the outer bottom surface 221 of the container 200. An overall diameter or width of the bottom cover 250 may be equal to or less than that of the bottom of the container 200. Since the container 200 may be transparent, the bottom cover 250 may serve to cover the pump 192 and any wiring or glue that may be visible under the bottom of the container 200. The secondary filter 240 and the bottom cover 250 may be easily lifted out of the container 200 to easily correct a displacement of the pump 192 or to clean the container 200.

At least one of the secondary filter 240, the outer ring 256 and the pump cover 251 may be optional. For example, the secondary filter 240 may serve to cover the pump 192, and the bottom cover 250 may be omitted. Alternatively, the pump cover 251 may be omitted from the bottom cover 250, and the secondary filter 240 may be inserted into a central hole of the outer ring 256. As another alternative, the pump cover 251 may be provided without the outer ring 256, and the secondary filter 240 may surround and maintain a position of the pump cover 251. As another alternative, the secondary filter 240 may be omitted, and the pump cover 251 may include a plurality of through holes to filter the liquid.

Referring to FIGS. 2A-2B and 8A-8C, the inner and outer bottom surfaces 223 and 221 of the container 200 may be placed on an upper surface of the upper frame 110. The lower frame 120 may be coupled to (e.g., snap fitted, pressed-fitted, bolted, screwed, or adhered to) the upper frame 110. The upper and lower frames 110 and 120 may have cap shapes to form an outer wall or side of the base 100, along with upper and lower surfaces, respectively. A lower rim of the upper frame 110 may include a groove and rib that are snap fitted into a corresponding groove and rib formed on an upper rim of the lower frame 120. The upper frame 110 of the base 100 may primarily serve as an upper cover, and may be snap fit, pressed-fit, screwed onto, etc. the lower frame 120 to create a space where electronic devices and cooling elements (e.g., printed circuit boards 114c and 195, proximity sensor 125, and heat sink 160) may be installed or provided.

An outer surface of the lower frame 120 may have a convex curvature or curved bottom edge. A user may easily lift the pet water dispenser 1 by holding the curved bottom edge of the lower frame 120 without having to wedge a finger between a bottom surface of the lower frame 120 and the floor or ground. In addition, the curved bottom edge of the lower frame 120 may rock if an external force is applied to the pet water dispenser 1 and rock back to an initial position to reorient the pet water dispenser 1 to be upright. The curved edge of the lower frame 120 may prevent the pet water dispenser 1 from being completely overturned.

The upper frame 110 may include outer and inner covers 111 and 112 forming outer and inner portions of the upper surface of the base 100. The upper surface of the base 100 may also include a vertical wall or flange 112b extended downward from the inner cover 112 and defining an inner opening 112a. The flange 112b may correspond to the extension 222 of the bottom of the container 200, and the opening 112a may correspond to the inner bottom surface 223. The inner bottom surface 223 may be a circular recess that protrudes downward and is inserted into the opening 112a.

The metal 191a, sterilizing light 194, and liquid temperature sensor 193 mounted on the heat sink 160 may be exposed through the opening 112a. A center plate 130, which may have a circular shape corresponding to a shape of the opening 112a, may be exposed through the opening 112a. Alternatively, a portion of an optional top plate 140 placed on top of the center plate 130 may be exposed through the opening 112a. Together, the outer and inner covers 111 and 112 and the center and top plates 130 and 140, in addition to the inner and outer surfaces bottom 223 and 221 of the container 200, may shield an inside of the base 100 from liquid so that electronic devices (e.g., fan 180, Peltier device 191b) provided in the base 100 are sealed from liquid stored in the container 200.

The guide rib 113 may separate the outer and inner covers 111 and 112, and the outer bottom surface 221 of the inner wall 220 of the container 220 may be seated on the inner cover 112 and provided within the guide rib 113. The guide rib 113 may extend along an entire circumferential direction of the upper surface of the upper frame 110 to prevent lateral displacement of the inner wall 220 of the container 200. Alternatively or in addition thereto, the outer bottom surface 221 may further be adhered to the inner cover 112.

The outer cover 111 may include a guide groove 119 (FIG. 9A) in which the lower end of the outer wall 210 of the container 200 may be inserted. Alternatively or in addition thereto, the lower end of the outer wall 210 may include a protrusion or extension that is configured to fit into the guide groove 119, and the outer wall 210 may be snap fitted onto the outer cover 111 of the upper frame 110 of the base 100.

The user interface 114 may be provided on the upper frame 110 of the base 100. Alternatively, the user interface 114 may be provided on the lower frame 120 of the base 100 or in the upper rim 230 of the container. In such an alternative embodiment where electronic devices (like the user interface 114) are provided in the upper rim 230 of the container, the upper rim 230 may be configured to have an inner space to house the electronic devices, wires, a battery, a socket or terminal, and/or a wireless power transceiver.

The user interface 114 may allow a user to select modes, temperature, etc. of the pet water dispenser 1. Although the user interface 114 is exemplified as having buttons 114b and/or light emitting devices 114e, embodiments disclosed are not limited thereto, and the user interface 114 may be a digital display, a liquid crystal (LCD) display, a touch screen, etc. For convenience of description, an example where the user interface 114 includes buttons 114b and light emitting devices 114e will be described. In addition, a user may control the pet water dispenser 1 via a mobile application that communicates via WiFi or Bluetooth with a communication or WiFi module of the controller C provided on the printed circuit board 195, which will be described in more detail with reference to FIG. 12.

The upper frame 110 of the base 100 may include at least one button hole or opening 114a in which at least one button 114b may be inserted. The button 114b may be connected to a printed circuit board 114c. Based on a pressing pattern of the button 114b by the user, the button 114b may contact the printed circuit board 114c to transmit various types of signals to the controller C on the printed circuit board 195. The upper frame 110 may further include at least one light hole 114d, and at least one light emitting device 114e such as a light emitting diode (LED) or an organic light emitting diode (OLED) may be provided above the button 114b on the printed circuit board 114c. The light emitting device 114e may emit lights of various wavelengths and colors through the light hole 114d under the control of the controller C on the printed circuit board 195 to indicate at least one of a status or operation of the pet water dispenser 1.

Although a single light emitting device 114e behind the light hole 114d is exemplified, shapes of the light emitting device 114e are not limited thereto. For example, the light emitting device 114e may be ring shaped and include a plurality of LEDs or OLEDs, and the light emitting device 114e may be installed in a groove formed on the upper frame 110 of the base 100. As another alternative, the light emitting device 114e may be installed in the lower frame 120 of the base 100 or in the upper rim 230 of the container. The ring-shaped light emitting device 114e may include a plurality of LEDs or OLEDs to soothe an animal who may be suffering from seasonal affective disorder or seasonal depression. The light emitting device 114e of the pet water dispenser 1 may also be used as a lamp or mood settling light.

A user may press the button 114d once to select a first mode (e.g., an ON mode), and the light emitting device 114e may emit a first color (e.g., green) to indicate that the pet water dispenser 1 is turned on, and the pump 192a may be operated. The user may press the button 114d twice to select a second mode (e.g., an OFF mode), and the light emitting device 114e may emit a second color (e.g., red) to indicate that the pet water dispenser 1 is turned off, and the pump 192 may be turned off.

The user may also select a cooling mode or a fast cooling mode to operate the fan 180 and Peltier device 191b and cool the liquid, and the light emitting device 114e may emit blue light. The user may also select a heating mode to operate the Peltier device 191b to heat the liquid. Other modes may include a manual mode (where a user must further indicate whether to operate the pump 192 or to cool or heat the liquid via the Peltier device 191b) or an automatic mode, where the pump 192 and the Peltier device 191b may be operated based on a liquid temperature sensed by the liquid temperature sensor 193 and/or at least one proximity sensor 125.

The proximity sensor 125 may be a radar sensor that emits radio waves to sense whether a pet is approaching the pet water dispenser 1. Since the proximity sensor 125 uses radar technology, it may not be necessary to include holes in the upper frame 110 through which the proximity sensor 125 transmits a signal. Alternatively, the proximity sensor 125 may transmit a signal (e.g., a laser signal) via holes or openings provided in the upper frame 110, and an optional transmission membrane may cover the holes or openings.

The proximity sensor 125 may be provided at an inner circumferential surface of the lower frame 120 or behind the outer walls of the upper and lower frames 110 and 120 to face outward, but embodiments disclosed herein are not limited to such a location so long as the proximity sensor 125 can emit signals outward. There may be a plurality of proximity sensors 125 provided at equal intervals along a perimeter or the inner circumferential surface of the lower frame 120. For example, there may be four proximity sensors 125 provided at 90 degrees away from each other when the lower frame 120 is circular. As another example, there may be three proximity sensors 125 provided at 120 degrees away from each other. A number and arrangement of proximity sensors 125 is not limited to three and four, and there may be more or less proximity sensors 125 arranged in the base 100 at various intervals.

Alternatively or in addition thereto, there may be a mounting portion extending from inner circumferential surfaces of the upper and/or lower frame 110 and/or 120, and a recess or cavity may be formed in an upper surface of the mounting portion to house the proximity sensor 125 and/or other electronic devices (e.g., printed circuit boards 114c and 195). Alternatively, the upper rim 230 of the container 200 may be configured to have a mounting portion protruding outward from an outer circumferential surface to house the proximity sensor 125 and/or a camera or image sensor. In yet another alternative, there may be a camera or image sensor provided in the upper frame 110 as part of the user interface 114, and the upper frame 110 may include a hole through which the camera or image sensor may capture images.

The upper frame 110 may further include exhaust vents or an exhaust grill 115 to exhaust hot or cool air from inside of the base 100 to an outside. Alternatively, the exhaust vents 115 may be provided on a side surface of the lower frame 120. The exhaust vents 115 may be vertical slots configured to align with ends of the radiating fins 162 of the heat sink 160, which will be described in more detail with reference to FIGS. 10A-10F.

A bottom surface of the bottom frame 120 of the base 100 may include at least one leg or flange 127 to space the base 100 apart from the ground. A plurality of base legs or flanges 127 spaced from each other along the circumferential direction of the lower frame 120 may be provided at a lower edge or bottom surface of the lower frame 120. The weight sensor 124 may also serve to space the base 100 apart from the ground.

The bottom surface of the bottom frame 120 may also include the suction grill 121 through which ambient air may be suctioned into the base via the fan 180 and air/liquid discharge slots 122 through which errant liquid may be discharged. The suction grill 121 may include a plurality of arc-shaped slots or through holes extending in a circumferential direction. Alternatively, the suction grill 121 may include a plurality of elongated slots extending radially outward from a center of the lower frame 120, may include a spiral-shaped opening, or may include a grid or mesh-shaped grill having rectangular holes. The suction grill 121 may be configured to correspond to a position of the fan 180.

The discharge slots 122 may be arc-shaped slots or through-holes formed on an outer portion or edge of the bottom surface of the lower frame 120. Positions of the discharge slots 122 may correspond to ends of the fan housing 170, and details of a flow path of errant liquid or condensate down toward the discharge slots 122 will be described in more detail with reference to FIGS. 10A-10F.

Referring to FIGS. 8C-9C, the center plate 130 may have a shape corresponding to the shape of the opening 112a (e.g., circle). A diameter of the center plate 130 may be slightly larger than a diameter of the opening 112a, and the center plate 130 and/or a top plate 140 provided above the center plate 130 may be coupled (e.g., welded, adhered, or fused) to the flange 112b to cover the opening 112a. The center plate 130 may be formed as one piece with the inner and outer covers 112 and 111 of the base 100, or alternatively may be formed as a separate piece and later welded or bonded to the flange 112b of the inner cover 112 and/or the extension 222 and the inner bottom surface 221 of the container 200. Although FIG. 9B shows an example where the center plate 130 has the pump housing 292 in which the pump 192 is provided, the pump housing 292 may alternatively be provided on the inner bottom surface 223 of the container 200, as shown in FIG. 1F.

The center plate 130 may include a Peltier hole or opening 131 through which the metal 191a is inserted, a light hole 132 through which the sterilizing light 194 may be inserted or exposed, and a wiring hole 136 through which wires connected to the pump 192 in the container 200 may pass. The wiring hole 136 may include an optional cylindrical housing that is inserted into the wiring hole 226 to further insulate wires and to prevent liquid from seeping outside of the wiring holes 226 and 136 into the base 100. The metal 191a may be inserted through the Peltier hole 131 of the center plate 130 and the Peltier hole 225 (FIG. 5C) of the inner bottom surface 223 of the container 200, and the metal 191a may be mounted on the Peltier device 191b to heat or cool liquid before the liquid enters the pump 192.

The Peltier device 191b may be mounted on the heat sink 160 and serve to space the center plate 130 apart from the heat sink 160 (and/or an optional top plate 140 provided on the heat sink 160) by a gap or space S3. A length of the gap or space S3 may be equal to a height of the Peltier device 191b.

The Peltier hole 131 of the center plate 130 may have a size and shape corresponding to a bottom portion of the metal 191a mounted on the heat sink 160. Alternatively, the Peltier hole 131 of the center plate 130 may have a size and shape corresponding to an upper portion of the metal that is formed to be smaller than the bottom portion of the metal 191a, and the center plate 130 may be seated on the bottom portion of the metal 191a. In such an alternative embodiment, the gap or space S3 between the center plate 130 and the heat sink 160 may be equal to a sum of a height of the lower portion of the metal 191a and the height of the Peltier device 191b.

The center plate 130 may further include a temperature sensor hole 133 through which the liquid temperature sensor 193 may protrude. The liquid temperature sensor 193 may include a base 193a mounted on a heat dissipation plate 161 of the heat sink 160 and a probe that protrudes through the inner bottom surface 223 of the container 200 into the container 200. The Peltier device 191b, sterilizing light 194, the pump 192, and the liquid temperature sensor 193 may be electrically connected to the printed circuit board 195 and/or a battery 196 (FIG. 10D) provided above the printed circuit board 195.

The center plate 130 may have a circular disc shape corresponding to a shape of the inner bottom surface 223 of the container 200. However, embodiments disclosed herein are not limited to a circular center plate 130. For example, the center plate 130 may be rectangular and have a shape that corresponds to the heat dissipation plate 161 of the heat sink 160.

Figure 5A:
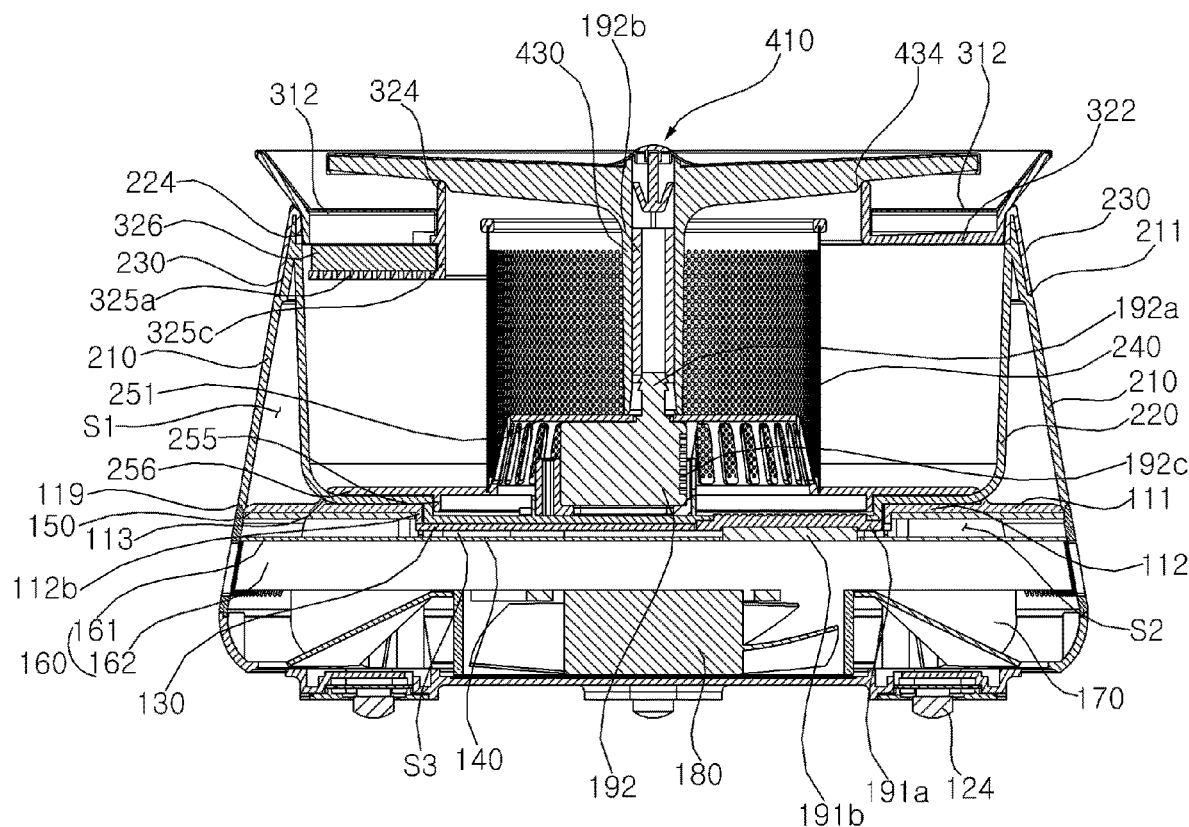
FIG. 5A is a side sectional view of a pet water dispenser according to an embodiment.
Figure 5B:
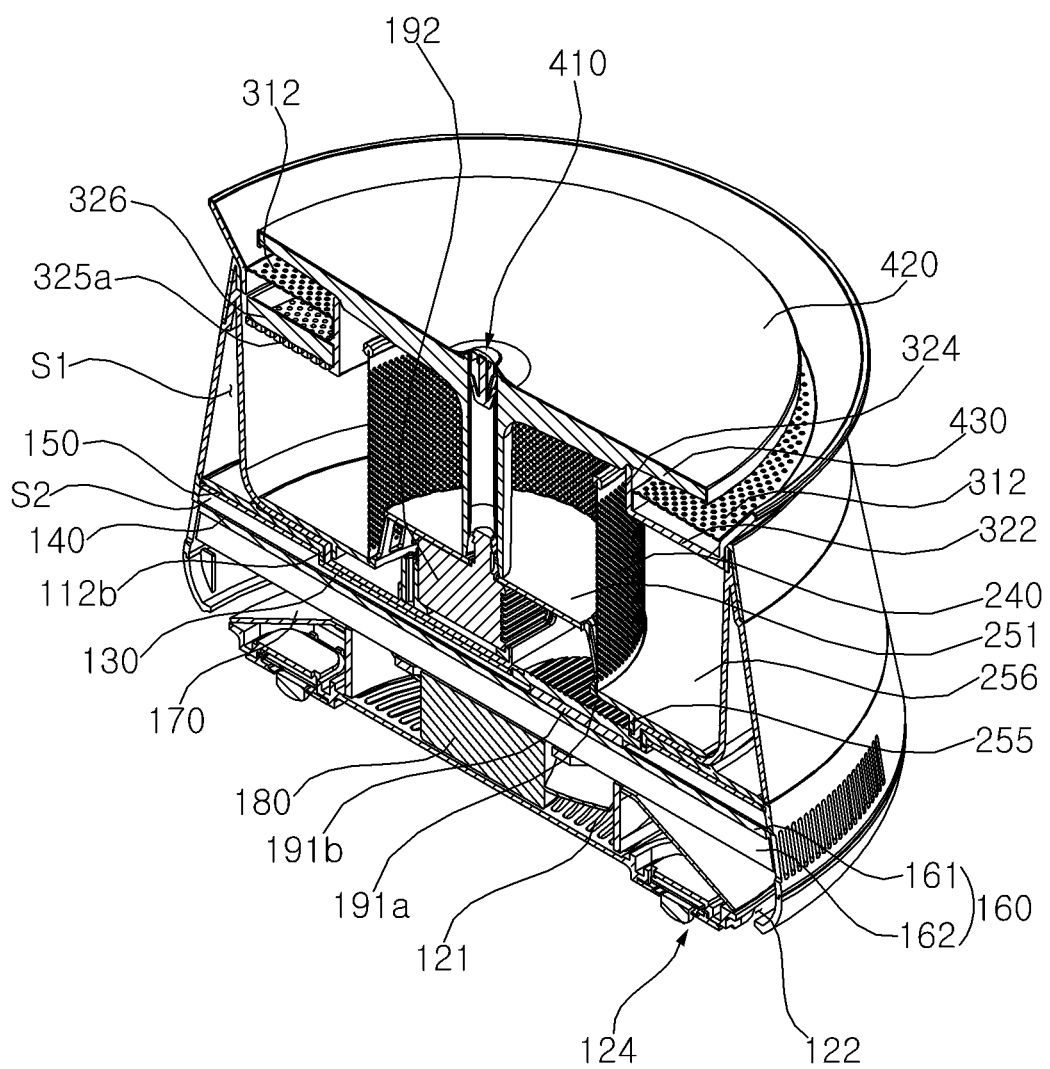
FIG. 5B is a side sectional view from below showing the pet water dispenser of FIG. 5A.
Figure 5C:
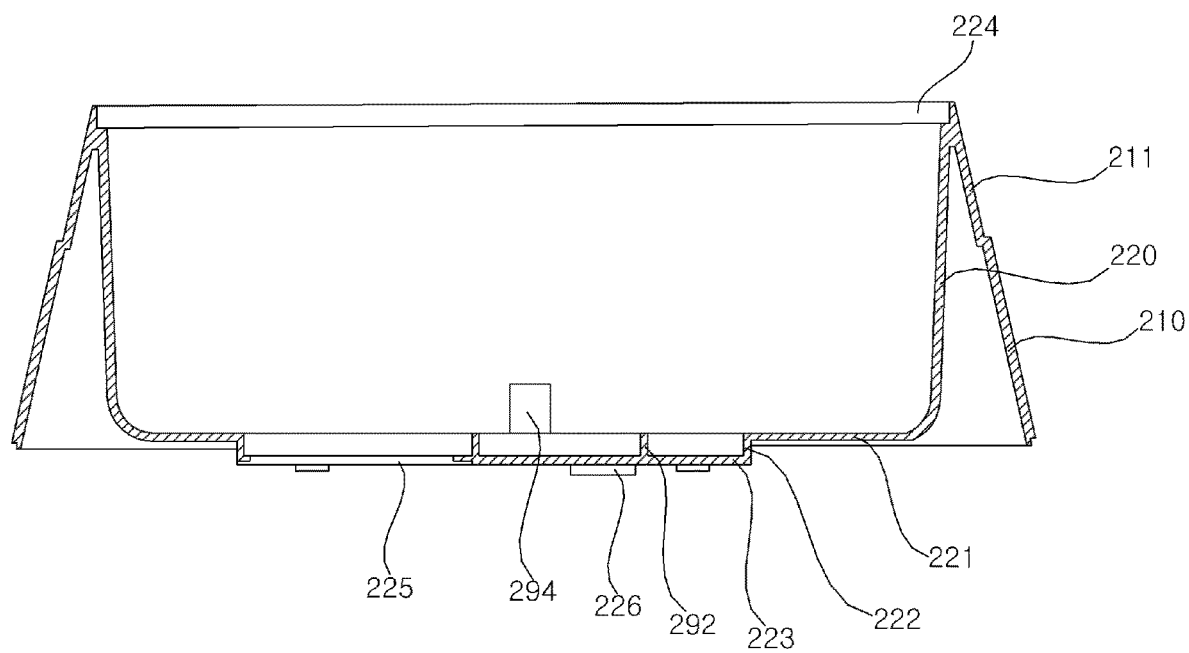
FIG. 5C is a side sectional view showing a container of the pet water dispenser where liquid is stored.

The center plate 130 may be provided between and/or below a pair of side plates 150. The side plates 150 may have a height higher than that of the center plate 130, and may be provided under the outer and inner covers 111 and 112 of the upper frame 110 of the base. The side plates 150 may be provided above and spaced apart from the heat sink 160 and/or an optional top plate 140 to create a gap or space S2 (FIGS. 5A-5B). The space S2 under the side plates 150 may communicate with the space S3 under the center plate 130. The pair of side plates 150 may not contact the center plate 130, and may be adhered to a bottom surface of the outer and inner covers 111 and 112.

Figure 8C:
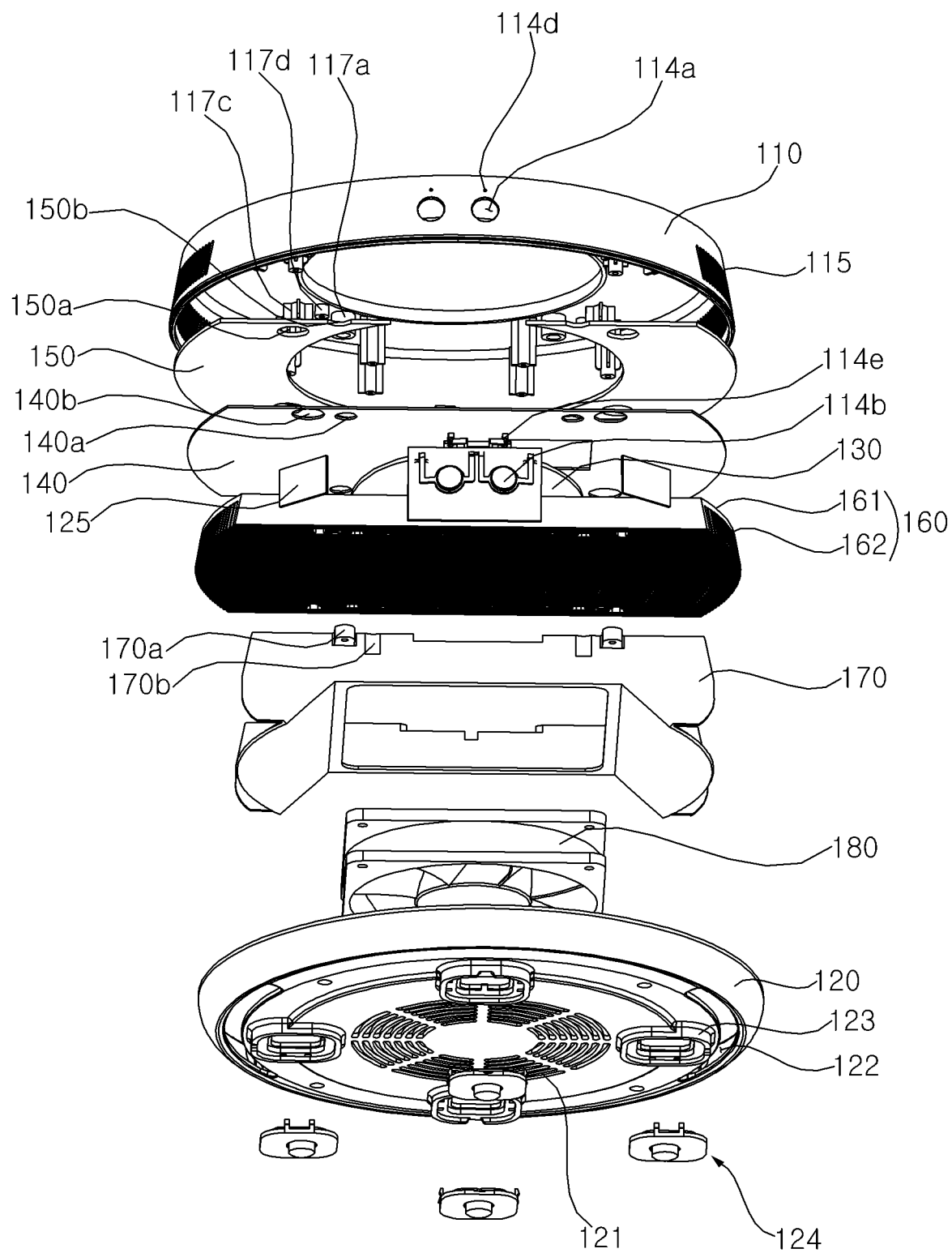
FIG. 8C is an exploded perspective view looking up at the base of FIG. 8A.

The optional top plate 140 may be provided on top of the heat dissipation plate 161 of the heat sink 160 (FIGS. 5B, 5C, and 11B), or alternatively may be provided above the center plate 130 (FIGS. 2B and 8C). As another alternative, the top plate 140 may include an opening through which the entire center plate 130 is inserted, the center plate 130 may be coplanar with the top plate 140. The top plate 140 may include holes through which the Peltier device 191b, sterilizing light 194, and liquid temperature sensor 193 are exposed, in addition to a hole to accommodate wires passing through the wiring hole 227. The top plate 140, the side plates 150, and the center plate 130 may isolate the heat sink 160 so that the container 200 is not unintentionally heated by any heat emitted by the heat sink 160 and/or a motor provided in the fan 180. The top plate 140, side plates 150, and center plate 130 may be made of an insulating material and serve as gaskets. Alternatively, the top plate 140, side plates 150, and center plate 130 may be made of metal.

Referring to FIGS. 9A and 10A-10F, the heat sink 160 may be provided under the center plate 130, top plate 140, and side plates 150 and provided above the fan 180 and fan housing 170. The heat dissipation plate 161 may be provided below the center plate 130, top plate 140, and side plates 150. The plurality of radiating fins 162 may be provided below the heat dissipation plate 161 to face an upper surface or outtake of the fan 180.

The radiating fins 162 and the heat dissipation plate 161 may be formed of the same material, which may be a material that has high heat conductivity like metal (e.g., copper or aluminum). The radiating fins 162 may be arranged in a row structure configured to direct air toward the exhaust vents 115, and ends of the rows may align with the exhaust vents 115 when the upper frame 110 is coupled to the lower frame 120 (compare FIGS. 10E and 10F). Ends of the radiating fins 162 and the exhaust vents 115 may correspond to left and right sides of the pet water dispenser 1, while the user interface 114 may correspond to a front, and the socket 118 may correspond to a back. Ends of the heat sink 160 corresponding to the exhaust vents 115 may be curved to correspond to a curvature of the side wall of the upper frame 110. Corresponding ends of the top plate 140 and side plates 150 may be similarly curved.

Although the figures show a plurality of longitudinal radiating fins 162 extending linearly across the heat dissipation plate 161, embodiments disclosed herein are not limited to such a configuration of the heat sink 160. For example, the heat dissipation plate 161 may be formed as a circular disc or a ring, and the radiating fins 162 may extend radially outward from a center of the heat dissipation plate 161, may be formed as annular rings extending in a circumferential direction, or may be square or rectangular fins that face each other and are provided at equal intervals around an outer circumference of the heat dissipation plate 161. In another alternative embodiment, the heat dissipation plate 161 may be formed as a ring with a hole, and the fan 180 may be inserted into the hole instead of provided under the heat sink 160.

The Peltier device 191b, liquid temperature sensor 193, and the sterilizing light 194 may be provided on the heat dissipation plate 161. As an alternative, the Peltier device 191b, liquid temperature sensor 193, and the sterilizing light 194 may be provided on one of the top plate 140 or the center plate 130 to protrude through the opening 112a of the upper frame 110 and the container 200.

The metal 191a may directly contact liquid in the container 200. The metal 191a may be made of a metal that has good heat conductive properties, such as copper or aluminum, but may alternatively be made of stainless steel or another material having a high thermal conductivity or a high heat transfer coefficient. An upper surface or portion of the metal 191a may have a ridge shape, or alternatively a mesh grid shape to increase a surface area in contact with the liquid. Other shapes or contours may be used to increase the surface area. For example, the surface of the metal 191a may be convex or concave, and may additionally include meshed grid patterns or ridges or rows of fins. The bottom portion of the metal 191a may be wider than the upper portion having the ridges. The peltier hole 225 of the container 200 (FIG. 5C) may be sized to only expose the upper portion of the metal 191a, while the lower portion of the metal 191a may serve to prevent liquid from seeping past the peltier hole 225 of the container 200 into the base 100.

The Peltier device 191b may be mounted on an upper surface of the heat dissipation plate 161, and may have terminals across which a voltage may be applied. When a voltage is applied to the Peltier device 191b, a difference in temperature may be generated between an upper side or portion and a lower side or portion as heat is transferred from one of the upper or lower sides to the other.

During a heating process, the upper side of the Peltier device 191b may become hot and emit heat, which may be transferred to liquid in the tank via the metal 191a, while the lower side may become cold and/or absorb heat. Cold air may be dissipated through the heat sink 160 and exhausted out of the exhaust vents 115 as the fan 180 rotates.

During a cooling process, the upper side of the Peltier device 191b may become cold to cool liquid in the container 200 via the metal 191a, while the lower side of the Peltier device 191b may become hot. Hot air may be dissipated through the heat sink 160 and exhausted out of the exhaust vents 115 as the fan 180 rotates.

There may be an optional element temperature sensor to sense a temperature of the Peltier device 191b or the heat sink 160. When the element temperature sensor senses that a temperature of the Peltier device 191b and/or the heat sink 160 is above a predetermined element temperature, an operation of the Peltier device 191b may be stopped, and the fan 180 may rotate to cool the heat sink 160 and/or the Peltier device 191b. Ambient air may be suctioned upward into the base via the suction grill 121. The fan 180 may discharge the ambient air toward the plurality of radiating fins 162 of the heat sink 160 to cool the heat sink 160 and/or the Peltier device 191b. Hot air may then be discharged through the exhaust vents 115.

The fan 180 may be provided on the lower frame 120 above the suction grill 121 and oriented so that air suctioned through the suction grill 121 may be discharged to the radiating fins 162 of the heat sink 150. The fan 180 may include a hub 183 at a center and a plurality of blades 182 extending from the hub 183. A fan case or shroud 181 may surround the plurality of blades 182. The hub 183 may be rotated by a motor inside the hub 183. The plurality of blades 182 may be inclined or curved so as to push air toward the heat sink 160. The fan case 181 may also include fastening holes 184 through which a bolt or screw may fasten the fan case 181 to the fan housing 170. Alternatively, the fastening holes 184 may be used to couple the fan case 181 to at least one of the upper frame 110 and the lower frame 120 of the base 100.

The fan housing 170 may be provided to surround the fan case 181, support the heat sink 160, and guide a flow of air exhausted at an outtake of the fan 180. A center frame 173 of the fan housing 170 may have inclined surfaces that lead to the discharge slots 122 and exhaust vent 115. The inclined surfaces of the center frame 173 may cover sides of the fan case 181. If errant liquid enters the base 100 via, e.g., the exhaust vents 115, the liquid may be guided down the inclined surface of the fan housing 170 and discharged out of the discharge slots 122 and exhaust vents 115.

Errant liquid dripping on the side of the container 200 and the base 100 is more likely to drip into the exhaust vents 115 when the fan 180 is not operating. When the fan 180 is operating, discharged air may keep errant liquid from entering the base 100 through the exhaust vents 115. In addition, any other liquid or condensate that may have collected on the fan housing 170 may be discharged through the discharge slots 122.

The inclined surfaces of the center frame 173 may also guide exhaust air toward the exhaust vents 115. Heights of the inclined surfaces of the center frame 173 may be less than or equal to a height of lower ends of the exhaust vents 115 so as not to block the exhaust vents 115. Bottom surfaces of the inclined surfaces of the center frame 173 of the fan housing 170 may also guide air discharged from the fan 180 up to the heat sink 160 and prevent ambient air from escaping.

A top of the center frame 173 may have an opening 171 (FIG. 9C) configured to fit the fan 180 and/or the fan case 181, and the inclined surfaces may extend from side edges or ends such that a longitudinal direction of the fan housing 170 corresponds to longitudinal directions of the heat sink 160 and top plate 140. A size and shape of the opening 171 may correspond be large enough so that an outtake of the fan 180 is exposed through the opening 171, and the center frame 173 may partially cover the fan case 181 so that corners or sides of the fan case 181 may be attached to the center frame 173 via the fastening holes 184. Alternatively, the size and shape of the opening 171 may correspond to a size and shape of a perimeter of the fan case 181 (e.g., square or circular). A height of the top of the center frame 173 may be greater than or equal to a height of the fan case 181 so that the heat sink 160 may rest on the center frame 173.

The fan housing 170 may have a pair of sidewalls or side frames 172 that extend upward to cover sides of the heat sink 160. The side frames 172 may extend from an upper surface of the center frame 173 and from sides of the inclined walls of the center frame 173.

The center plate 130 may have a diameter or width that is greater than or equal to a distance between the side frames 172 of the fan housing 170, and the sidewalls 172 may include a cutout or recessed portion 172a in which a side or portion of the center plate 130 extending past the width of the fan housing 170 may be provided. The cutout may further serve to space the center plate 130 apart from the heat sink 160 by the space S3. A distance from bottom ends of the side frames 172 to the cutout may be greater than or equal to a distance from the bottom of the radiating fins of the heat sink to a top of the Peltier device 191b. Alternatively, the recessed portion 172a may be omitted if a diameter of the center plate 130 is less than a distance between the side frames 172 of the fan housing 170.

The side frames 172 may have a lower opening or cutout portion through which sides of the fan case 181 may be exposed, while the inclined surfaces of the center frame 173 may cover respective sides of the fan case 181. A height of the fan case 181 may be equal to or less than a height of the opening in the side frames 172. Ends of the side frames 172 may be provided around ends of the fan case 181.

The fan housing 170 may include a boss or screw hole 170a protruding from the side frame 172. A bolt or screw may be inserted into the screw hole 170a to attach the fan housing 170 to the upper frame 110, and to push the fan housing 170, heat sink 160, Peltier device 191b, metal 191a, and plurality of plates 130, 140, and/or 150 upward toward the upper surface of the upper frame 110 of the base 100 and toward the inner bottom surface 223 of the container 200 to further seal the Peltier hole 225, wiring hole 226, and openings for the sterilizing light 194 and temperature sensor 193 and to prevent liquid in the container from leaking into the base 100. The screw inserted into the screw hole 170a may further help to align the heat sink 160, Peltier device 191b, metal 191a, and plurality of plates 130, 140, and/or 150. Details of the screw hole 170a and a coupling of the fan housing 170 to the upper frame 110 will be described in further detail with reference to FIG. 11C.

The Peltier device 191*b* and the fan 180 may be connected to a controller C (FIG. 12) on the printed circuit board 195, and powered by external power applied through a socket or terminal 118 or a battery 196. Details of the controller C and printed circuit board 195 will be described with reference to FIG. 12.

The base 100 may include the battery 196. The battery 196 may be provided adjacent to the sidewalls 172 of the fan housing 170 and above the printed circuit board 196. The battery 196 may be rated at 3500 mAh (milliampere hour). The battery 196 may be charged by external power applied to the socket 118 provided near the battery 196. Alternatively or in addition thereto, the battery 196 may be wirelessly charged via a corresponding charge pad. A wire may be plugged into the socket 118. The printed circuit board 195 may include an AC/DC converter to convert alternating current from an external power source to direct current. Alternatively, the battery 196 may be connected to a wireless power transceiver or wireless power receiver, and may be charged wirelessly via the wireless power transceiver. Details of a wireless power transmission (WPT) process are provided in U.S. application Ser. No. 16/571,075 filed on Sep. 14, 2019, the entire contents of which are incorporated by reference herein.

If external power is disconnected or disabled, the battery 196 may operate the pump 192, the sterilizing light 194, the liquid temperature sensor 193, the Peltier device 191*b*, and/or the user interface 114. When a charge of the battery 196 is below a predetermined amount and the socket 118 is not connected to external power, the controller C may control the light emitting device 114*e* to emit a certain color (e.g., red) or blink to warn the user that a power supply is low so that the user may plug in the pet water dispenser 1 at the socket 118. In addition, the pet water dispenser 1 may enter a power saving mode in which only certain devices (e.g., the pump 192) are operated while other devices (e.g., the Peltier device 191*b*, the sterilizing light 194) are not operated. Details of a power saving mode will be described with reference to FIG. 12.

Figure 11B:
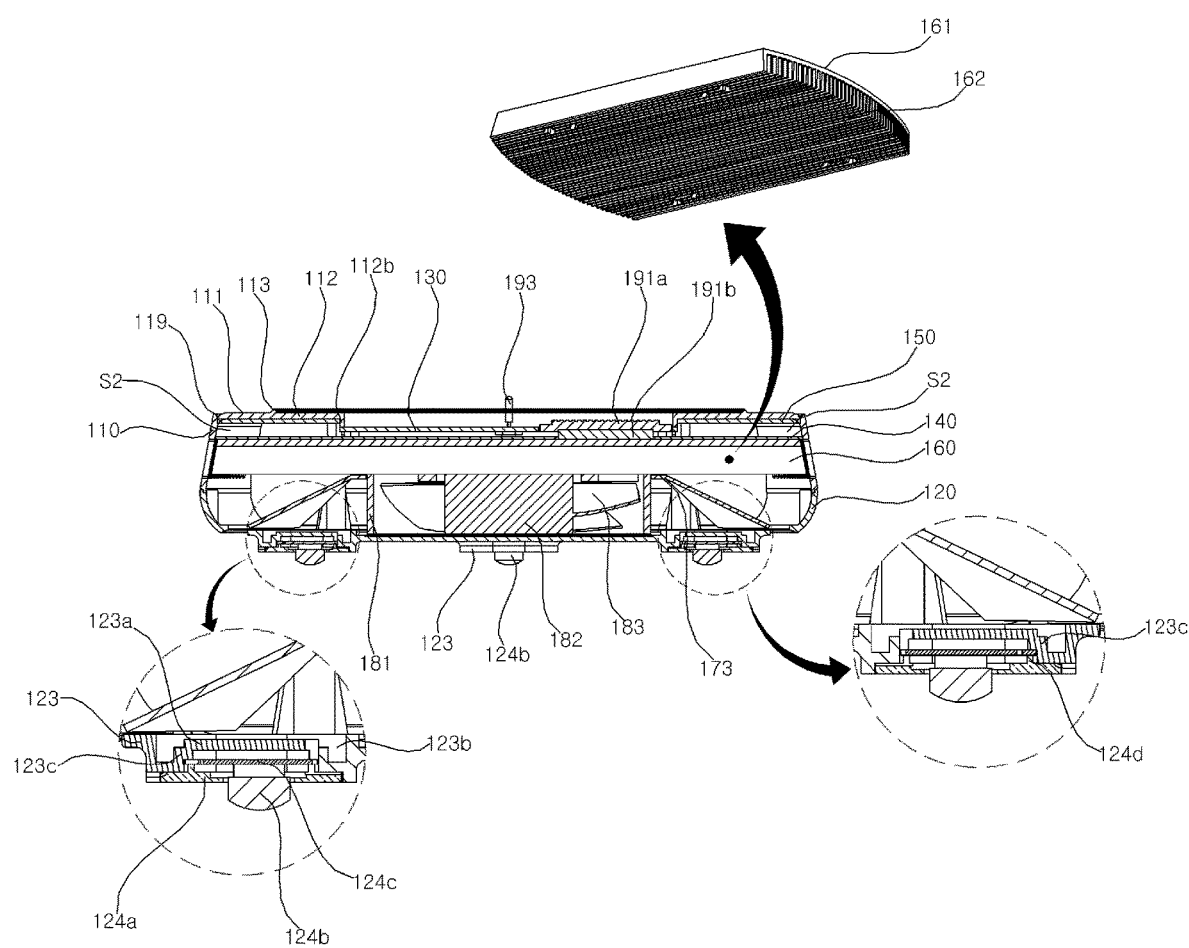
FIG. 11B is a side sectional view of the base and showing an enlarged view of a heat sink.

Referring to FIGS. 11A and 11B, the bottom surface of the lower frame 120 may further include a sensor frame 123 (e.g., weight sensor frame) in which a water level sensor 124 (e.g., weight sensor) may be housed. Although embodiments disclosed herein are not limited to having a weight sensor to determine an amount of liquid contained in the container, for convenience of description, an embodiment where the water level sensor 124 is a weight sensor will be described.

A shape of the weight sensor 124 may correspond to a lower contour of the weight sensor frame 123. The weight sensor 124 may also serve as a leg or cushion supporting the pet water dispenser 1, and may protrude further downward than the leg 127 formed on the lower frame 120. The weight sensor 124 may be a strain gauge, pressure sensor, or load sensor to sense a pressure or weight of liquid in the container 200 and applied to the lower frame 120 of the base 100 and/or a bottom of the container 200. The controller C provided on the printed circuit board 195 may determine a level of liquid in the container 200 based on a measurement of the weight sensor 124.

The weight sensor frame 123 may include a recessed or stepped portion 123*a* that is recessed upward from the bottom surface of the lower frame 120, while the lower end of the weight sensor frame 123 may protrude from the bottom surface of the lower frame 120. A cavity or chamber may be formed by the stepped portion 123*a*.

The weight sensor 124 may include a main body 124*a* and a pad 124*b* having a sensor. An elastic frame 124*c* may be coupled to an inner opening of the main body 124*a* via an extension 124*e* formed at one side of the elastic frame 124*c*. The elastic frame 124*c* may be inserted into the cavity formed by the stepped portion 123*a* of the weight sensor housing 123, while the main body 124*a* may be provided under the lower end of the weight sensor housing 123. The pad 124*b* of the weight sensor 124 may be configured to extend beyond the leg 127 of the lower frame 120 such that a cushion height of the weight sensor 124 is longer than a length of the leg 127.

The weight sensor 124 may further include a protrusion or flange 124*d* that is inserted into a second or intermediate stepped portion 123*c* formed in the weight sensor housing 123. The intermediate stepped portion 123*c* may be recessed from a lower end of the weight sensor housing, but may not be recessed as far as the stepped portion 124*a*. The flange 124*d* may secure the main body 124*a* of the weight sensor 124 to the intermediate stepped portion 123*c* and may provide stability and rigidity to the main body 124*a*.

A size and shape of the extension 124*e* may be configured to allow the main body 124*a* and the lower end of the weight sensor housing 123 to move toward and away from the ground, pressing on the elastic frame 124*c*, depending on how heavy the container 200 is. The main body 124*b* and the elastic frame 124*c* may be made of a same material as the lower frame 120 (e.g., plastic).

The pad 124*b* may cover an end of a protrusion protruding from the elastic frame 124*c*. The protrusion and pad 124*b* may remain still as the lower frame 120, lower end of the weight sensor frame 123, and the main body 124*a* move toward and away from the ground and press on the elastic frame 124*c* depending on a weight applied. When a surface of the stepped portion 123*a* moves down to touch a back of the elastic portion 124*c*, the sensor in the pad 124*b* may sense a pressure or weight applied. The pad 124 may further include an elastic material (e.g., rubber), which may expand and contract depending on a weight applied to the weight sensor 124 and serve as a cushion to protect the sensor. An upper surface of the elastic frame 124*c* and a lower surface of the stepped portion 123*a* may be flat so that a pressure sensed by the pad 124*b* may be evenly distributed.

A coupling of the weight sensor 124 and the weight sensor frame 123 are not limited to a configuration including extensions on the main body 124*a* and stepped portions 123*a* and 123*c* in the weight sensor frame 123. As an alternative example, the main body 124*a* of the weight sensor 124 may be snapped-fit or pressed-fit into the frame 123, which may have an opening or cavity configured to have a perimeter corresponding to a perimeter and/or upper contour of the main body 124*a* of the weight sensor 124. As another alternative, the main body 124*a* of the weight sensor and the pad 124*b* may be manufactured as a single weight sensor 124.

The pads 124*b* of the weight sensor 124 may serve as legs on which the pet water dispenser 1 may rest, and may space apart the bottom surface of the lower frame 120 of the base from the ground so that air may be suctioned through the suction grill 121.

There may be additional sensors provided in the base 100, such as the optional element temperature sensor described previously, a gyro sensor to sense a tilt or inclination of the pet water dispenser 1, and a light sensor to sense ambient light of a room in which the pet water dispenser 1 is placed. In addition, there may be a pedestal having an adjustable height and/or inclination on which the pet water dispenser 1 that the controller may adjust in response to a measurement from the gyro sensor.

Figure 11C:
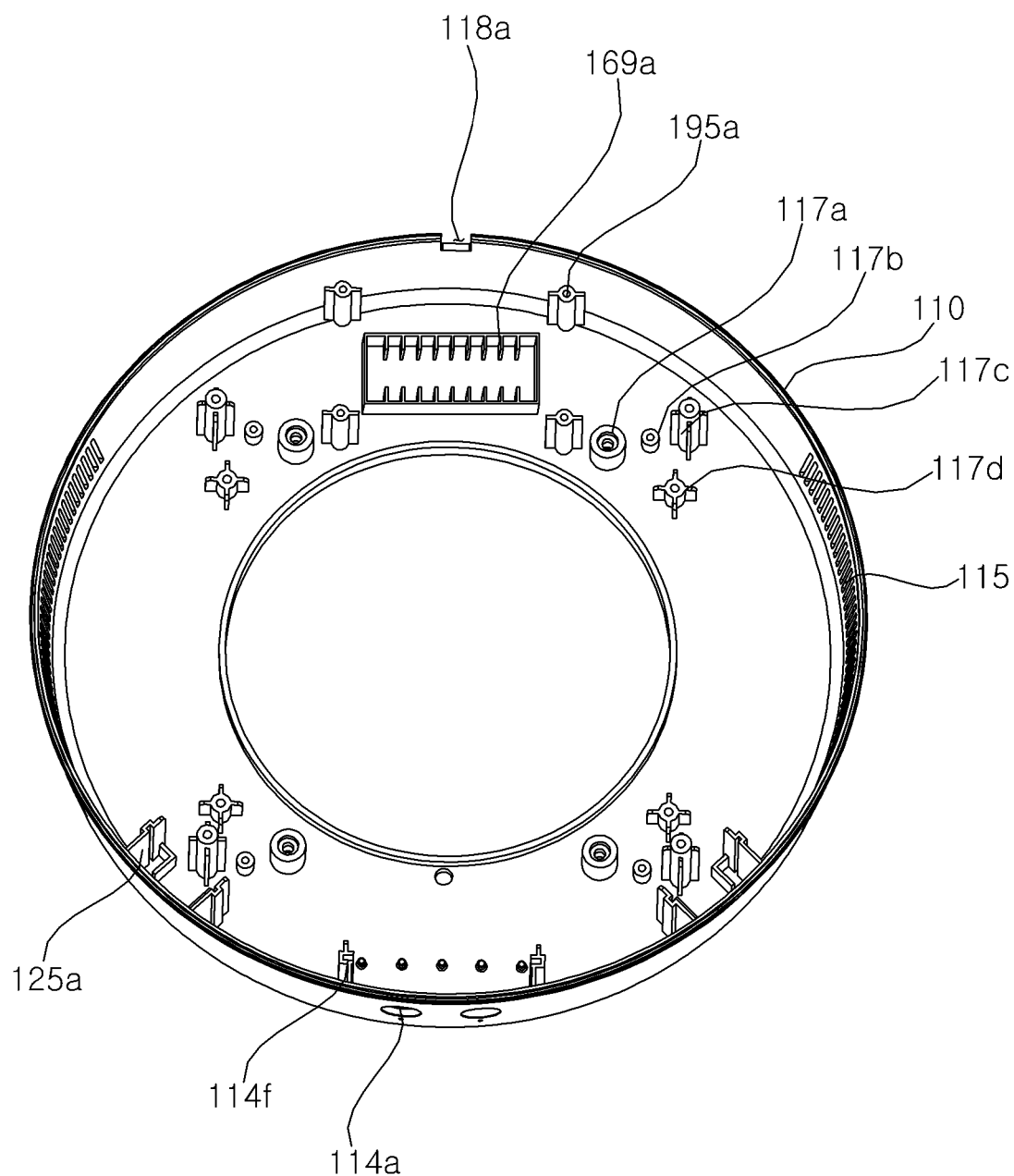
FIG. 11C shows a lower surface of an upper frame of a base.

Referring to FIG. 11C in conjunction with FIGS. 1F, 1G, 2B, 8A-8C, 9A, and 9B a bottom surface of the upper frame 110 may include various holes and bosses to assist in maintaining positions of the heat sink 160, fan housing 170, printed circuit board 195, battery 196, proximity sensor 125, and user interface 114 inside the base 100 and to assist in coupling the upper frame 110 to the lower frame 120. There may be corresponding holes, bosses, or recesses in the fan housing 170, top plate 140, side plates 150, and the lower frame 120 corresponding to the various holes and bosses of the upper frame 110. Screws or bosses may be inserted into the holes and bosses of the upper frame 110, fan housing 170, top plate 140, and side plates 150 to push the fan housing 170, fan 180, heat sink 180, center plate 130, Peltier device 191a, metal 191b, top plate 140, and/or side plates 150 upward toward the upper frame 110 and the inner bottom surface 223 of the container 200 to prevent liquid from seeping into the base 100.

In more detail, the sidewall of the upper frame 110 may include a socket opening or hole 118a through which the terminal or socket 118 may be exposed for plugging in. A battery housing 196a may be formed as walls extending downward. Some of the walls of the battery housing 196a may be curved to correspond to a curvature of the battery 196. There may be four bosses 195a extending downward near corners of the battery housing 196a to maintain a position printed circuit board 195 below the battery 196.

A user interface housing 114f formed of walls or frames may extend downward to maintain a position of the printed circuit board 114c of the user interface 114. Similarly, a proximity sensor housing 125a formed of walls or frames may extend downward to maintain a position of upper portions of the proximity sensors 125. Although two proximity sensor housings 125a are shown in FIG. 11C, there may be more or less proximity sensor housings 125a depending on a number of proximity sensors 125 provided in the base. Positions user interface housing 114f, proximity sensor housing 125a, and battery housing 196a may correspond to positions of the user interface 114, proximity sensor 125, and battery 196, respectively, and positions of the bosses 195a may correspond to a position of the printed circuit board 195.

Bosses or screw holes 117a, 117b, 117d may be formed as holes that protrude through the upper surface of the upper frame 110. Bosses 117c may extend downward, and may optionally have a hole that protrudes through the upper surface of the upper frame 110.

Boss 117a may be a screw hole or bolt hole. A bolt or screw may be inserted through boss 117a to be provided in a recess 170b formed in the side frame 172 to maintain positions of the fan housing 170 and the heat sink 160. Each side frame 172 of the fan housing 170 may include two recesses 170b having a shape that corresponds to a bolt inserted through the boss 117a. There may be four bosses 117a corresponding to positions of the recesses 170b in the fan housing 170. The top plate 140 may include a hole 140a at a position above the recess 170b to allow the bolt to insert into the recess 170b. Similarly, the pair of frames 150 may include a cutout, recess, or opening 150a through which the bolt may pass to the recess 170b. Therefore, the top plate 140 and the pair of plates 150 may not obstruct a path to the recess 170b.

Boss 117b may be a smaller bolt hole or screw hole than boss 117a. A bolt or screw may be inserted through a boss or screw hole 170a protruding from the side frame 172 of the fan housing 170 and couple to the boss 117b. Each side frame 172 of the fan housing 170 may include two screw holes 170a provided adjacent to the recesses 170b. There may be four bosses 117b corresponding to positions of the screw holes 170a in the fan housing 170. The bolts or screwed may be inserted upward through the screw holes 170a into the corresponding bosses 117b to provide an upward force maintain a position of the fan housing 170 and applying a pressure to the heat sink 160, Peltier device 191a, temperature sensor 193, sterilizing light 194, and metal 191b so that liquid does not seep through the Peltier hole 225, wiring hole 226, and the openings in the inner bottom surface 223 of the container 200 for the sterilizing light 194 and the temperature sensor 193.

Boss 117c may extend downward to couple to the bottom frame 120. The bottom frame 120 may include corresponding bosses 117e that protrude upward. The bosses 117e may include holes in which bottom ends of the bosses 117c may be inserted. As an alternative, the boss 117c may couple to a corresponding groove formed in the bottom frame 120, and the bosses 117e of the bottom frame 120 may simply serve to prevent a lateral displacement of the heat sink 160 and/or fan housing 170.

Boss 117d may be a bolt or screw hole. A bolt or screw may be inserted through boss 117d and inserted through a hole 150a provided in the pair of top plates 150 to couple to the heat sink 160. When the top plate 140 is provided, a corresponding cutout, recess, or opening 140b may be provided so as not to obstruct a path to the heat sink 160. The bolt that couples to the heat sink 160 may serve to keep the heat sink 160 spaced apart from the center plate 130.

Referring to FIGS. 2A-2B and 12A, the controller C provided on the printed circuit board 195 may be electrically coupled to and control the printed circuit board 114c and/or the user interface 114, the sterilizing light 194, the proximity sensor 125, the liquid temperature sensor 193, the weight sensor 124, the battery 196, the motor provided in the fan 180, the Peltier device 191b, and the pump 192. The controller C may further be electrically coupled to an AC/DC converter to convert alternating current supplied to the socket 118 to direct current, a memory or storage device to store data (e.g., proximity sensor 125 data and times), and a communication module. Various other sensors provided in the base 100 (e.g., the element temperature sensor or a gyro sensor), if provided, may also be electrically connected to and controlled by the controller C. The controller C may couple to an optional global positioning system (GPS) that keeps track of a position of the pet water dispenser 1.

The communication module may include a WiFi module and/or Bluetooth module so that a user may control the controller C via a mobile application installed on a mobile device. The communication module may also communicate with a communication module of the printed circuit board 114c to control an operation of the light emitting device 114e and the button 114b on the user interface 114. The communication module may retrieve information from the user's mobile device or a smart toy or collar (e.g., GPS data) and compare that to data (e.g., GPS data sensed by the GPS) of the pet water dispenser 1. The communication module may interact or communicate with a separate server that receives data from the user's mobile device and/or smart pet devices (e.g., a pet pendant or collar, an automated pet treadmill, an automated pet house, a robot cleaner, etc).

When the liquid temperature sensor 193 senses a temperature outside of a first predetermined liquid temperature range, the Peltier device 191b may be controlled by the controller C to heat or cool the liquid. Animals tend to prefer water at 10-20 degrees Celsius, so the first predetermined liquid temperature range may be 10° C.-20° C. The user may also set his or her own liquid temperature range via the user interface 114 or a mobile application.

The proximity sensor 125 may sense a position of a pet within a predetermined distance range. When the controller C determines that the pet is within the predetermined distance range, the controller C may operate the pump 192 to dispense liquid to the top plate 420, and liquid falling from the outer edge of the top plate 420 may simulate running water, which is pleasing for animals. The pet may be attracted to the pet water dispenser 1 and drink the falling liquid.

As an alternative, the controller C may wait to operate the pump 192 only if the proximity sensor 125 senses that the pet is continuing to approach the pet water dispenser 1. The proximity sensor 125 may first sense that a pet is within the predetermined distance range, and the controller C may control the pump 192 to be in a "standby state" where the pump 192 is ready to quickly operate in the case of a further command or signal from the controller C. When the proximity sensor 125 senses that the pet has traveled closer to the pet water dispenser 1, the controller C may then operate the pump 192.

As another example, the controller C may only operate the pump 192 when a pet is approaching the pet water dispenser 1 by a predetermined speed. The controller C may calculate a speed of the pet based on continuous or periodic measurements from the proximity sensor 125 and an internal timer. When the pet is sensed to be within a second predetermined distance range that is smaller or closer than the first predetermined distance range, the controller C may determine that the pet is drinking from the pet water dispenser 1, and the memory may store consumption data.

The controller C may be able to control a pumping capacity or rate of the pump 192. The controller may increase the pumping capacity when it is determined via a plurality of proximity sensors 125 that a plurality of pets are approaching (or have approached) the pet water dispenser 1.

The memory may be provided on the printed circuit board 195 to store data on how often or at what time the pet drinks from the pet water dispenser 1. The controller C may operate the pump 192 and the Peltier device 191b based on predictions on when the pet will approach the pet water dispenser 1. For example, data stored in the memory may indicate that a pet drinks from the pet water dispenser 1 at noon every day, so the controller C may operate the Peltier device 191b before noon to cool or heat the water, and may operate the pump 192 or control the pump 192 to be in a standby state at noon. As another example, data stored in the memory may indicate that a pet drinks from the pet water dispenser 1 every two hours, and so, after the proximity sensor 125 senses that a pet is no longer within the second predetermined distance range, two hours later, the controller may operate the Peltier device 191b and/or control the pump 192 to operate or to be in a standby state.

The controller C may also interact with a mobile application a user may have installed on his mobile device or computer, and may also interact with a pet pendant or tag having a GPS tracker. Based on GPS sensors in the pet pendant and on the user's mobile device, the controller C may determine whether a pet is alone in a house, is out with his owner (the user), or is in the house with his owner. A location of the house may be entered by the user via the mobile application, or may be determined to be equal to GPS data sensed by the GPS of the pet water dispenser 1.

When the GPS data indicates that the pet and his owner are away from the house together, the controller C may operate the Peltier device 191b to cool or heat the liquid so that the liquid is at a pleasing temperature when the pet returns to the house. The controller C may further operate the sterilizing light 194 when the owner and pet are away from the house, since the owner and pet will not be at risk of being exposed to UV radiation, which may be damaging.

When GPS sensors indicate that the pet is alone in the house, the controller C may operate the pump 192 and/or the light emitting device 114e to attract the pet to the pet water dispenser 1 for regular drinking. The user may also control the pet water dispenser 1 via a mobile application, and can turn the pet water dispenser 1 on or off using the mobile application. The user may also select a temperature of the liquid to be maintained and control the pump 192.

Figure 12:
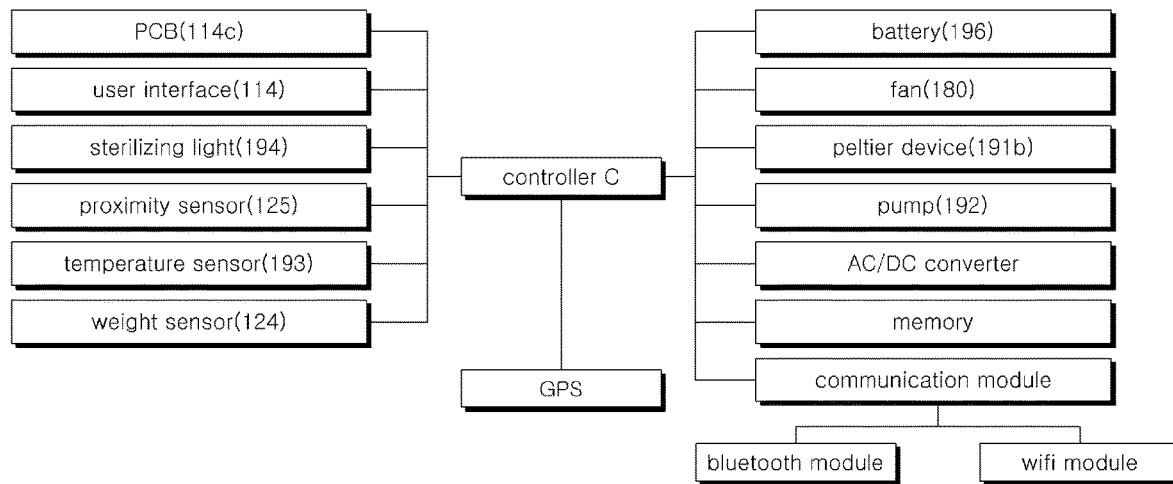
FIG. 12 is a block diagram schematic illustrating the controller of a printed circuit board provided in the base and various elements coupled to the controller for operation of the water dispenser.

Referring to FIGS. 2A-2B and 12, a status of the battery 196 may be provided to the user via the mobile application, and the controller C may control electronic devices based on a charge of the battery 196. In addition, the controller C may control electronic devices based on a water level sensed by the weight sensor 124.

As an example, when the battery 196 is less than a first predetermined charge amount (e.g., 15%) and when external power is not being supplied to the socket 118, a power saving mode may be entered. The user may configure desired settings during the power saving mode via the user interface 114, or, if no settings have been entered, a default power saving mode may be implemented. In the power saving mode, temperature control of the pet water dispenser 1 may be altered. As an example, the controller may stop or prevent an operation of the Peltier device 191b, proximity sensor 125, temperature sensor 193, and sterilizing light 194, but may continue to operate the pump 192 and the user interface 114. Alternatively or in addition thereto, the controller may stop an operation of the fan 180 if a temperature of the heat sink 160 and/or the Peltier device 191b sensed by the element temperature sensor is less than the predetermined element temperature.

Furthermore, the controller C may implement the power saving mode when a water level sensed by the weight sensor 124 is less than a predetermined minimum water level, even if a charge of the battery 196 is greater than 15%. Alternatively or in addition thereto, the controller C may stop an operation of the pump 192 when a water level sensed by the weight sensor 124 is less than the predetermined minimum water level. The controller C may continue to operate the weight sensor 124 and operate the pump 192 when a water level sensed by the weight sensor 124 is greater than the predetermined minimum water level.

Alternatively or in addition thereto, the controller C may prioritize electronic devices to operate during the power saving mode. The controller C may alter a priority order of electronic devices based on measurements sensed by the weight sensor 124, the temperature sensor 193, and the proximity sensor 125. For example, the controller C may continue to operate the temperature sensor 193 in the power saving mode, but may only prioritize operation of the Peltier device 191b based on a sensed temperature being outside of a second predetermined liquid temperature range that is greater than the first predetermined liquid temperature range (e.g., 2° C.-30° C.). In addition, a user may preset a priority order of electronic devices to be implemented during the power saving mode via the user interface 114.

During the power saving mode, the controller C may control the communication module to continuously check a signal (e.g., wireless signal via WiFi or service set identifier or SSID signal) or electrical connection with a charge pad, which may wirelessly charge the battery 196. If a signal is received from the charge pad that indicates it is in a range to wirelessly charge the battery 196, then a normal mode or operation may be implemented, and the power saving mode may be stopped. The normal mode may not prevent or reduce operations of the Peltier device 191*b*, etc. If a signal is not received from the charge pad, the user may override the power saving mode via the mobile application to implement the normal mode.

Alternatively or in addition thereto, the controller C may interact with the socket 118 to continuously check to see if external power is being applied to the socket 118. If the controller C determines that external power is being applied to the socket 118, then the power saving mode may be stopped, and the normal mode may be implemented.

When the battery 195 is less than a second predetermined charge amount (e.g., 3%), the pet water dispenser may enter an ultra power saving mode or a sleep mode in which any remaining electronic devices that are still operating (e.g., the light emitting device 114*e* and/or the user interface 114, the element temperature sensor, the weight sensor 124, the pump 192, and the fan 180) may be stopped. If the user is unable to charge the battery 195 by connecting the socket 118 to external power or wirelessly via a charge pad, the user may remove the dispensing assembly 400 and the filter assembly 300 by lifting the inclined wall 323 of the filter guide 320 up and out of the container 200, and a pet may consume liquid straight from the container 200. The user may also remove the secondary filter 240 so as not to interfere with a pet consuming liquid from the container 200, but may keep the bottom cover 250 inside of the container 200 to protect the pump 192 and the sterilizing light 194.

Figure 13A:
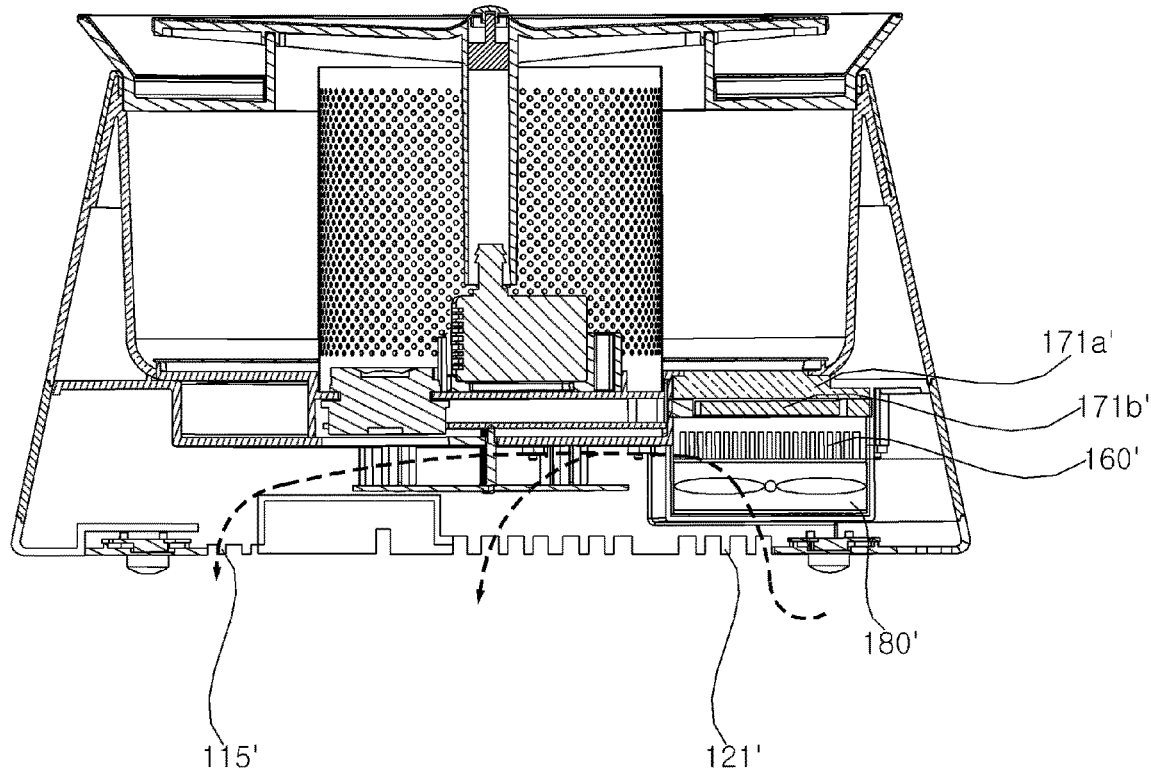
FIG. 13A shows an alternative arrangement of a fan, heat sink, and Peltier device according to a second embodiment.
Figure 13B:
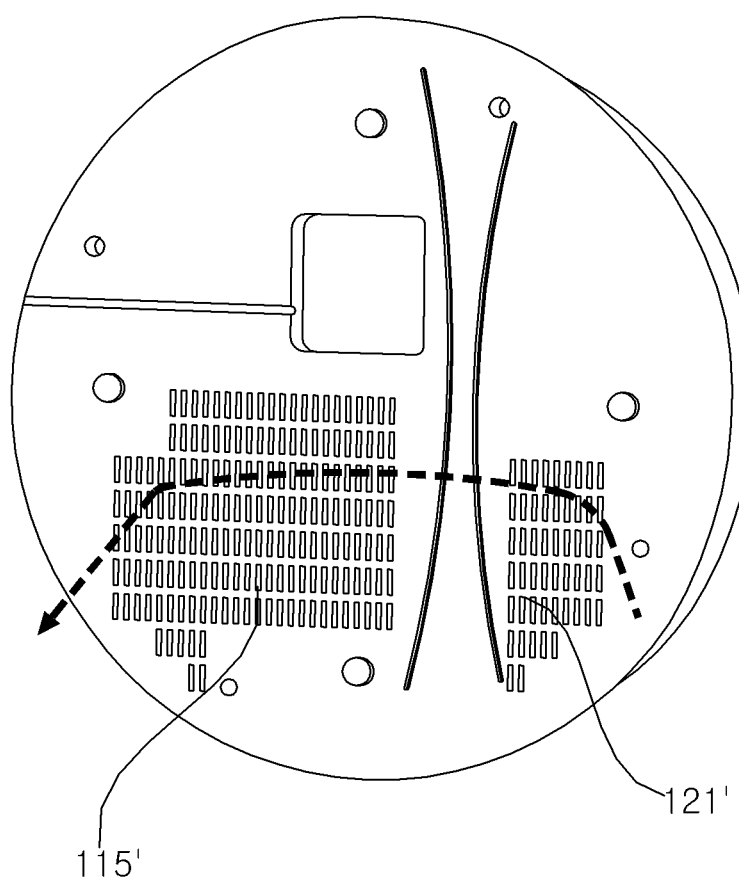
FIG. 13B shows a bottom of a base according to the second embodiment.

Although the figures show the fan 180 and the heat sink 160 provided at a center of the base 100 and the Peltier device 191*b* provided at a side, embodiments disclosed herein are not limited. For example, referring to FIGS. 13A and 13B, an alternative embodiment of the pet water dispenser 1 may be substantially the same as embodiments described with reference to FIGS. 12-12B except for in an arrangement of a fan 180', a heat sink 160', a Peltier device 191*b'*, and a metal 191*a'*. In such an alternative embodiment, the fan 180' and the heat sink 160 may be smaller in size and provided to be at a side of the base 100. The fan 180' may be provided under the heat sink 160', which may be provided under the Peltier device 191*b'*, which may be provided under the outer bottom surface 121. A suction grill 121' may be provided in the lower frame 120 under the fan 180', and a discharge grill 115' may be provided at a center or opposite side of the lower frame 120. In such an alternative embodiment, the bottom cover 250 may be made of metal (e.g., stainless steel) and the ribs 255 may be omitted so that the bottom cover 250 directly contacts the metal 191*a'* to serve as an additional heat transfer plate and help to heat or cool the liquid in the container 200. Alternatively, the bottom cover 250 may include the optional ribs 255, and/or the outer bottom surface 221 of the container 200 may include ribs to space the bottom cover 250 apart from the outer bottom surface 221 of the container 200.

Figure 14A:
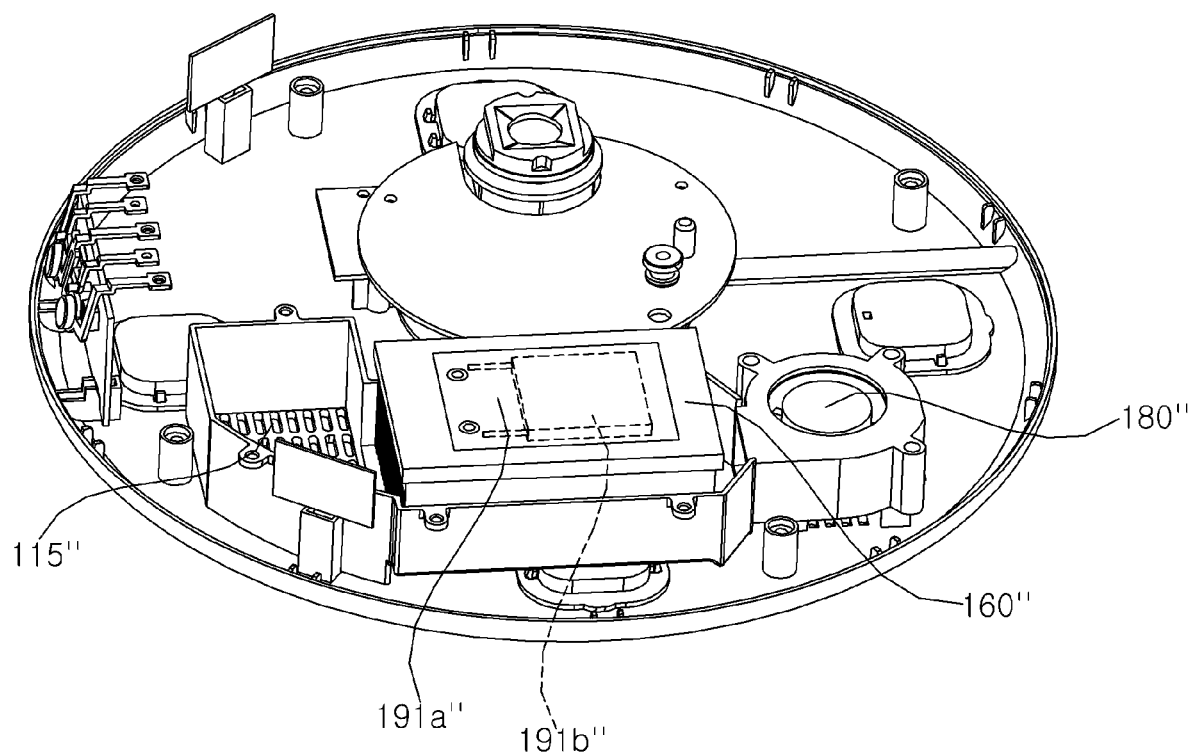
FIG. 14A shows an alternative arrangement of a fan, heat sink, and Peltier device according to a third embodiment.
Figure 14B:
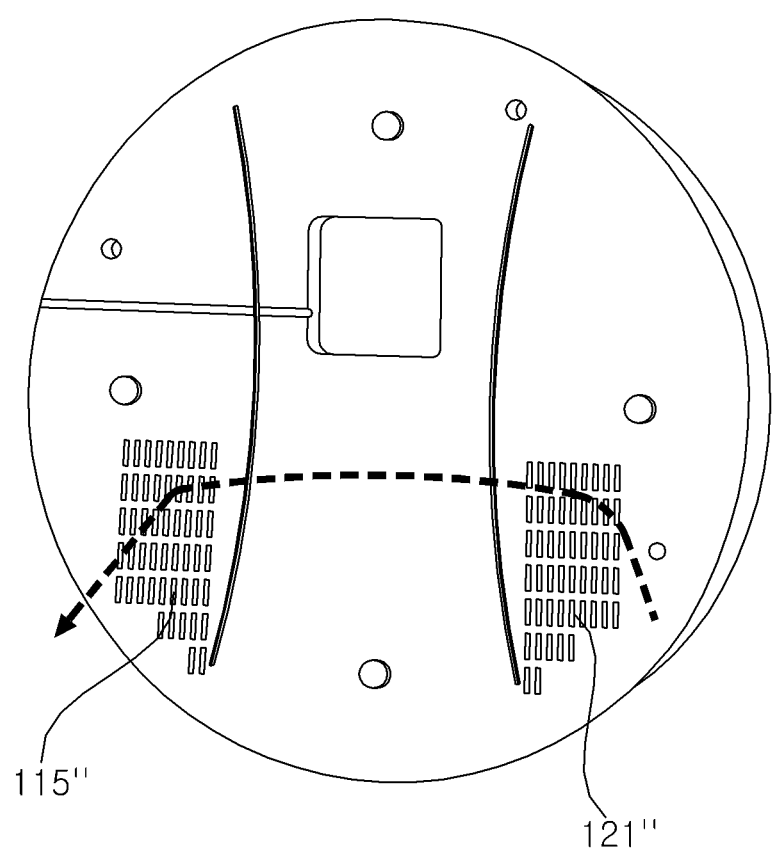
FIG. 14B shows a bottom of a base according to the third embodiment.

Referring to FIGS. 14A-14B, another alternative embodiment of the pet water dispenser 1 may be substantially the same as embodiments described with reference to FIGS. 1-12B except for in an arrangement of a fan 180", a heat sink 160", a Peltier device and metal plate 191*a"*, and discharge grill 115". The fan 180" may be a sirocco fan or blower provided to at a side of the heat sink 160" instead of under the heat sink 160". There may be a suction grill 121" provided under the fan 180 in the lower frame 120 (or alternatively adjacent to the fan in the outer wall of the lower frame 120), and the discharge grill 115" provided on an opposite side of the lower frame 120 through which air may be discharged. The heat sink 160" and the fan 180" may be provided between the suction grill and the discharge grill 115". The fan 180" may blow air laterally through radiating fins of the heat sink 160" to cool the Peltier device provided on a heat dissipating plate of the heat sink 160" and below the metal plate 191*a"*.

U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, U.S. application Ser. No. 16/569,841 filed on Sep. 13, 2019, and U.S. application Ser. No. 16/569,908 filed on Sep. 13, 2019, the entire contents of which are incorporated by reference herein.

The effects of the present disclosure are not limited to the effects mentioned above, and other effects not mentioned can be clearly understood by those skilled in the art from the description of the claims.

An object of embodiments disclosed herein is to provide a pet water dispenser capable of providing fresh and clean water to a pet and capable of providing water at a desirable temperature to a pet.

An object of embodiments disclosed herein is to provide a pet water dispenser capable of preventing contamination from outside of the pet water dispenser or from the pet's mouth or snout.

An object of embodiments disclosed herein is to provide a pet water dispenser capable of providing flowing water, which is pleasing for certain animals.

An object of embodiments disclosed herein is to provide a pet water dispenser cable of controlling and maintaining a temperature of water dispensed to a pet based on a pet's species or a user's input.

An object of embodiments disclosed herein is to provide a pet water dispenser capable of accurately detecting a temperature of water or liquid stored in the pet water dispenser, and controlling a thermoelectric regulator based on a sensed temperature.

An object of embodiments disclosed herein is to provide a pet water dispenser capable of quickly heating or cooling water in the pet water dispenser.

An object of embodiments disclosed herein is to provide a pet water dispenser capable of accurately detecting an amount of water stored in the pet water dispenser and operating the pet water dispenser based on a sensed water amount.

An object of embodiments disclosed herein is to provide a pet water dispenser capable of accurately detecting a proximity of a pet approaching the pet water dispenser and operating the pet water dispenser based on a sensed proximity.

An object of embodiments disclosed herein is to provide a pet water dispenser capable of insulating a space where liquid is stored.

An object of embodiments disclosed herein is to provide a pet water dispenser capable of effectively filtering and sterilizing water.

An object of embodiments disclosed herein is to provide a pet water dispenser capable of operating via battery power and also via power from an external source.

An object of embodiments disclosed herein is to provide a pet water dispenser capable of operating under power saving mods based on a charge of a battery operating the pet water dispenser and whether the pet water dispenser is receiving power from an external source.

An object of embodiments disclosed herein is to provide a pet water dispenser capable of treating seasonal affective disorder and capable of being therapeutic for pets and humans.

An object of embodiments disclosed herein is to provide a pet water dispenser that is aesthetically pleasing.

An object of embodiments disclosed herein is to provide a pet water dispenser that may be controlled remotely.

Embodiments disclosed herein may provide a pet water dispenser that is easy to repair, clean, and control.

Embodiments disclosed herein may provide a pet water dispenser that is safe to use.

An object of embodiments disclosed herein is to solve problems or disadvantages in the related art. The problems solved by the present disclosure are not limited to the above-mentioned problems, and other problems not mentioned can be clearly understood by those skilled in the art from the following description.

Embodiments disclosed herein may be implemented as a liquid dispenser comprising a container configured to store liquid and having an upper rim defining an upper opening, a base to support the container and having a thermoelectric device to change a temperature of the liquid in the container, a pump having an inlet to suction liquid stored in the container and an outlet to discharge the liquid, a filter assembly having at least one first filter and supported on the upper rim of the container, the filter assembly having an inner opening, a bottom surface surrounding the inner opening, and an inclined wall extending from the bottom surface and supported by the upper rim of the container, and a dispensing assembly to cover the inner opening of the filter assembly such that the dispensing assembly and the filter assembly close the upper opening of the container. The dispensing assembly may have a top plate. The top plate may have a hole communicating with the outlet of the pump such that the liquid pumped by the pump spreads over the top plate, cascades to the filter assembly to be filtered by the first filter, and returns to the container.

The dispensing assembly may further include a pipe support and a plate support provided under the top plate and having a bottom side configured to fit into the inner opening of the filter assembly. The pipe support may be a hollow cylindrical shell extending downward from the bottom side of the plate support. A pipe may be inserted into the pipe support. The plate support may include spokes to add structural rigidity to the plate support. The spokes may have an angle of inclination corresponding to an angle of inclination of the top plate.

A float may be configured to fit inside of the hole of the top plate. The pipe support may include grooves. A stem of the float may be configured to move up and down in the grooves of the pipe support such that, when the pump pumps liquid at a predetermined pumping capacity or higher, the float moves up to create a ring-shaped opening between an outer side of the float and an inner surface of the top plate defining the hole, and when the pump pumps liquid at a predetermined pumping capacity or less, the float moves down to reduce a size of the ring-shaped opening or to completely close the hole.

The filter assembly may include a filter top having the bottom surface. The bottom surface may include a plurality of through holes through which liquid drops to return to the container.

The filter assembly may include a filter guide having the bottom surface. The bottom surface may be a ramp surface inclined toward a bottom opening through which liquid drops before entering the container.

The filter assembly may include a filter slot having a bottom wall, side walls, a rear wall, and a front opening. The bottom wall may have at least one opening through which liquid may be dropped. A filter tray may be configured to be inserted into the front opening of the filter slot. The filter tray may include a filter material such that liquid drops through the filter material and the at least one opening of the bottom wall before entering the container.

A second filter may be provided over the bottom surface of the container to surround the pump. The second filter may be a cylindrical strainer. A top end of the second filter may be at least partially inserted into the inner opening of the filter assembly.

A bottom cover may cover a bottom of the container. The bottom cover may include a pump cover surrounding the pump, a plurality of openings through which liquid flows to enter the pump inlet, and an upper surface having a hole aligned with the outlet of the pump.

A bottom cover may cover a bottom of the container and the pump. A second filter may be provided over the bottom cover and below the filter assembly.

A sterilizing light may emit ultraviolet radiation into the liquid of the container before the liquid enters the pump inlet. A temperature sensor protruding into a bottom of the container may measure a temperature of the liquid in the container.

The thermoelectric device may include a Peltier device provided in the base and a metal provided on top of the Peltier device. The metal may be exposed through a bottom opening of the container.

A heat sink may be provided in the base. The Peltier device may be provided on the heat sink. A fan may be provided below the heat sink.

The base may include a suction grill through which air may be suctioned by the fan, exhaust vents through which air may be exhausted by the fan, and discharge slots through which liquid drops through. A fan housing may surround the fan and have inclined surfaces leading to the exhaust vents and the discharge slots.

A proximity sensor may be provided in the base to sense a position of a moving object within a predetermined distance range of the base. A water level sensor may be provided on a bottom of the base to sense an amount of liquid in the container.

A user interface may be provided on the base through which a user may select a temperature of the liquid in the container. A battery and a controller may be further provided in the base.

Embodiments disclosed herein may be implemented as a liquid dispenser comprising a container configured to store liquid and having an upper rim defining an upper opening, a base to support the container and having a thermoelectric device to change a temperature of the liquid in the container, a pump having an inlet to suction liquid stored in the container and an outlet to discharge the liquid, and a lid covering the upper opening of the container and having a hole through which liquid discharged from the pump flows. The hole may be provided in an upper surface of the lid. The lid may include a liquid guide provided below the upper surface. The liquid guide may include an inclined wall having a maximum width larger than a width of the upper surface and a filter surface that filters foreign matter from liquid falling from the upper surface of the lid to the container.

Embodiments disclosed herein may be implemented as a liquid dispenser comprising a container, a pump configured to pump liquid stored in the container, a base provided below the container and having a thermoelectric device to change a temperature of the liquid in the container, a filter assembly provided above the container and including at least one filter, and a dispensing assembly provided above the filter assembly. The dispensing assembly may include a top plate defining an uppermost surface of the container and a dispensing opening through which liquid discharged from the pump flows. The dispensing opening may be configured to change a direction of the liquid discharged from the pump such that the liquid dispensed from the dispensing opening may be sprayed across an upper surface of the top plate. The dispensing opening may be formed by a hole in the top plate and a float at least partially inserted into the hole.

The pump may be configured to pump liquid at a predetermined velocity such that, when the liquid is dispensed from the dispensing opening, the liquid has a horizontal velocity component sufficient to flow over an edge of the top plate and through the filter of the filter assembly before flowing back into the container.

The top plate may have a predetermined angle of inclination, and the predetermined velocity may be large enough such that the horizontal velocity component of the dispensed liquid may be sufficient to overcome the predetermined angle of inclination of the top plate.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
   a container configured to store liquid and having an upper rim defining an upper opening;
   a base to support the container, the base having a thermoelectric device to change a temperature of the liquid in the container;
   a pump having an inlet to suction the liquid stored in the container and an outlet to discharge the liquid;
   a filter assembly having at least one first filter, the filter assembly being supported on the upper rim of the container, and the filter assembly having an inner opening, a bottom surface surrounding the inner opening, and an inclined wall extending from the bottom surface and supported by the upper rim of the container; and a dispensing assembly to cover the inner opening of the filter assembly such that the dispensing assembly and the filter assembly close the upper opening of the container, the dispensing assembly having a top plate, the top plate having a hole communicating with the outlet of the pump such that the liquid pumped by the pump spreads over the top plate, cascades to the filter assembly to be filtered by the at least one first filter, and returns to the container, wherein the dispensing assembly further includes a pipe support and a plate support provided under the top plate, the plate support having a bottom side configured to fit into the inner opening of the filter assembly, and the pipe support being hollow cylindrical shell extending downward from the bottom side of the plate support, wherein a pipe is inserted into the pipe support, and wherein the plate support includes spokes to add structural rigidity to the plate support, and the spokes have an angle of inclination corresponding an angle of inclinations of the top plate.

2. The liquid dispenser of claim 1, further including a float configured to fit inside of the hole of the top plate, wherein the pipe support includes grooves, and a stem of the float is configured to move up and down in the grooves of the pipe support such that, when the pump pumps the liquid at a predetermined pumping capacity or higher, the float moves up to create a ring-shaped opening between an outer side of the float and an inner surface of the top plate defining the hole, and when the pump pumps the liquid at a predetermined pumping capacity or less, the float moves down to reduce a size of the ring-shaped opening or to completely close the hole.

3. The liquid dispenser of claim 1, wherein the filter assembly includes a filter top having the bottom surface, wherein the bottom surface includes a plurality of through holes through which the liquid drops to return to the container.

4. The liquid dispenser of claim 1, wherein the filter assembly includes a filter guide having the bottom surface, the bottom surface is a ramp surface inclined toward a bottom opening through which the liquid drops before entering the container.

5. The liquid dispenser of claim 1, wherein the filter assembly includes a filter slot having a bottom wall, side walls, a rear wall, and a front opening, the bottom wall having at least one opening through which the liquid is dropped, and a filter tray configured to be inserted into the front opening of the filter slot, the filter tray including a filter material such that the liquid drops through the filter material and the at least one opening of the bottom wall before entering the container.

6. The liquid dispenser of claim 1, further including a second filter provided over the bottom surface of the container to surround the pump.

7. The liquid dispenser of claim 6, wherein the second filter is a cylindrical strainer, and a top end of the second filter is at least partially inserted into the inner opening of the filter assembly.

8. The liquid dispenser of claim 1, further including a bottom cover to cover a bottom of the container.

9. The liquid dispenser of claim 8, wherein the bottom cover includes a pump cover surrounding the pump, a plurality of openings through which the liquid flows to enter the pump inlet, and an upper surface having a hole aligned with the outlet of the pump.

10. The liquid dispenser of claim 1, further including a bottom cover to cover a bottom of the container and the pump, and a second filter provided over the bottom cover and below the filter assembly.

11. The liquid dispenser of claim 1, further including a sterilizing light to emit ultraviolet radiation into the liquid of the container before the liquid enters the pump inlet, and a temperature sensor protruding into a bottom of the container to measure the temperature of the liquid in the container.

12. The liquid dispenser of claim 1, wherein the thermoelectric device includes a Peltier device provided in the base and a metal provided on top of the Peltier device, the metal exposed through a bottom opening of the container.

13. The liquid dispenser of claim 12, further including a heat sink provided in the base on which the Peltier device is provided and a fan provided below the heat sink.

14. The liquid dispenser of claim 13, wherein the base includes a suction grill through which the air is suctioned by the fan, exhaust vents through which air is exhausted by the fan, discharge slots through which the liquid drops through, and a fan housing surrounding the fan and having inclined surfaces leading to the exhaust vents and the discharge slots.

15. The liquid dispenser of claim 1, further including a proximity sensor provided in the base to sense a position of a moving object within a predetermined distance range of the base, and a water level sensor provided on a bottom of the base to sense an amount of liquid in the container.

16. The liquid dispenser of claim 1, further including a user interface provided on the base through which a user may select the temperature of the liquid in the container.

17. The liquid dispenser of claim 1, wherein a battery and a controller is further provided in the base.

18. A liquid dispenser, comprising:
a container configured to store liquid and having an upper rim defining an upper opening;
a base to support the container and having a thermoelectric device to change a temperature of the liquid in the container;
a pump having an inlet to suction liquid stored in the container and an outlet to discharge the liquid; and
a lid covering the upper opening of the container,
wherein the lid includes:
a filter assembly having at least one filter and supported the upper opening of the container, the filter assembly having an inner opening, a bottom surface surrounding the inner opening, and an inclined wall extending from the bottom surface and supported by the upper rim of the container; and
dispensing assembly to cover the inner opening of the filter assembly,
wherein the dispensing assembly includes:
a top plate having a hole communicating with the outlet of the pump such that the liquid pumped by the pump spreads over the top plate, cascades to the filter assembly to be filtered by the at least one filter, and returns to the container,
a pipe support and a plate support provided under the top plate, the plate support having a bottom side configured to fit into the inner opening of the filter assembly, the pipe support being a hollow cylindrical shell extending downward from the bottom side of the plate support, wherein a pipe is inserted into the pipe support, and wherein the plate support includes spokes to add structural rigidity to the plate support, and the spokes have an angle of inclination corresponding an angle inclination of the top plate.

19. The liquid dispenser of claim 18, wherein the inclined wall has a maximum width larger than a width of an upper surface of the lid, and the at least one filter includes a filter surface that filters foreign matter from liquid falling from the upper surface of the lid to the container.

20. A liquid dispenser, comprising:
a container;
a pump configured to pump liquid stored in the container;
a base provided below the container and having a thermoelectric device to change a temperature of the liquid in the container;
a filter assembly provided above the container and including at least one filter; and
a dispensing assembly provided above the filter assembly,
wherein the dispensing assembly includes a top plate defining an uppermost surface of the container and a dispensing opening through which liquid discharged from the pump flows,
wherein the dispensing opening is configured to change a direction of the liquid discharged from the pump such that the liquid dispensed from the dispensing opening is sprayed across an upper surface of the top plate,
wherein the dispensing assembly further it dudes a pipe support and a plate support provided under the top plate, the plate support having a bottom side configured to fit into an inner opening of the filter assembly, the pipe support being a hollow cylindrical shell extending downward from the bottom side of the plate support,
wherein a pipe is inserted into the pipe support, and
wherein the plate support includes spokes to add structural rigidity to the plate support, and the spokes have an angle of inclination corresponding an angle of inclination of the top plate.

21. The liquid dispenser of claim 20, wherein the pump is configured to pump liquid at a predetermined velocity such that, when the liquid is dispensed from the dispensing opening, the liquid has a horizontal velocity component sufficient to flow over an edge of the top plate and through the filter of the filter assembly before flowing back into the container.

22. The liquid dispenser of claim 21, wherein the predetermined velocity is large enough such that the horizontal velocity component of the dispensed liquid is sufficient to overcome the angle of inclination of the top plate.

23. The liquid dispenser of claim 20, wherein the dispensing opening is formed by a hole in the top plate and a float at least partially inserted into the hole.

* * * * *